United States Patent [19]

Parker et al.

[11] Patent Number: 4,884,214

[45] Date of Patent: Nov. 28, 1989

[54] THERMOSTAT

[75] Inventors: Jeffery L. Parker; Edward Parker, both of Jacksonville, Fla.

[73] Assignee: Parker Electronics, Inc., Jacksonville, Fla.

[21] Appl. No.: 13,868

[22] Filed: Feb. 12, 1987

[51] Int. Cl.[4] .............................................. F25B 29/00
[52] U.S. Cl. ................................ 364/505; 364/551.01; 165/22; 236/1 B
[58] Field of Search ...................... 165/14, 16, 22, 26, 165/27; 236/49, 1 C, 1 B; 364/505, 506, 557, 550, 551, 571, 143-145

[56] References Cited

U.S. PATENT DOCUMENTS

| 4,388,692 | 6/1983 | Jones et al. | 364/557 |
| 4,530,395 | 7/1985 | Parker et al. | 236/1 C |
| 4,638,850 | 1/1987 | Newell III et al. | 165/26 |
| 4,682,279 | 7/1987 | Watabe | 165/26 |
| 4,683,939 | 8/1987 | Levine | 165/26 |
| 4,716,957 | 1/1988 | Thompson et al. | 165/22 |

Primary Examiner—Parshotam S. Lall
Assistant Examiner—Ellis B. Ramirez
Attorney, Agent, or Firm—Arthur G. Yeager; Earl L. Tyner

[57] ABSTRACT

A microcomputer-controlled thermostat for use in monitoring and controlling a single zone HVAC system which provides conditioned air to one or more zones. The thermostat can be programmed and used either as a monitor thermostat to control the HVAC unit alone and/or to control the HVAC unit and its damper in a multiple zone mode. The thermostat is also programmed as a slave thermostat in a master-slave relationship with a monitor thermostat. The microcomputer memory is supplemented with additional ROM containing control algorithms for use in system operation.

73 Claims, 7 Drawing Sheets

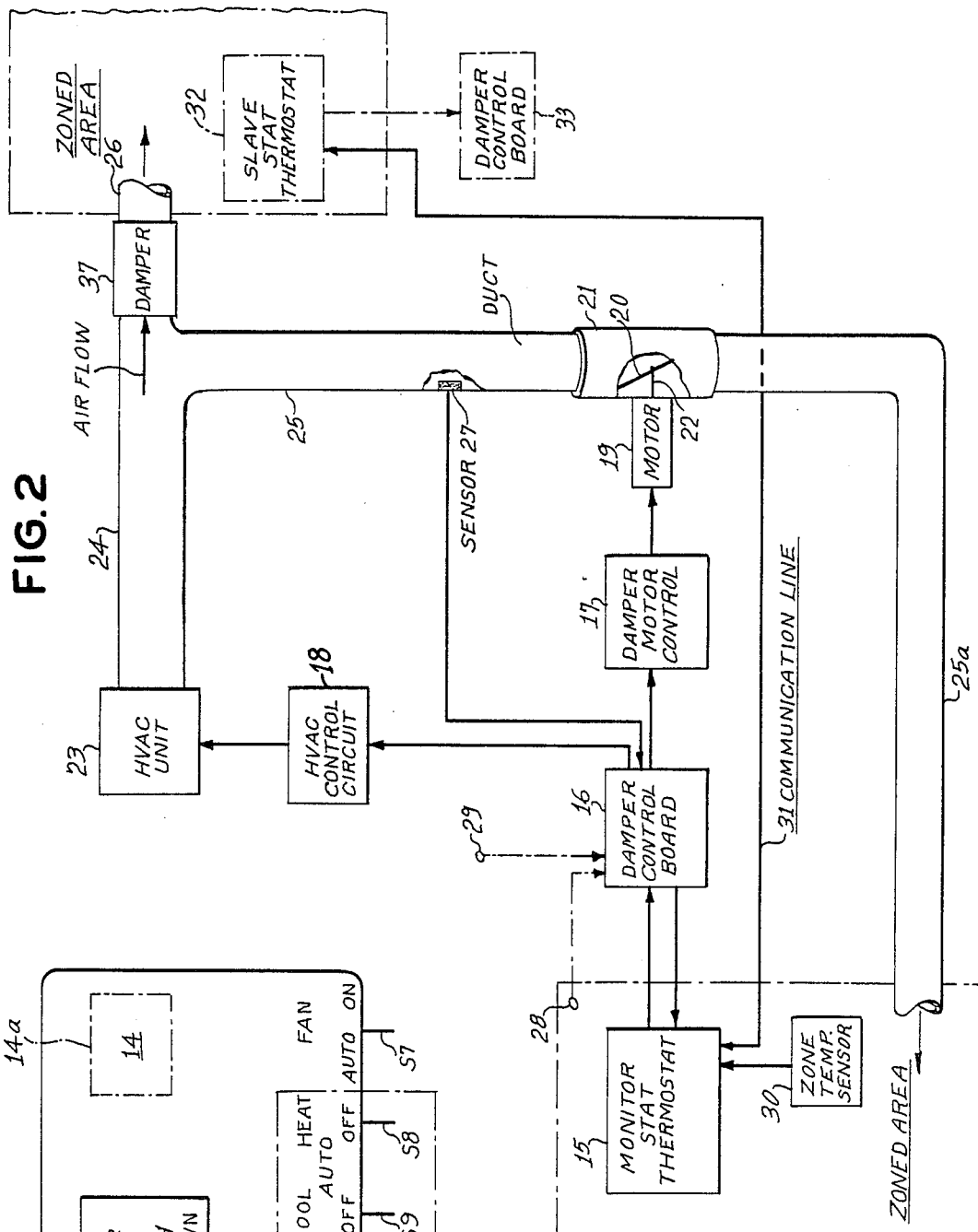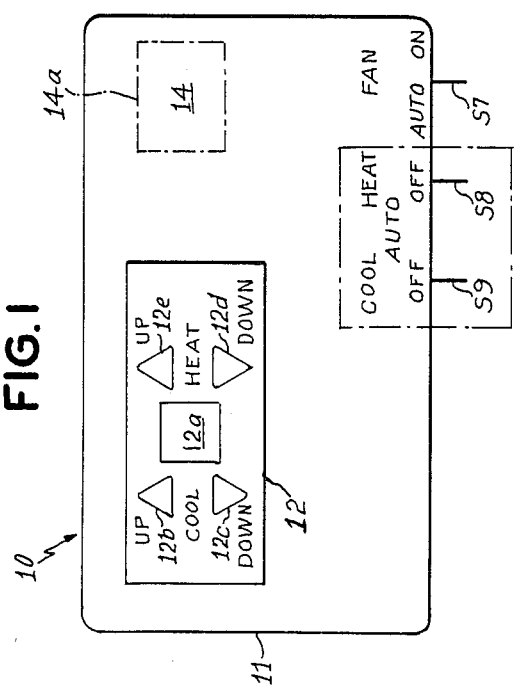

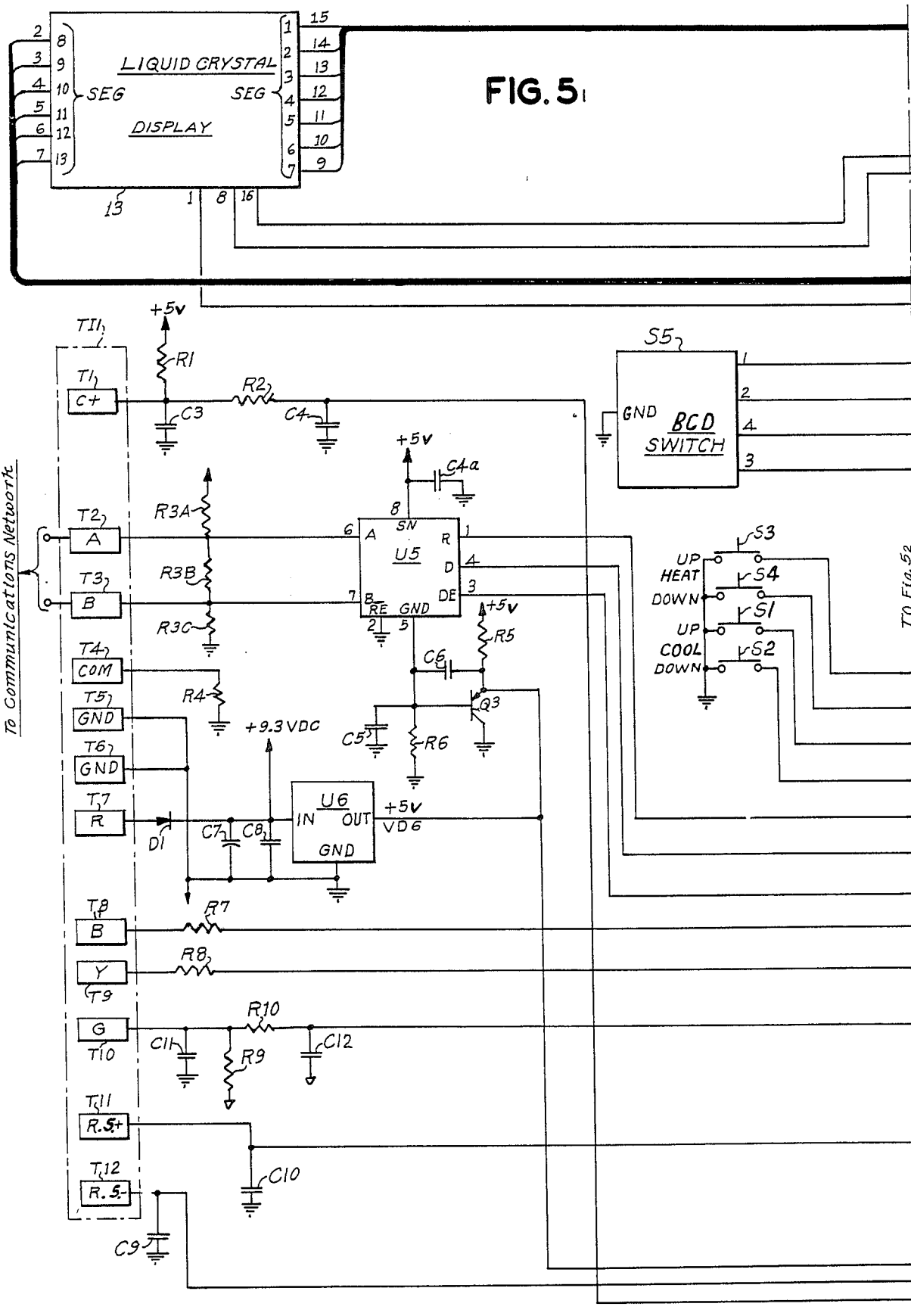

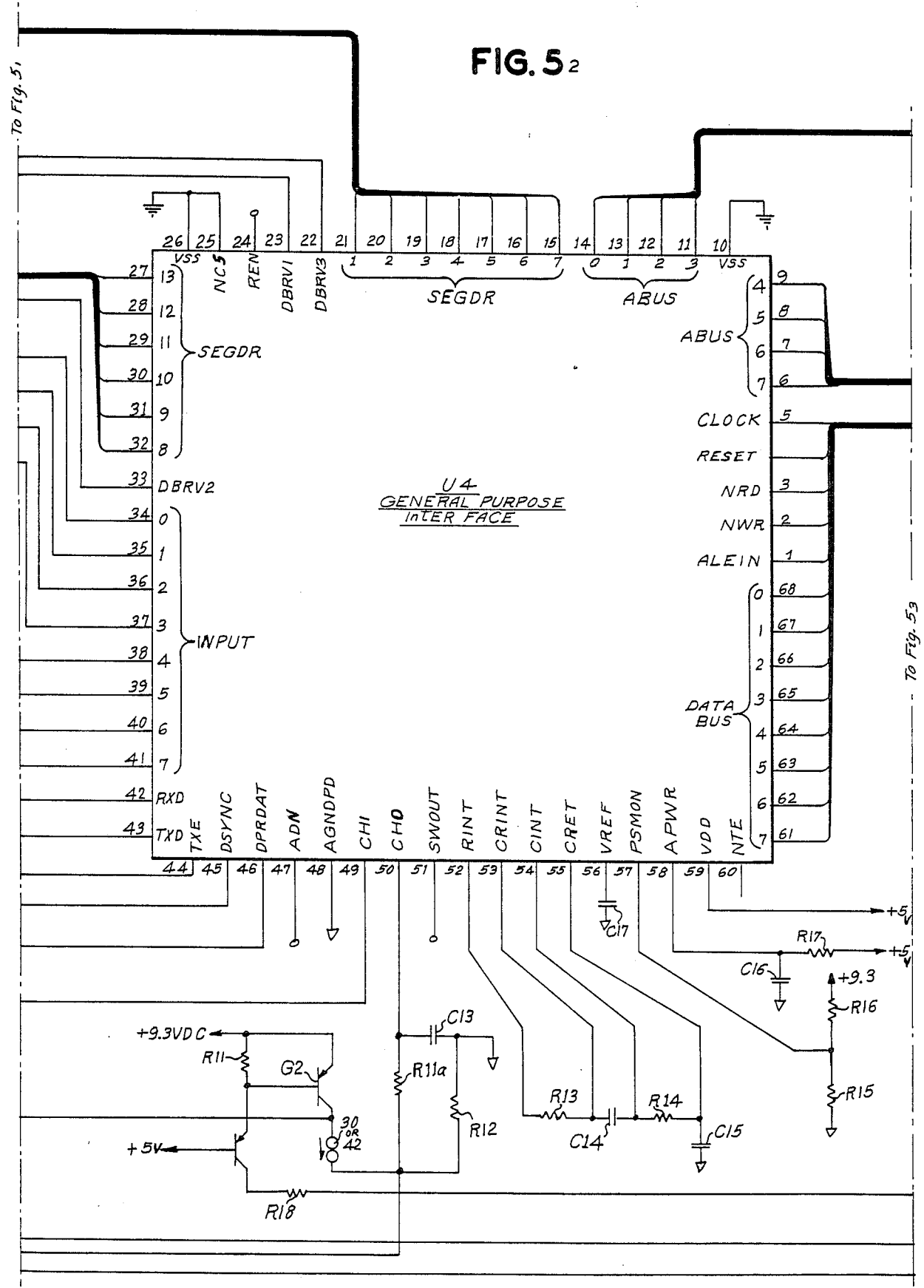

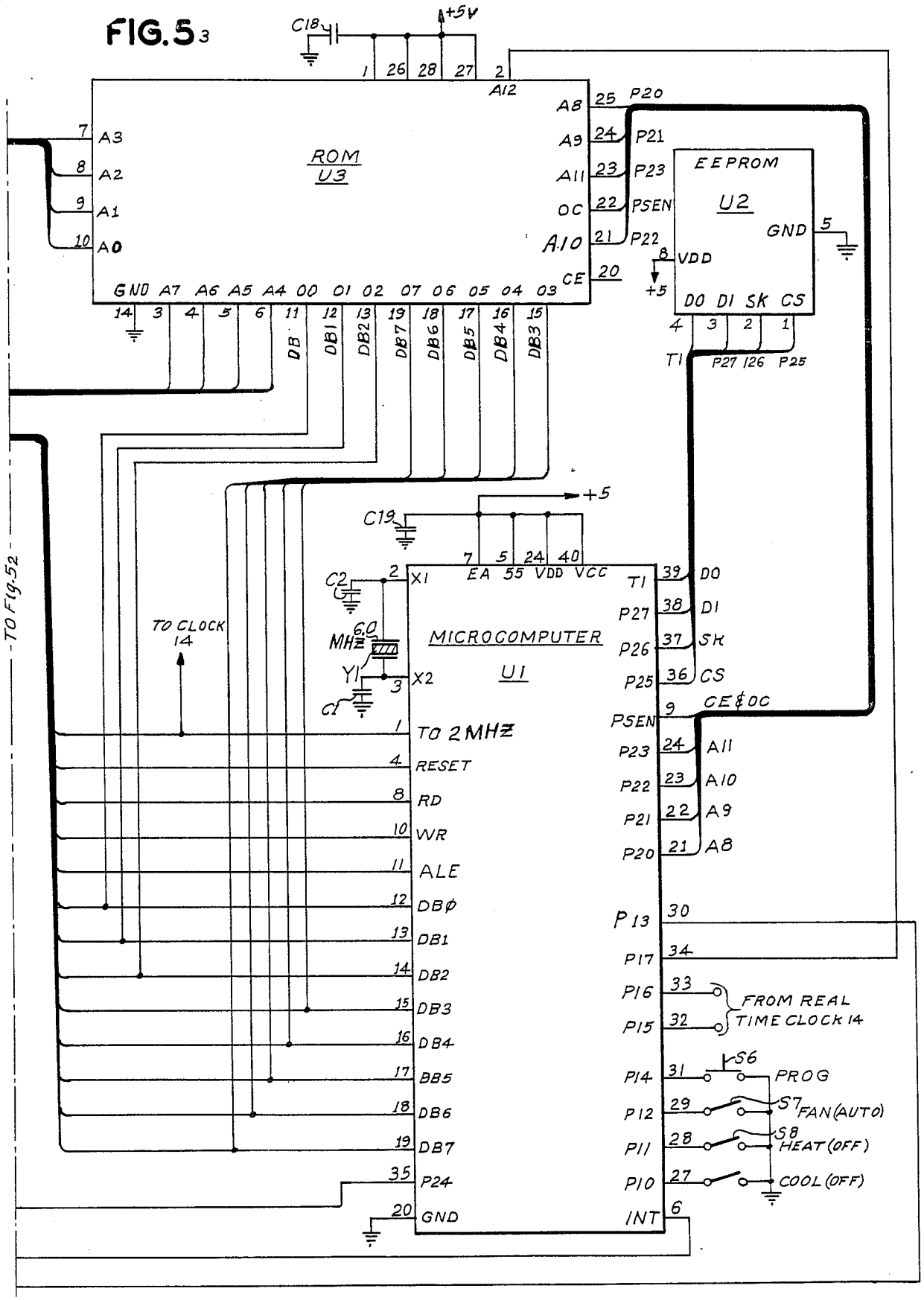
FIG.5₃

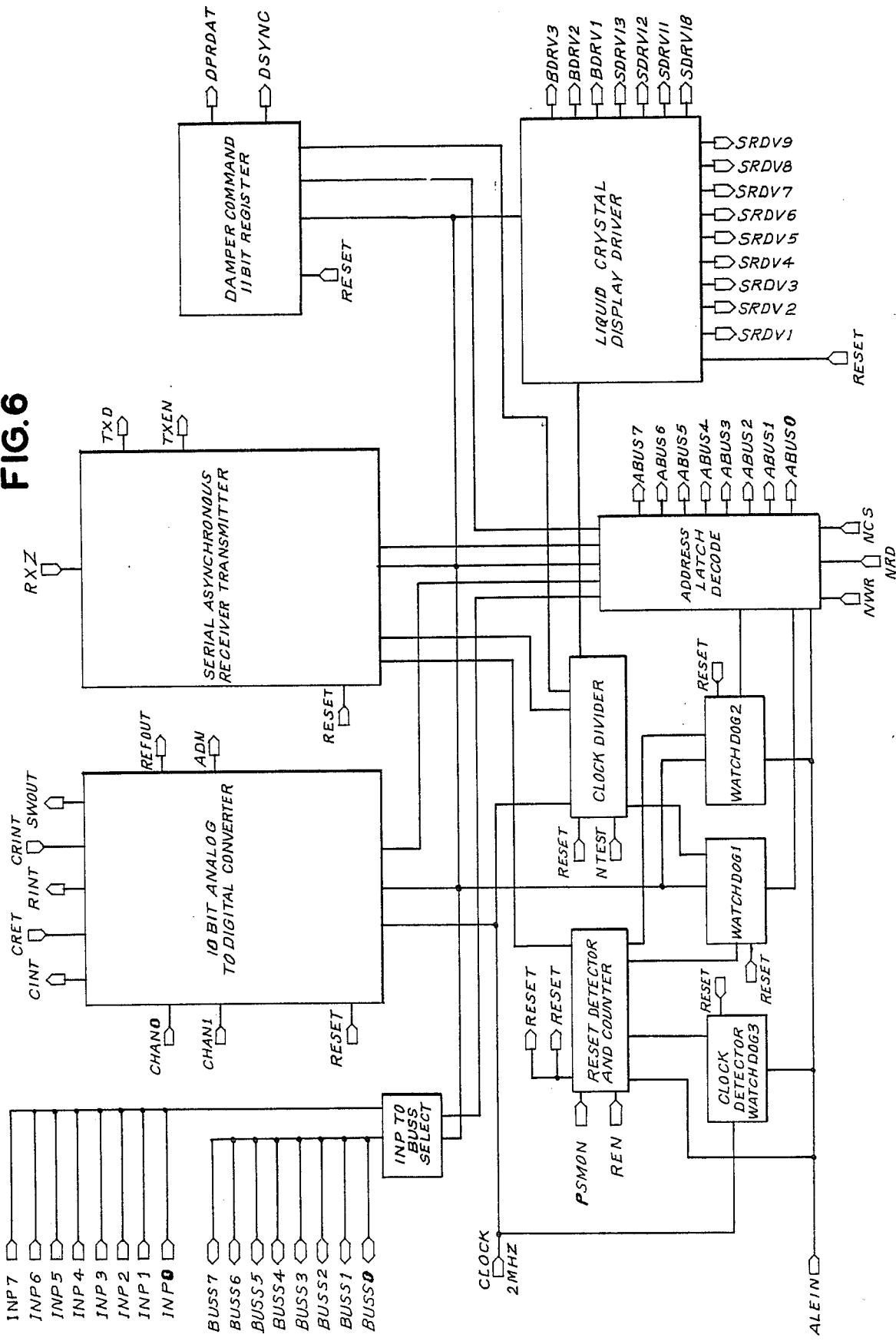

THERMOSTAT

BACKGROUND OF THE INVENTION

1. Field of the Invention

The present invention relates to the field of control devices and methods for use with heating, ventilation, and air conditioning (HVAC) units and particularly to thermostat-based control devices.

2. Prior Art

The present invention relates to microcomputer-controlled thermostat means for use in controlling the conditioning of air in multiple zones by way of a single-zone HVAC unit.

A number of methods of controlling the conditions in a plurality of zones from only a single zone HVAC unit are known to the prior art. A description of the difficulties and limitations associated with many of the methods attempted is disclosed in U.S. Pat. No. 4,530,395 (Parker, et al.) and is relevant here. Briefly, the problems center around the means by which a single-zone HVAC unit can be controlled from more than one thermostat. Probably one of the best solutions to this problem that is found in the prior art is disclosed in such patent. The objective there was to provide control of a single zone HVAC unit and its air distribution systems from a common set of thermostats in two or more zones wherein each thermostat could control both the single zone HVAC unit through a "monitor control" and its own respective zone damper. The system disclosed in such patent provides a "central control monitor" which receives information from the various individual zones and compares this information with various preset data to then properly control the dampers and the HVAC unit. While the system as described did meet the objectives of multiple zone control of a single zone HVAC unit it required the use of a dedicated microprocessor-controlled monitor to receive data from a plurality of zone thermostats. In the present invention, similar control of a single zone HVAC unit for use in multiple zones is accomplished by microcomputer controlled thermostats which can operate in either a slave or master function thus avoiding the need for complex and dedicated central control monitors. It is believed that the system and methods in accord with this invention which allows for control of a single HVAC utilizing master/slave thermostats in lieu of central control units represents a substantial departure from any prior art.

FEATURES OF THE INVENTION

Principal features of the invention include a microcomputer controlled thermostat wherein the microcomputer is supplemented by (1) an electronically erasable programmable read only memory (EEPROM) through which temperature settings and other parameters can be stored and (2) a read only memory (ROM) containing control algorithms in the form of instruction codes and fixed data for system operation, data display, and asynchronous communication to an external communications bus. Programming many operations of the thermostat is accomplished through a program switch to the microcomputer and a general purpose interface (GPI) also having data input switches.

The thermostat also has interface circuitry to receive inputs in the form of data and control signals and output signals from local and remote temperature detectors and by way of input ports.

In addition, switches allow for the enabling or disabling of the heating and cooling modes of the HVAC unit.

SUMMARY OF THE INVENTION

A thermostat according to this invention is used in a system for monitoring and controlling the condition of air in one or more zones when using a single zone HVAC unit. The improved thermostat can be used in a single zone mode to control an HVAC unit or as a controlling device in a multiple zone mode controlling other thermostats, each of which controls a damper. This multiple zone mode involves the thermostat programmed as a "monitor-stat" to control its own damper as well as the HVAC unit. The thermostat can also be used as a "slave-stat" which operates a damper by use of its own programming and in response to signals from a monitor-stat.

In one aspect of the invention a system for monitoring and controlling the condition of air in a zone within selectively determined operating limits employs a single HVAC unit in which conditioned air passes into the zone via a damper operated by a control means, the damper being in a duct communicating with the zone, and an improved thermostat used for activating and deactivating the damper control means. Such thermostat includes a first circuit responding to input signals for establishing operating limits for the zone for providing a first digital word output signal representative of such limits; second circuit responding to input signals indicative of the actual condition of the air in the zone for providing a second digital word output signal representative of such condition; third circuit responding to output signal from the first and second circuits for providing third digital word output signals for operating the damper control means; and programmable logic means for providing digital word input signals to the third circuit for selectively controlling the operation of the damper control means.

In other aspects the thermostat may also include a first sensor located in the zone for providing an output signal representative of the actual temperature of the zone and such are supplied to the second circuit which provides a second digital word output signal representative of the actual temperature in the zone.

The first circuit is responsive to input signals for establishing the desired temperature in the zone and provides a first digital word output signal representative of the desired temperature therein. The third circuit means is selectively controlled by the programmable logic means for comparing the first digital word representative of zone temperature and the second digital word representative of desired temperature in a zone and thus determines the demand for heating or cooling or no demand in the zone. The thermostat also includes a second sensor located in the duct for determining the temperature therein and which provides an output signal representative of the temperature in the duct. The second circuit is responsive to such output signal from such sensor and provides a fourth digital word output signal representative of the duct temperature. Usually the second sensor is located on an ingress side of the damper in the duct so as to provide temperature data more representative of the air temperature leaving the HVAC unit.

Other aspects relate to the fact that the third circuit is selectively controlled by the programmable logic means for comparing a first digital word representative of zone temperature and a fourth digital word representative of duct temperature and thus determines the desired mode of operation of the damper. The thermostat also receives digital data indicating the operating status of the HVAC unit with the programmable logic means selectively controlling the third circuit in response to the received digital data for operating the damper. Accordingly, the programmable logic means selectively controls the third circuit for operating the damper in the heating mode when duct temperature is greater than zone temperature and operating the damper in the cooling mode when duct temperature is less than zone temperature. The programmable logic means also selectively controls the third circuit for operating the damper in the heating or cooling mode in response to received data indicating that the HVAC unit will be operated in the heating or cooling mode respectively in order to position the damper correctly before the HVAC unit is turned on. The programmable logic means selectively controls the third circuit for operating the damper in the heating or cooling or ventilation mode in response to a comparison of duct temperature, desired zone temperature, and actual zone temperature in response to received data indicating that the HVAC unit is deactivated. The damper will be opened or closed depending upon the conditions in the zone. In addition, the programmable logic means selectively controls the third circuit and operates the damper in the ventilation mode when there is no demand for heating or cooling in the zone or a demand different from that derived from a comparison between actual zone temperature and duct temperature which is within predetermined limits which are also established by the programmable logic means. Further, the thermostat includes circuitry for providing information to peripheral circuits including any digital word signal associated with the first, second, third circuit and the programmable logic means. The thermostat also includes indicating means such as a liquid crystal display for providing data indicative of the information in any digital word signal associated with the first, second, and third circuits and the programmable logic means. The thermostat utilizes data and instructions in digital form and third circuit is selectively controlled by the programmable logic means for comparing a first digital word representative of the actual condition of a zone and a second digital word representative of the desired condition of a zone and determining the desired mode of operation of a damper.

In accordance with this invention the thermostat permits the use of several unique methods for establishing the parameters of operation and calibration of the thermostat and the sensors used to provide data thereto. The first method of controlling the setpoints of the thermostat comprises the steps of establishing the setpoints of the thermostat and selectively disabling the setpoint change function, and the additional step of selectively enabling the setpoint change function regardless of whether the setpoint change function was previously disabled. Calibration of the thermostat, which uses a digital signal representative of the condition of air in a zone, includes the steps of determining the actual condition of air in the zone; monitoring the digital signal; and selectively altering the digital signal until the signal is representative of the actual condition of the air in the zone. Such a method is used where the condition of air in the zone is the temperature of the zone. Calibration of the thermostat, which uses a digital signal representative of the condition of air entering a zone, comprises the steps of determining the actual condition of air entering the zone; monitoring the digital signal; and selectively altering the digital signal until the signal is representative of the actual condition of air entering the zone. The later calibration is used where condition of air in a zone is representative of temperature and specifically for duct temperature.

In another aspect the setpoints of a programmable thermostat having a microprocessor and a memory are controlled by the steps of entering the setpoints of the thermostat in the memory of the thermostat which may be in the form of a digital word; programming the microprocessor of the thermostat to disable the setpoint change function in response to a first input signal which may be in the form of another digital word; and, programming the microprocessor of the thermostat to enable the setpoint change function in response to a second input signal, which may be a third digital word, notwithstanding a first input signal which otherwise disables changing the setpoint function. The condition of air in the zone is the temperature of the zone to be controlled by the thermostat and the setpoints are temperature setpoints.

In a further aspect calibration of a digital temperature signal derived from an analog/digital converter having a logic circuit which receives an input signal from an analog temperature sensor includes the steps of determining the actual temperature by an accurate thermometer at the location of the analog temperature sensor; monitoring the output of the analog/digital converter; selectively manipulating the analog/digital converter using the digital output of a logic circuit to modify the digital output signal of the analog/digital converter until the output signal is representative of the actual temperature at the location.

In another mode of operation of the improved thermostat when functioning as a monitor-stat in a system controlling and monitoring air in a plurality of zones within selectively determined operating limits and also using a single HVAC unit includes a third circuit which is also responsive to output signals from the first and second circuits and provides third digital word output signals for operating the control means of both the damper and the HVAC unit rather than just the damper control, as hereinabove set forth. Such thermostat derives digital data indicating the operating status of the HVAC unit, and the programmable logic means selectively controls the third circuit in response to the digital data for operating the damper. The programmable logic means also selectively controls the third circuit for operation of the damper in the heating or cooling mode in response to derived data indicating that the HVAC unit will be operated in the heating or cooling mode respectively. This provides the anticipatory function of positioning the damper before turning on the HVAC unit.

In this alternate mode of operation as a monitor-stat, the third circuit is also selectively controlled by the programmable logic means for comparing a first digital word representative of zone temperature and a fourth digital word representative of duct temperature for determining the desired mode or operation of the HVAC unit. Such thermostat includes circuitry for deriving digital data indicating the operating status of the HVAC unit and the programmable logic means selectively controls the third circuit in response to the received digital data for operating the HVAC unit with increased stages of heating or cooling as may be required. The programmable logic means is also operatively coupled to the fourth circuit means for selectively modifying the response of the fourth circuit to the output signal of the first circuit for selectively controlling the changing of the operating limits. This is done by having the programmable logic means selectively enable and/or disable the responsiveness of the fourth circuit to changes in output signals of the first circuit, when the changes reflect a desired temperature in the zone, in response to signals received by the fourth circuit from the third circuit. The third circuit receives signals from another thermostat device such as a monitor-stat. In addition, the programmable logic means modifies the response of the fourth circuit to the output signals of the first circuit representative of desired temperature in response to an input signal representative of real time data from a peripheral circuit such as a monitor-stat or a clock received by the fourth circuit from the third circuit. This feature allows the thermostat's operating setpoints to be changed during different times-of-day or for given weekdays. The programmable logic means also provides to the fourth circuit a second set of operating limits including the heating set-up and/or cooling set-back temperature ranges for a time period when a zone is not occupied. The first circuit is used to vary the heating set-up and/or cooling set-back temperature setpoints to any desired value within the temperature ranges established by the manufacturer. Additional features include the calibration of the zone and duct temperature signals by selectively varying a second digital word output signal to indicate the zone or duct temperature actually registered on an accurate thermometer in the zone employed by an installer. The second circuit also includes selectively adjustable logic means for providing a temperature output signal in °C. or °F. to the liquid crystal display. The improved monitor-stat can also be used to operate an HVAC unit without a damper in a single zone mode of operation. The programmable logic means also selectively controls the third circuit for deactivating an HVAC unit when duct temperature exceeds predetermined operating limits such as high and/or low temperature limits on the unit. This feature is available whether the monitor-stat is being used in a single zone mode or in a multiple zone mode. The operating limits are predetermined for a Gas/Electric or a Heat Pump and stored in the programmable logic means.

DETAILED DESCRIPTION OF THE DRAWINGS

The novel features which are believed to be characteristic of this invention are set forth with particularity in the appended claims. The invention itself, however, both as to its organization and method of operation, together with further objects and advantages thereof, may best be understood by reference to the following description taken in connection with the accompanying drawings in which:

FIG. 1 is a front elevational view of the thermostat in accord with this invention;

FIG. 2 is a pictorial diagram of the thermostat in accord with this invention used as a monitor thermostat;

FIG. 5 is a detailed schematic diagram of the circuitry of FIG. 4; and

FIG. 6 is a functional block diagram of the general purpose interface employed in the thermostat.

DETAILED DESCRIPTION OF THE PREFERRED EMBODIMENT

Figure 3:
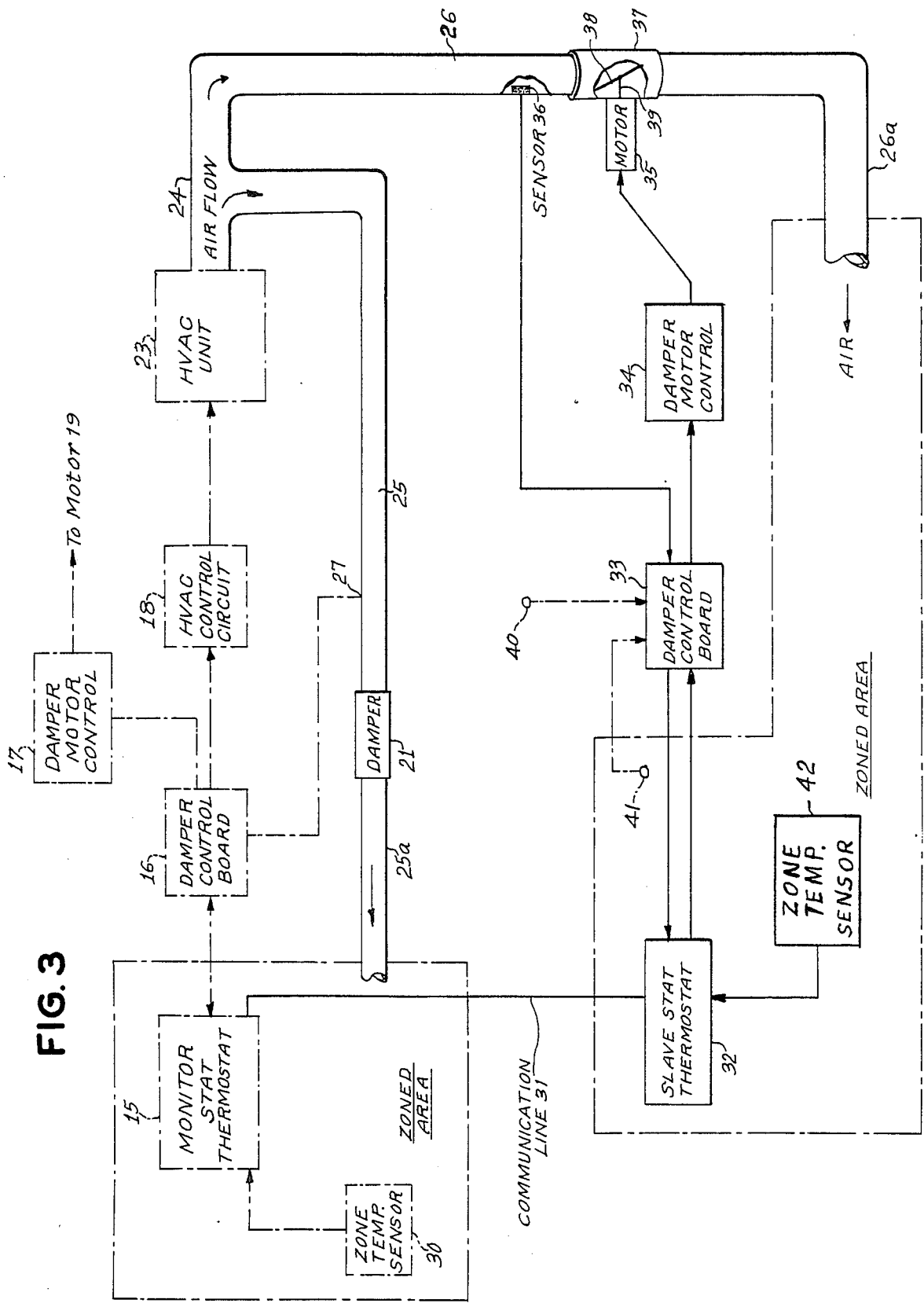
FIG. 3 is a pictorial diagram of the thermostat in accord with this invention used as a slave thermostat.

Referring now to the drawing, a thermostat is shown generally by numeral 10 in FIG. 1. The thermostat 10 has a removable front cover 11 and a front display panel 12 comprising a cutout section 12A for viewing a liquid crystal display 13 and four resilient portions 12b, 12c, 12d, and 12e for operation of four switches located below the cover 12 and shown in FIG. 4: S1 and S2 for Cool setpoints "UP" and "DOWN" respectively and S3 and S4 for Heat setpoints "UP" and "DOWN" respectively. In normal operation, the setpoint for initiation of the cooling function is displayed in the upper left hand section of display 13 and the setpoint for initiation of the heating function is displayed in the lower right hand section. Adjustments of the heating and cooling setpoints are made by depressing switches S1–S4 as desired. An optional space 14a may be provided for a clock 14 on the monitor thermostat.

Referring now to FIG. 2, a thermostat 10 is used to control a zoned area. The monitor thermostat 15 sends a damper command word to a damper control board 16 where control signals are generated for the relays in damper motor control 17 or HVAC control unit 18. The motor 19 is a precision stepper motor which operates an elliptical blade 20 in damper 21 via a control arm 22. HVAC control unit 18 is comprised of relays which operate HVAC unit 23. The HVAC unit 23 supplies air into main duct 24 where it branches into zone ducts 25, 26. Duct temperature sensor 27, located in the duct 25 upstream of damper 21, supplies a signal to damper control board 16 which in turn, routes the signals to the monitor thermostat 15. Damper control board 16 also routes signals from other optional sensors 28, 29 located in or out of the zoned area. For example, sensor 28 may monitor zone humidity and sensor 29 may monitor air temperature outside of a building. Zone temperature sensor 30, which may be located any where in the zoned area, provides a signal directly into monitor-stat 15. Air via duct 26 may also be supplied to another zone controlled by a slave thermostat 32 which can operate a damper (not shown) via damper control board 33. If the monitor-stat 15 is used only in a single zone application, the damper 21 and its associated controls would not be required.

FIG. 3 illustrates a slave-stat 32 which sends a damper command word to damper control board 33 which in turn generates a control signal to operate the damper motor control 34 which contains relays to operate precision stepper motor 35. Damper 37 has an elliptical blade 38 moved by control arm 39. HVAC unit 23 is controlled by monitor-stat 15 via damper control board 16 and HVAC control circuit 18 and supplies air to a main duct 24 where it branches into zone ducts 25, 26 for supplying air to the zoned areas, as hereinabove set forth. A duct temperature sensor 36 supplies a signal to damper control board 33 where the signal is routed back to slave-stat 32. Additional sensors 40, 41 may also be used to, for example, monitor air pressure, humidity, etc. either in or outside the zone. The slave stat 32 sends data to and receives data from monitor-stat 15. As before, the thermostats 15, 32 receive zone temperature data directly from sensors 30, 42 respectively. A given monitor-stat 15 can control as many slave-stats 32 as are needed in a given application.

As will be more fully explained below, a given monitor-stat 15 can itself be controlled by higher intelligence such as a computer system (not shown). Communication line 31 represents the communication network between the monitor-stat 15 and a slave-stat 32.

Figure 4:
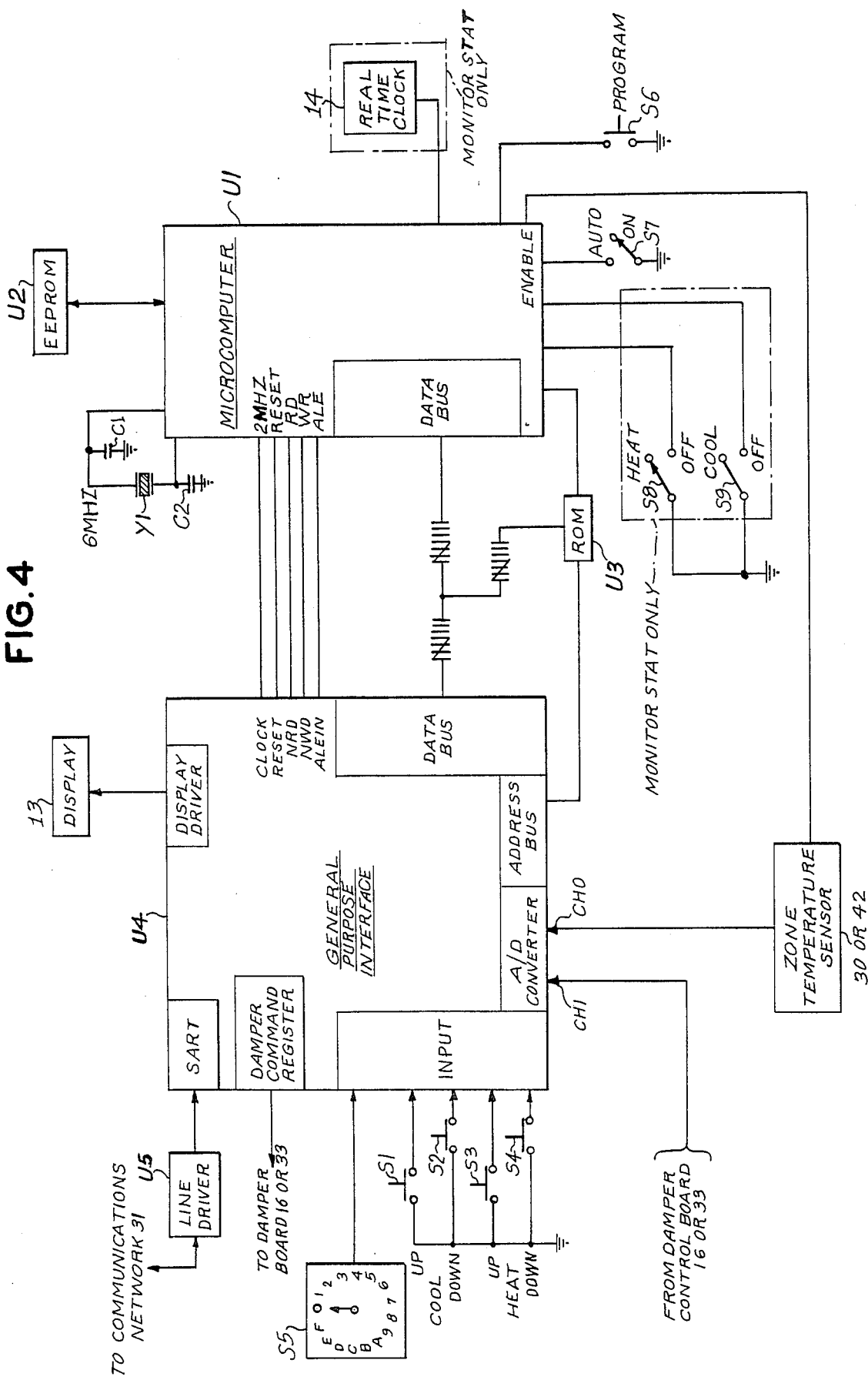
FIG. 4 is a simplified schematic diagram of the circuitry employed in the present invention.

Referring now to FIG. 4, a simplified schematic diagram of the thermostat 10 is illustrated. The thermostat electronics comprise a conventional microcomputer U1 clocked at 6 Mhz by way of crystal Y1 and capacitors C1 and C2. U1 has internal memory that is supplemented by programmable logic circuits consisting of a 256-bit electronically erasable programmable read only memory (EEPROM) U2 and read only memory (ROM) U3 which contains instruction codes and fixed data. U2 and U3 will be more fully explained hereinbelow.

General Purpose Interface (GPI) U4 provides for a number of interface circuits including a serial asynchronous receiver/transmitter (SART), a 10-bit A/D converter, a liquid crystal display driver, and other logic circuits which are combined in a 68-pin integrated chip for many reasons including space, expense, and reliability. The circuits in U4 are of conventional design and a functional block diagram of the GPI U4 is shown in FIG. 6.

In the preferred embodiment of the thermostat 10, GPI U4 and microcomputer U1 are connected by thirteen lines: 8 data lines; an address latch enable (ALE); a write control ($\overline{WD}$); a read control ($\overline{RD}$); a reset line; and a clock output supplying 2 Mhz to U4.

U4 receives analog temperature data from a zone temperature detector 30 or 42. The detector 30 or 42, which can be located at the thermostat 10 or at a remote location in the zone, is a current source with a 1.0 ua/°K output which is received by the A/D converter in U4. The data is then sent to U1 in digital form.

The sensor 30 or 42 is enabled via a signal from U1 in response to control algorithms in U3 and is sent to U4 at input "CH0" (channel 0).

As discussed above the thermostat 10 may control a ventilation damper 21 or 37 by way of a precision stepper motor 19 or 35 and an HVAC control 18 via relays. U1 transmits an 8-bit command word into U4 where it is framed to an 11-bit word and transmitted to the damper control circuitry 16 and 33 by synchronous transmission. The transmission is clocked by way of division of the 2 Mhz clock signal received from U1 down to 9600 Hz. As explained below, the damper command word contains information which can be used to select analog signals located on the damper control board 16 or 33 for A/D conversion in U4 and also for control of a HVAC unit 23.

The monitor-stat 15 has provision for physically mounting a real time clock 14 in the housing 11. If this option is desired, a housing cover 12 will have a cutout portion 14a for viewing the integral display face of the clock 14.

The present invention employs the concept of firmware engineering in the design of the thermostat 10. The basic approach is to build a single thermostat 10 that can be used with other devices in a master-slave relationship. One thermostat 10 is chosen as a master or "monitor-stat" 15 and the others are "slave-stats" 32. The thermostat 10 has control algorithms or programs in U3 for purposes of, among other things, transmitting and receiving data from other thermostats 10 or devices. In addition, and quite importantly, this design allows a monitor-stat 15 to operate a single zone HVAC unit 23 in a single zone mode of operation where zoning is not required and to control a ventilation damper 21 based upon information associated with its own zone in a multiple zone system.

A description of the programming and operation of the thermostat 10 will illustrate the unique features of the present invention.

PROGRAMMING THE THERMOSTAT

1. Zone Number

In order for a monitor-stat 15 to communicate with one or more thermostats 10 functioning in a slave capacity as slave-stats 32, it is necessary to establish the identity of any given thermostat 10 or device so that data can be associated with a given device.

The zone number of the thermostat 10 is established by way of S1-S4 and S5. S5 is a 16-position rotary switch which supplies a 4-bit binary coded decimal word to the input bus of U4. The use of a BCD word and switches S1-S4 allows for the creation of an 8-bit input word. The normal position of S5 is "0". With in position "1", the zone number will be displayed on display 13. S1 can be used to raise the number, S2 can be used to lower the number. The monitor-stat 15 in any given application is always given the highest number as a matter of firmware design. The zone number is placed in EEPROM U2 via U1.

2. Single Zone or Multiple Zone Mode

The thermostat 10 can be used for a single zone thermostat or it can be used as the monitor-stat 15 in a multiple zone mode that employs a number of slave-stats 32. When S5 is in position "1" the display 13 will be illuminated with the word "ON" or "OFF". When the display 13 shows "OFF" the thermostat 15 is in the single zone mode and does not require data inputs from other devices in order to control the given zone When the display 13 indicates "ON" the thermostat 10 is enabled for use as the monitor-stat 15 in a multiple zone system. Either of switches S3 and S4 can be used to toggle the function on or off. When the multiple zone mode is enabled ("ON"), firmware via U3 is used to control the system based upon data received from other sources. In either case the monitor-stat 15 is responsive to its own data being supplied y its own sensors.

3. Program Periods

A monitor-stat 15 has the capability of receiving data from a real time clock 14 by way of pins on U1. As far as the system operation is concerned, U3 instruction codes divide time into two categories. First is Period I and Period II which represent days of the week. With S5 in position "2", switches S1 and S2 can be used to raise or lower the number associated with the beginning day of Period I. Each day of the week has been assigned a number beginning with Monday=1 and ending with Sunday=7. The display 13, with S5 in "2", will show the beginning and ending day of Period I. S3 and S4 are used to set the ending day. Thus, a "2" and "6" displayed indicates that Period I is Tuesday through Saturday. The instruction codes automatically establish Period II as the remainder of the week (i.e., Sunday through Monday).

The second category of time is the time of the day. This feature employs the use of RAM in U1 and will be discussed hereinbelow.

4. Celsius/Fahrenheit Data Display

A relatively straightforward algorithm is used to allow the display to present data in either °C. or °F. The display 13 will alternate between "F" or "C" when S1 or S2 is depressed with S5 in position "3".

5. Set-up/Set-back Setpoints

In many applications it is desirable to establish heating and cooling setpoints for occupied conditions and have different setpoints for times when the zone is not occupied. Set S5 to position "4". The cooling set-up setpoint will be displayed when S1 is depressed to raise the cooling setpoint to 1° F. greater than the 66°–80° F. range set in U3. Thus, raising the cooling setpoint to 81° F. with S5 in "4" will display the set-up setpoint which can then be adjusted to any point between 81°–96° F. Similarly, adjusting the heating setpoint to below 66° F. will display the heating set-back setpoint which can be adjusted using S3 and S4 to between 50°–65° F. The programmed set-up/set-back setpoints are used in conjunction with firmware and are necessarily time dependent as will be described hereinbelow.

6. Zone Temperature Calibration

With switch S5 in position "5", switches S1 and S2 can be used to adjust the calibration of the A/D circuitry which receives signals from zone sensors 30 and 42. The calibration is accomplished using a reference thermometer. The A/D circuit supplies an 10-bit word for the temperature (2 bits for the most significant bit, MSB, and 8 bits for the least significant bit, LSB). A 2-bit calibration word, 1 bit for MSB, 1 bit for LSB, is entered in the U2 EEPROM for use in modifying the temperature word so that the temperature reading on the display 13 is the same as that read on a reference thermometer. This data is provided to U4. A calibration word placed in U2 will modify the A/D output signal representative of temperature so that the exact temperature will be used in the circuitry. The calibration word is modified by S1 and S2 until the temperature displayed on display 13 is the same as that on the reference thermometer.

7. Duct Temperature Calibration

The system employs duct temperature sensors 27 and 36 upstream of the dampers 21 and 37, respectively. With S5 in position "6", S1 and S2 can be used to calibrate duct temperature in the same manner as utilized in zone temperature calibration.

The technique utilized in the calibration of zone and duct temperature can be used with any analog sensor supplying an input to U4 with the addition of appropriate programming of U2 calibration words and instructions.

8. Ventilation and Maximum Damper Positions

The monitor-stat 15 receives data by way of driver U5 and GPI U4 SART. As will be explained in more detail below, the monitor-stat 15 determines whether the system (the HVAC unit 23 and the dampers 21, 37) should be in a heating or cooling mode by analyzing the demand for heating/cooling in each zone. This demand is defined as the difference between the zone setpoints and actual zone temperature. If there is not sufficient demand for heating or cooling the dampers 21, 37 are placed in "ventilation" mode. Set S5 to "7" and the damper ventilation mode position data will be displayed on display 13. Switches S3 and S4 are then used to set the damper 21, 37 from 0% open (Display="0") to 50% open (Display="7").

Also in position "7", the maximum open position of the damper 21, 37 can be adjusted using switches S1 and S2 between 100% open (Display="15") to 50% open (Display="8").

9. Setpoint Lock/Override

A unique feature of the present invention is the ability to lock the zone temperature setpoints via the system firmware. With S5 in "8", either S1 or S2 can be depressed to alternate the words "ON" or "OFF" on display 13. When "ON" is displayed at the monitor-stat 15, all zone temperature setpoints on slave-stats 32 are locked as set. "OFF" allows zone temperature setpoints to be adjusted at each of the slave-stats 32.

The slave-stat 32 also has provision for override of the locking feature of monitor-stat 15. By placing the slave-stat switch S5 in position "8", depressing S1 and S2 will cause the words "ON" or "OFF" to be alternately displayed at the slave-stat 32 and when "ON" appears, the lock feature of monitor-stat 15 is overridden at the particular slave-stat 32.

10. Local Setback Control and Time-Of-Day Program

Set switch S5 to position "9". The pressing of either S1 or S2 will alternate the words "ON" and "OFF" on display 13. When "ON" is displayed, a slave-stat 32 will operate on its own programmed set-back times. When "OFF" is displayed, a slave-stat 32 will operate on the setback times of the monitor-stat 15.

For the monitor-stat 15 the use of "ON" results in the monitor-stat 15 following its own set-back times as might be the case when the monitor-stat 15 is in a single zone control mode. When "OFF" appears, the monitor-stat 15 will follow time commands from another device such as a computer command center, or other device such as another monitor-stat 15.

With switch S5 in "0" the set-back times can be programmed. Program switch S6 is depressed and fan switch S7 can be placed in "auto" to represent period I (as programmed earlier, see 3. Program Periods, above). Now, if both S3 and S4 are depressed simultaneously, the last program (stored in U1) will be erased. Switch S1 is used to advance time. "ON" will be displayed in the upper left hand corner of display 13. "AM" will be displayed in the lower right hand corner. Time is advanced, hourly, until the desired hour is displayed. Either switch S3 or S4 can be depressed to indicate "OFF". S1 can then be depressed to display the time of day that setback should occur. The thermostat 10 is now programmed to follow the cooling/heating setpoints between the "ON" and "OFF" times and revert to the cooling set-up/heating set-back setpoints as previously established at the "OFF"time, i.e., when the comfort or occupied function is "OFF" the set-back feature is operative.

If switch S3 is now depressed, the word "ON" will appear and a second set-back time period can be programmed as before. Depress program switch S6 and the Period I setback times are entered.

To program for Period II, set S7 to "ON" and depress S6. Period II set-back times can now be programmed as were Period I times.

U1 can receive real time data by way of pins P15 and P16. In addition, the use of control algorithms and switches S1–S4 and S5, S7 allows for the creation of distinct time periods (1) Period I and Period II having to do with the days of the week; and (2) at least two distinct time periods of a given day. With the use of the real time data, the desired temperature becomes time dependent as it is now associated with a given time period.

11. Information Display

With S5 in position "A", S1 and S2 can toggle "ON" or "OFF" the Information Display option. If the display 13 is "ON" then, when both S1 and S2 or S3 and S4 are simultaneously depressed with S5 in "0" (Normal), the room temperature will be displayed (as usual) followed by time-of-day (if available), duct temperature and damper position (desired/actual), in that order. In addition, air pressure and air velocity in the ducts 25, 26 can be displayed if the appropriate sensors are installed.

12. High/low Temperature Limits

The rotary switch S5 is placed in position "B". Depressing either S1 or S2 will alternate the words "GE" (for Gas/Electric) or "HP" (for Heat Pump) on display 13. The monitor-stat 15 is programmed to automatically shut down the first and/or second stages of heating or cooling if certain temperature limits are exceeded. The trip points are different for Gas/Electric or Heat Pump applications. Selection of "GE" or "HP" depends upon the type of HVAC unit 23 used.

Either switches S3 and S4 can be used to alternate "ON" or "OFF" to allow the High/Low temperature trip points to be turned on or off. The monitor-stat 15 constantly receives, preferably every 20 seconds, duct temperature data from all zones via the slave-stats 32. A single High or Low duct temperature reading is sufficient to activate the setpoint trip.

13. Outside Air Temperature

In systems using heat pumps it is desirable to limit set-back when outside temperature gets too cold because heat pumps become inefficient at low temperatures. Electric resistance heating can be used but is expensive. Accordingly, it might be advisable to override set-back when recovery from the set-back temperature requires electric resistance heating because the heat pump is inefficient at the given air temperatures.

In the preferred embodiment of the invention the monitor-stat 15 will override set-back when an optional outside temperature sensor 29 indicates 30° F. or lower.

The enabling or disabling of the outside air temperature sensor function is accomplished by placing S5 in position "C" and pressing either S3 or S4 to toggle "ON" or "OFF" on the display 13.

14. System Demand

The monitor-stat 15 receives information from the slave-stats 32 every 20seconds. Data received includes the heating/cooling setpoints and zone temperature. Sufficient zone demand to activate the HVAC unit 23 is defined as any zone having a temperature more than 1.5° F. from the setpoint (in the appropriate direction). The monitor-stat 15 will place the system in a heating or cooling mode depending upon the number of zones indicating sufficient zone demand. With S5 in position "C" the system demand number is displayed. Switches S1 and S2 can be used to adjust between 1 and 4 zone demands needed to establish system mode.

15. Communications Check

With S5 in position "D", the depressing of S1 or S2 will initiate a communication check between each slave-stat 32 and the monitor-stat 15. The zone number of each slave-stat 32 will be momentarily displayed along with a data word indicating whether the slave-stat 32 is a "cooling caller"; "heating caller"; a "cooling" or "heating" reference; or has a specific demand. The system status will be explained below in the System Operation.

16. Supplementary Heat

For a number of reasons usually dealing with the specific building construction and location, supplementary heat such as baseboard heaters might be desirable. With switch S5 in position "E", switches S1 or S2 can be used to toggle the option "ON" or "OFF". Supplementary heat works in conjunction with an outside temperature sensor 29 in a special mode of operation that need not be further discussed herein.

17. Time Guard Override

This feature involves S5 in position "F" and the toggle "ON" or "OFF" of a function to override a built-in time delay associated with cycling of the HVAC unit 23.

As can be understood from the above descriptions of the programming of the thermostat 10 and the electronic circuits involved, the approach that is used in design of the thermostat 10 allows for maximum capability of the system in which it is used. Further, the thermostat 10 needs only switch connections S8 and S9 to enable heating and cooling control in the master or monitor-stat 15 function. The programmable logic of U2 and U3 supplies the fixed data and instruction for operation of U1 as a monitor-stat 15 or a slave-stat 32 with the associated programmed operations.

The monitor-stat 15 controls both a damper 21 for its zone and the HVAC unit 23 supplying the system. U1 generates an 8-bit damper command word which is modified for synchronous transmission by GPI U4. In the preferred embodiment of the invention, the most significant bit (MSB) of the damper command word is different for (1) control of damper 21 or (2) control of HVAC unit 23. Switches S8 and S9 provide data inputs into U1 to assist in the creation of a MSB of the damper command word that is recognized by control circuitry as that associated with the damper 21 or the HVAC unit 23. Referring now to the detailed schematic of FIG. 5 the operation of the thermostat 10 will be described more fully.

SYSTEM OPERATION

The heating and cooling setpoints are entered into the memory of U1 via switches S1–S4 and S5 and GPI U4 as discussed above. Actual temperature in the zone associated with the thermostat 10 is derived from sensors 30 or 42 and can be read by manually simultaneously depressing S1–S2 or S3–S4. Instructions derived from U3 will cause data representative of the actual and desired temperatures to read into U1. A comparison of the two temperatures results in the creation of a signal representative of the demand for heating or cooling or no demand in the zone. Instructions in U3 in the monitor-stat 15 predetermines that a 1.5° F. or greater difference between actual and desired temperature is necessary before there is sufficient demand to generate the signals for operation of the system in the heating or cooling mode by activating the HVAC unit 23. If there is sufficient demand, U1 will generate an 8-bit damper command word which is sent to U4 via the 8 data bus lines. The 8-bit word is framed to 11 bits for synchronized transmission to the damper control circuitry. The MSB of the word is recognized by the control circuitry in damper control board 16 as being for operation of the damper 21 or 37. After a time interval of, for example, 30 seconds which is established by code in U3, the damper command word is modified to have a MSB that is recognized by the control circuitry as being for operation of the HVAC unit 23. As before, the damper command word is transmitted to the damper control circuitry which can operate the HVAC unit control circuit 18. As mentioned above, U3 code includes control algorithms for operating either a Gas/Electric or heat pump as programmed. This feature sets temperature limits for safe operation of the system and proper levels of additional heating or cooling as appropriate.

If the HVAC unit is not energized, U1 in the thermostat 10 compares actual temperature in the zone with duct temperature. The duct temperature sensors 27, 36 are located adjacent the inlet of the dampers 21, 37 supplying air to a given zone. In the preferred embodiment of the invention, the duct temperature sensors 27, 36 send a signal to circuitry associated with damper control boards 16, 32. This data is received by U4 on Channel 1 (CH 1) along with other information that is developed remotely. This data undergoes A/D conversion as does the zone temperature from sensors 30, 42.

If the duct temperature is lower than actual zone temperature the thermostat 10 will operate the associated dampers 21, 37 in the cooling mode. If the duct temperature is above the actual temperature, the associated dampers 21, 37 are operated in a heating mode. That is to say, the dampers 21, 37 are operated as though the HVAC unit 23 was supplying the hotter or cooler air. Consider the case where actual temperature is below the heating setpoint with duct temperature also below the actual temperature: A. the particular zone has demand for heating but is in the cooling mode; B. accordingly, the dampers 21, 37 are closed; C. however, if the duct temperature was above the actual temperature, i.e., heating mode, the damper 21, 37 will open proportionally to the level of demand as computed by a comparison of actual zone vs. setpoint temperatures.

If the demand for heating or cooling is 1.5° F. or greater, the monitor-stat 15 will activate the HVAC unit 23 as desired. A damper command word is generated, for example, cooling, and the dampers 21, 37 are placed in the cooling mode regardless of the duct temperature comparison discussed above. If the zone has an actual temperature below the heating setpoint, the dampers 21, 37 will be closed in anticipation of activation of the HVAC unit 23 in the cooling mode. If the actual temperature is above the cooling setpoint, the dampers 21, 37 will be positioned open. U1 in monitor-stat 15 now generates an output damper command word for activating the HVAC unit 23 in the cooling mode.

If the monitor-stat 15 is operating in the multiple zone mode, instruction codes in U3 will not generate the damper command words for operating the dampers 21, 37 and HVAC unit 23 unless the number of zones with 1.5° F. or more demand in a given mode is equal to or greater than the system demand number that has been selected as discussed above.

The monitor-stat 15 also uses duct temperature directly to determine if additional stages of heating or cooling are required in a given mode. For example, if duct temperature is not below 55° F. when the system is in a cooling mode, the damper command word will contain information that will cause HVAC control circuitry 18 to energize an additional stage of cooling. The additional heating or cooling functions derive from codes in U3. Finally, duct temperature is used directly for high/low temperature trips of the HVAC unit 23 for safe system operation.

1. Communications

In the preferred embodiment of the present invention, the SART in GPI U4 is used for communication with peripheral circuits. Input data from the SART and data switches S1–S4 and S5 is placed in registers in U4 which can be read by U1. U4 also contains an 8-bit address bus for accessing microcode in U3.

Collision avoidance for the communications network 31 is accomplished by load resister R6 which monitors the current required by line driver U5. Q3 is turned on by line current through R6 and an Interrupt ($\overline{INT}$) signal is placed on pin 6 of U1. Capacitors C5 and C6 filter noise which might otherwise result in false collision detection indications.

2. Watchdog Functions

U4 also performs watchdog functions to insure proper operation of the thermostat 10. A voltage divider of R15 and R16 applies a signal to pin 57 of U4. When and if the voltage is too low, U1 is disabled by a signal on the reset line between U1 and U4. U4 also receives timing data from U1. If the proper timing data is not received, U1 will be disabled via the reset line.

3. Digital Functions

An important feature of the thermostat 10 is the exclusive use of all data in digital form. For example, the heating and cooling setpoints are entered into U4 by switches S1–S4 and S5. The SART in U4 also places incoming information on the same registers used for setpoint input. As mentioned above, firmware in conjunction with the programming allows for setpoint lock from the monitor-stat 15 to a slave. Further, there is provision at the slave-stat 32 for override of the remote setpoint lock feature. This is made possible by the use of digital data format.

Also, analog temperature data is converted into digital form in the A/D converter in U4. The digital form allows for calibration of the data by way of the software because each temperature interval is a binary word. A calibration binary word can be placed in U2 for calibration using S5 in position "5" or "6". Similarly, other remote data can be accessed by the thermostat 10. Data in analog form can be enabled via the instruction codes and converted to digital form in U4. For example, in the preferred embodiment of the thermostat 10, various analog data is accessed by way of the damper control circuitry 16,33. By modification of the damper command word, different remote data can be enabled and received at CH 1 of U4. Because the enabling was done via U1 command word generation, the incoming data is easily identified and properly processed.

The use of digital data allows for the transmission of any information at a thermostat 10 to any higher intelligence as well as the reception of data for processing and control. Also, the thermostat 10 has internal diagnostics and system failures can be identified by data presented on display 13. For example, failures having to do with the setback setpoints is identified as "SF 2". A hardware failure might be "HF 16": zone temperature sensor out of range.

Finally, real time data can be received by monitor-stat 15 in digital form. This data can be transmitted by way of U4 SART for supplying data representative of time to other peripheral circuits such as a slave-stat 32. This function is used in the set-up/set-back setpoints and time periods as discussed above. Also, because of the digital nature of all data, the time inputs may be simply "ON" or "OFF" signals derived from an electromechanical timer using simple relay contacts that are either opened or closed at a given time.

Liquid crystal display 13 is a conventional tri-plexed display driven by U4 and used for local indicating means for data display.

If the monitor-stat 15 has been programmed for multiple zone use, the level of demand from each zone is read by receiving the actual deviation of room temperature from setpoint temperature. In the preferred embodiment of the invention, all thermostats 10 are specifically designed to compute the level of demand rather than simply exchange a "YES" or "NO" signal. This feature allows the monitor-stat 15 to compare the level of demand in each zone and select the zone with the greatest demand as the reference zone. Other thermostats 10 are "heating callers" or "cooling callers" if demand for heating or cooling exists in the given zone. The thermostat 10 will operate the HVAC unit in the appropriate mode until the reference is within 0.5° F. of the setpoint. For example, the system demand number may be "3" thus requiring 3 zones to have a similar demand for heating or cooling before the heating or cooling mode is selected but the mode once selected will remain in effect until the reference zone is satisfied.

Once the reference zone is within 0.5° F. of the setpoint, the monitor-stat 15 will generate the appropriate damper command word to deactivate the HVAC unit 23 via HVAC control circuit 18. Assume that cooling was being supplied and the HVAC unit 23 is deactivated. The duct temperature at each zone will be below actual temperature. Thus, the comparison between duct and zone temperature will result in the monitor-stat 15 placing its damper 21 in the cooling mode. As a matter of design, each slave-stat 32 will also position its damper 37 in the cooling mode.

With the HVAC unit 23 deactivated, duct temperature will gradually increase. If duct temperature rises above zone temperature, the thermostat 10 will operate its damper in the heating mode. As a matter of design, the heating and cooling setpoints are established by U3 to be within 65°–80° F. If duct temperature is within the range 65°–80° F. and there is no demand or demand different from the mode created by the duct/actual comparison, the dampers 21, 37 is placed in the ventilation mode. In the above example, where cooling was being supplied, the dampers 21, 37 will remain in the cooling mode because actual temperature will probably be above the cooling setpoint due to the ambient heat sources that caused temperature to increase in the first place.

In the preferred embodiment of the present invention, power is directed to a thermostat 10 from its respective damper board 16 or 33 via a 12- conductor ribbon having terminals T1–T12 for power input and communications therebetween. Voltage regulator U6 is a conventional device for supplying a regulated +5 vdc to various circuit points. Another voltage of +9.3 vdc is also supplied from damper boards 16, 33. As is understood in the art, the completed circuit illustrated in FIG. 5 comprises filter capacitors and resistors for signal isolation and noise suppression and the like. Terminals T11 and T12 are the connection points used if zone temperature sensors 30, 42 are located in the zone instead of physically connected to the housing 11 of the thermostat 10. Transistors Q1, Q2 and associated components are used to enable the sensors 30, 42.

In accordance with the present invention the thermostat 10 can be used in the capacity of a monitor-stat 15 which essentially controls the system with a number of slave-stats 32 or as a monitor-stat 15 which is controlled b higher intelligence. The monitor-stat 15 controls its own zone conditions and the conditions in each other zone is controlled via a slave-stat 32. Each thermostat 10 operates dampers 21, 37 in the ducts 25, 26 that directs air into the zone. The monitor-stat 15 can also control an HVAC unit 23. Importantly, the monitor-stat 15 can operate in a single zone mode without a damper 21 by simply controlling the operation of an HVAC unit 23.

The major distinctions between a thermostat 10 used as a monitor-stat 15 and as a slave-stat 32 are (1) the monitor-stat 15 has the instruction codes and data in U3 for operation as a master controlling device; (2) the monitor-stat 15 has provisions for a real time clock input data and the programming to make use of such data; (3) the monitor-stat 15 has heat switch S8 and cool switch S9 for operation of an HVAC unit 23; and (4) the monitor stat 15 has additional programming capability due to codes stored in U3. These features allow the monitor-stat 15 to receive, process and transmit information to one or more slave-stats 32. In addition, the monitor-stat 15 can receive and transmit information to higher intelligence. Thus, a plurality of monitor-stats 15 each associated with its own HVAC unit 23 and a group of slave-stats 32 may be under control of a central computer system. Furthermore, because a monitor-stat 15 can operate in a single zone mode as well as in multi-zone mode, there is virtually unlimited flexibility in overall system design for use of such thermostat 10.

The features of the thermostat 10 used respectively as a monitor-stat 15 and a slave-stat 32 are as follows:

Each thermostat 10 is programmed for zone number; programming periods; °C. or °F. display; set-up/set-back setpoints; calibration of zone temperature sensor; calibration of duct temperature sensor; and damper travel limits/ventilation mode travel limits. The monitor-stat 15 can be programmed to lock slave-stat 32 setpoints; the slave-stat 32 can be programmed to override this lock feature. The slave-stat 32 can be programmed to follow the set-back times of another device or to follow setback times programmed at the slave-stat 32. The monitor-stat 15 may be programmed to follow its own set-back times or to follow those of a higher intelligence. The monitor-stat 15 alone has the following programmable features: (1) the high/low temperature limits set in U3 are made operational by establishing that the HVAC unit 23 in use is Gas/Electric or Heat Pump; (2) the system demand number; (3) the communication check feature; and (4) the supplemental heat/time guard override features. The monitor-stat 15 alone also has the capability to receive real time data directly and such information can be transmitted to all slave-stats 32 via the SART in the monitor-stat 15.

The general design of the thermostat 10 employs digital words and programming to accomplish the various tasks. The characterization of the thermostat 10 as a monitor-stat 15 or slave-stat 32 is done by way of the instruction codes in U3 and, in the case of the monitor-stat 15, the addition of "heat" switch S8 and "cool" switch S9 to U1 and the provision for a real time clock input signal to U1 from clock 14.

The system employs a first circuit subsystem comprising switches S1–S4 and S5 which provide 8-bit digital words into U4 for establishing the desired operating limits, such as temperature setpoints. In addition, switches S1–S4 and S5 are used in the programming of the thermostat 10 by providing digital words to EEPROM U2 and accessing digital words contained in U3 for use in sensor calibration; for establishing the minimum and maximum damper position in a given mode (ventilation, heating, cooling); and for establishing the applicability of the high and low temperature trips for given type of HVAC unit 23 (Gas/Electric or Heat Pump).

A second circuit subsystem receives sensor data indicative of the actual condition of the air in a zone (temperature, pressure velocity, etc.) and such data is received directly by U4 in the case of actual temperature and indirectly from the damper control circuitry 16, 33 with regard to duct temperature, and, if needed, air pressure, velocity, humidity, and outside air temperature. The A/D converter in U4 will provide a 10-bit digital word output that is representative of the analog data received from such sensor.

A third circuit subsystem represented by microcomputer U1, receives digital word inputs from U2 and U4 that represent programmed data and actual data with regard to the operating conditions of a given zone. U1 will provide a digital word output in response to data received from U2, U4 and its own RAM for operating the dampers 21, 37 and, in the case of the monitor-stat 15, for operating the HVAC unit 23.

A fourth circuit subsystem represented by the programmable logic of U3 and U2 provides digital word data to U1 for controlling the dampers 21, 37 and/or the HVAC unit 23.

In accord with this invention, there are some overlaps of the first, second, third and fourth circuit subsystems for reasons of simplicity, cost and reliability. For example, the RAM in U1 is used in programming the time-of-day associated with set-up/set-back setpoints in conjunction with S6 as a matter of convenience while EEPROM U2 is used for (1) device address/zone number; (2) standard setpoints; (3) setback setpoints; (4) open/close damper travel limits; (5) setback programs, periods I, II; (6) zone temperature calibration words; (7) various options such as (a) lock/override; (b) HVAC type; (c) temperature readout selection in °F. or °C.; and (d) local or remote setback control. This particular circuit combination allows the user to change the time-of-day associated with setback without accessing U2 via S5 and thus inadvertently altering the programs established by the installer of the thermostat 10. In the preferred embodiment of the invention, a physical barrier is placed over S5 which should be removed only by an installation technician to minimize such alterations.

In the preferred embodiment of the present invention, second temperature sensors 27, 36 are used to measure duct temperature. The sensors are placed upstream of the dampers 21, 37 supplying a given zone. The analog signal is sent from the damper control boards 16, 33 to the A/D converter in U4 via CH 1. U4 provides a digital word output representative of the duct temperature. U3 contains instructions which cause U1 to compare the digital word received from U4 representative of actual temperature with the digital word, also from U4, representative of duct temperature. The result of the comparison in U1 is then used, in conjunction with instructions in U3 regarding mode, to determine the desired mode of operation of the dampers 21, 37, i.e., heating or cooling. The instructions contained in U3 are written to allow time, about 30 seconds, for operation of dampers 21, 37 prior to activation of a HVAC unit 23. In addition, the dampers 21, 37 are placed in a mode coincident with that of the HVAC unit 23. Accordingly, digital words indicative of the status of the HVAC unit 23 as well as the desired status of the unit 23 (i.e., desired mode) are generated and supplied to a slave-stat 32 via the SART in U4. In the case of a monitor-stat 15, U1, of course, generates the desired mode digital words itself by a comparison of duct and actual temperature of its own zone for its own use in addition to transmitting the digital words to various slave-stats 32 via the U4 SART. The monitor-stat 15 may cause the energization of additional stages of heating or cooling if duct temperature does not reach a predetermined point within a given time interval of about 5 minutes after the HVAC unit 23 is activated in a given mode. The predetermined duct temperature limits associated with additional HVAC unit 23 stages of heating and cooling are contained in U3. HVAC unit 23 type data is contained in U2 in the form of digital words so as to allow for additional stages of HVAC unit 23 operation to be activated taking into account whether a Gas/Electric unit or a Heat Pump unit is being used in the system. Similarly, U3 contains high/low temperature trip points in the form of digital words. In the preferred embodiment of the invention, U3 in the monitor-stat 15 contains high/low trip point data to deactivate additional stages of heating or cooling: first, if a given trip point setpoint for these stages is exceeded, the entire HVAC unit 23 is deactivated; and if an additional set of high/low trip points are exceeded by operation of the units' primary stages of heating or cooling. The digital word data representative of HVAC unit 23 status thus include data regarding which of the stages of heating or cooling are energized.

U3 contains instructions for operating the zone dampers 21, 37 in the heating mode when the duct temperature is greater than the actual zone temperature and operating the zone dampers 21, 37 in the cooling mode when duct temperature is lower than actual zone temperature. Instructions in the form of digital words are also present in U3 for generation of a damper command word by U1 that is sent to the monitor-stat's damper control system 16 and to all slave-stats 32 for placing the dampers in the mode coincident with the decision made a the monitor-stat 15 for operation of the HVAC unit 23 prior to activation of the HVAC unit 23.

U3 contains instruction codes for placing the dampers 21, 37 in the cooling mode, heating mode, or ventilation mode when the HVAC unit 23 is de-energized by causing U1 to compare duct temperature with actual temperature; actual temperature with desired temperature; and duct temperature with predetermined setpoints (contained in U3). Thus, as described above, if there is no demand in a given zone or a demand different than that computed by a comparison of duct and actual temperature and duct temperature is within the range 65°-80° F., the monitor-stat 15 or slave-stat 32 will place its damper 21 or 37 in the ventilation mode.

Any digital word data at any thermostat 10 can be transmitted via the SART to any other device. Thus, for example, the monitor-stat 15 will receive duct temperature data from every duct temperature sensor 27 in the system. The monitor-stat 15 receives duct temperature data directly via its own damper board 16 and the A/D converter in U4. Duct temperature data in the form of a digital word will be received from each slave-stat 32 via the slave-stat 32 SART. Accordingly, the monitor-stat 15 need not have the capability of processing a large number of duct temperature analog signals through its own A/D converter in U4, and this greatly simplifies the design and programming of a given monitor-stat 15.

The thermostat 10 employs a conventional tri-plexed liquid crystal display 13 that can display data indicative of the information contained in any digital word data used in the thermostat 10. Furthermore, the monitor-stat 15 has a display 13 and appropriate instruction codes in U3 to allow such display to provide information received from any slave-stat 32.

Turning now to several of the important features of the thermostat according to the invention, an important part of the operation of thermostat 10, as either a monitor-stat 15 or slave-stat 32, is the use of a serial asynchronous receiver transmitter (SART) contained in U4. In the preferred embodiment of the invention, the SART is similar to a universal asynchronous receiver transmitter (UART) which is restricted to only operate at a restricted number of data rates and a universal type is not needed in the particular application.

One use of the SART in a slave-stat 32 is the reception of a digital word from the monitor-stat 15 that prevents the temperature setpoints at the slave-stat 32 from being changed locally. A 2-bit word is placed in EEPROM U2 at the slave-stat 32 and prevents the setpoints entered therein from being altered via switches S1-S4 at the slave-stat 32. As mentioned previously, the locking feature override can be enabled locally by entering a 2-bit word into U2 via switches S1-S2 and S5 in position "8". the 2-bit words are used to enable or disable the setpoint lock feature.

In the preferred embodiment of the present invention, a monitor-stat 15 is designed to receive information from up to 63 slave-stats 32 without the addition of communication bus extender circuitry. Each slave-stat 32 sends the following information to the monitor-stat 15 at approximately 20 second intervals: zone temperature; zone setpoints for heating and cooling; zone damper position; thermostat mode (heating or cooling); zone address number; and duct temperature. (Damper position can be derived from the signal that a thermostat 10 supplies to the damper control circuitry or from damper position indicating circuitry that need not be discussed further in this application.)

The input from a real time clock is received by a slave-stat 32 via its SART. This is a 10-bit word. Program periods I and II are stored as data in U2 as are the setback setpoints. Time-of-day program data is stored in the U1 RAM. The 10-bit digital word representative of ceived from a monitor-stat 15. Also stored in U2 are the digital words for local (slave-stat) or remote (monitor-stat) setback control, as discussed hereinabove.

Data is preprogrammed in U3 for providing the dedicated set-up setpoints of 81°-96° F. and the dedicated set-back setpoints of 50°-65° F. around the normal setpoint range of 66°-80° F.

The thermostats 10, whether used as a monitor-stat 15 or slave-stat 32, receive data from sensors, including sensors 30, 42, 27, 36 in analog form, and such signals, representing zone temperature and duct temperature, are converted to digital form via the A/D converter in U4. When calibrating the temperature sensor signals, 2-bit calibration words are placed in EEPROM U2 via switches S1 and S2 with S5 in "5" (for zone temperature) or "6" (for duct temperature). S1 or S2 is depressed to raise or lower the temperature displayed at Display 13 to readout what the exact temperature is as measured by a reference device, like an accurate thermometer. Once set, the calibration words are placed in U2 and, when U1/U3 instructions call for enabling a sensor to provide temperature data, the calibration word is sent to A/D converter in U4 which modifies its output to provide a 10-bit word to U1 that is the exact, calibrated temperature. This procedure is unique in that the usual methods used for temperature calibration involve either a modification of the temperature detector's output signal or the modification of instrumentation circuitry. In the present invention, calibration is accomplished by modification of the digital word representative of the temperature data, the digital word then being sent to U1.

U3 contains a straightforward algorithm for conversion of temperature data to readout in °F. or °C. on Display 13. With S5 in position "3" S1 or S2 can be depressed resulting in the input into U4 of a digital word that is then placed in U2. U1, in accordance with the algorithm in U3, will compute temperature in °F. or °C. when instructed to do so via the word placed in U2 that was placed therein during programming.

The thermostat 10 in accord with the present invention has instructions and fixed data stored in U3. The information is placed in U3 in the form of machine code as set forth in Appendix A for the slave-stat 32 and Appendix B for the monitor-stat 15. The left columns comprise the instruction addresses and the other columns comprise the instructions.

While the invention has been described with respect to certain specific embodiments, it will be appreciated that many modifications and changes may be made by those skilled in the art without departing from the spirit of the invention. It is intended, therefore, by the appended claims to cover all such modifications and changes as fall within the true spirit and scope of the invention.

real time is read into U1 which accesses instructions from U3 to modify the operation of the slave-stat 32 in accordance with time related or programmed periods. Thus, the slave-stat 32 will access setback setpoints from U2 instead of the normal setpoints (also in U2) in response to the appropriate real time digital words re-

APPENDIX A

```
0000:  04 08 FF 15 D5 E4 7D 04   89 D5 AF 23 F7 62 B8 58   ......).  ...#.b.X
0010:  F0 17 C6 28 B9 F7 81 37   72 28 19 81 A9 18 F0 03   ...(...7 r(......
```

```
0020:  6A F2 28 F6 28 18 29 A1    B8 5B 18 F0 53 0F D3 8E    j.(.(.).  .[..S...
0030:  96 33 30 D3 8E 12 3B 77    03 D8 B3 94 ED FC C6 C2    .30...;w  ........
0040:  53 F0 96 C2 B8 3C F0 03    F5 E6 C2 04 4B 84 8E B9    S....<..  ....K...
0050:  02 18 F0 C6 56 18 E9 51    B8 3E F0 53 BF A0 43 80    ....V..Q  .>.S..C.
0060:  04 BF A4 7D B4 00 04 BE    B8 5E 18 F0 53 3F 96 7C    ...}....  .^..S?.|
0070:  B9 40 F1 53 30 C6 7C E7    E7 19 D1 A1 F0 96 C2 B9    .@.S0.|.  ........
0080:  07 04 51 B8 5A B9 35 F0    96 99 F1 37 47 61 17 C6    ..Q.Z.5.  ...7Ga..
0090:  B9 18 F0 F7 77 A0 C8 23    D8 87 A0 18 96 A6 11 F0    ....w..#  ........
00A0:  F2 A6 F1 07 07 A1 F0 F7    FE F6 AC 37 53 03 AA 77    ........  ...7S..w
00B0:  2A E7 4A 03 02 53 03 43    04 2E 53 78 4E AE FE B8    *.J..S.C  ..SxN...
00C0:  F9 98 C7 07 53 07 E7 03    09 A8 F0 53 EF A0 FF 93    ....S...  ...S....
00D0:  4D 4F 62 64 68 83 C2 14    E1 14 E5 27 B8 44 A0 E4    MObdh...  ...'.D..
00E0:  93 23 05 04 E7 23 0A B8    3E 50 C6 FE D0 A0 18 F0    .#...#..  >P......
00F0:  53 60 B8 61 B0 8C C6 FE    C8 B2 FC C8 B0 8C 83 FF    S`.a....  ........
0100:  B8 39 F0 12 0F B8 55 F0    B8 62 40 C6 11 C4 F1 E4    .9....U.  .b@.....
0110:  A3 54 CE 94 00 B8 56 F0    96 4F 18 F0 17 C8 A0 B8    .T....V.  .O......
0120:  3E F0 53 7F A0 18 F0 53    E3 A0 18 F0 53 7F A0 B8    >.S....S  ....S...
0130:  45 B9 08 B0 00 18 E9 33    B8 3C F0 96 EA B8 20 F4    E......3  .<....
0140:  8E B8 24 F5 14 95 E5 B8    3B F0 37 D2 EF 24 F3 B9    ..$.....  ;.7..$..
0150:  40 F4 00 F6 EA 18 18 18    20 96 EA F0 D3 81 C6 7E    @.......   ......~
0160:  D3 04 C6 7E D3 07 96 EF    B8 3E F0 53 3F B9 85 F4    ...~....  .>.S?...
0170:  00 F6 EA 53 18 B3 3F 20    53 EF 40 A0 24 EA C8 F0    ...S..?   S.@.$...
0180:  B8 55 A0 B9 80 F4 00 F6    EA 18 F0 C8 37 F2 A9 B9    .U......  ....7...
0190:  55 F1 37 B9 39 41 92 A9    B9 82 F4 00 B8 74 F0 47    U.7.9A..  .....t.G
01A0:  E7 53 80 B8 3E 40 A0 24    B1 F4 8E B8 71 F5 14 95    .S..>@.$  ....q...
01B0:  E5 B8 39 F0 12 EA 53 98    AA B8 3B F0 53 02 4A AA    ..9...S.  ..;.S.J.
01C0:  B8 3F F0 92 CE 53 60 4A    AA F4 74 96 CE 1A FA B9    .?...S`J  ..t.....
01D0:  85 F4 00 B8 3F F0 92 E1    F4 74 96 E1 FF B9 8E F4    ....?...  .t......
01E0:  00 F5 54 8F E5 F9 B9 90    F4 00 B8 3B F0 D2 F3 B8    ..T.....  ...;....
01F0:  56 B0 01 F4 5E 96 4F C8    A0 B8 62 B0 FC C4 AB FF    V...^.O.  ..b.....
0200:  B8 3B F0 37 D2 B7 B8 57    F0 C6 B7 17 B8 68 A0 F4    .;.7...W  .....h..
0210:  B5 AA 23 31 F4 22 C6 00    B0 00 B8 3C F0 96 57 B8    ..#1."..  ...<..W.
0220:  20 44 69 B8 39 F0 12 B7    23 F2 F4 22 C6 32 B0 00     Di.9...  #.."2.2..
0230:  44 00 B8 5D F0 96 23 23    40 54 BD E6 42 95 B6 23    D.]..##   @T..B..#
0240:  44 AE D3 81 AB C6 51 D3    04 C6 44 D3 07 96 00 6B    D.....Q.  ..D.....
0250:  F0 18 18 18 F0 C6 59 BB    B0 FB 96 92 85 23 80 54    ......Y.  .....#.T
0260:  BD E6 69 95 B6 5D 27 44    7B F0 18 03 F1 F6 73 F0    ..i..]'D  {.....s.
0270:  F7 C6 7B F0 F7 23 E0 F6    7B 23 A0 AB B8 68 F4 76    ..{..#..  {#...h.v
0280:  96 86 FB 43 05 AB BE 32    FB C6 94 5F C6 92 BE 02    ...C...2  ..._....
0290:  44 94 BE 12 B8 68 F0 F4    B5 AA FE F4 22 B8 5E B0    D....h..  ....".^.
02A0:  00 B8 62 B0 FF F4 24 96    2E B8 62 F0 96 A5 85 B8    ..b...$.  ..b.....
02B0:  68 F4 60 96 23 44 00 23    F0 F4 22 44 B7 B8 58 B0    h.`.#D.#  .."D..X.
02C0:  FF B8 6C B9 68 A0 C8 B0    01 C8 F1 A0 64 B8 B8 62    ..l.h...  ....d..b
02D0:  B0 FC F4 CA B8 39 F0 B8    62 B9 37 37 53 02 C6 E3    .....9..  b.77S...
02E0:  F1 53 F0 19 41 C6 EE 27    A0 B8 55 A0 E4 A3 97 B9    .S..A..'  ..U.....
02F0:  5D F1 C6 F9 F0 96 D2 A7    83 A0 B8 58 B0 FF 83 FF    ].......  ...X....
0300:  B8 3B F0 37 AB 97 52 16    B8 3D F0 37 72 1B B3 26    .;.7..R.  .=.7r..&
0310:  B9 01 BA 2C D4 F5 53 F0    4A C6 21 B8 39 F0 F7 77    ...,..S.  J.!.9..w
0320:  A0 B8 3D F0 47 5F 17 AA    23 CE B9 FF 03 32 29 13    ..=.G_..  #....2).
0330:  00 29 EA 2C 17 AA B8 26    D4 F5 B9 00 FB 92 43 F6    .)..,..&  ......C.
0340:  43 B9 10 B8 39 F0 53 EF    49 A0 B8 44 F0 F2 54 B8    C...9.S.  I..D..T.
0350:  56 F0 C6 55 83 F5 34 6E    54 8F E5 27 AC AD B8 37    V..U..4n  T..'...7
0360:  F0 37 32 68 89 49 F1 AC    F0 37 12 70 B9 45 F1 AD    .72h.I..  .7.p.E..
0370:  F0 47 E7 53 60 B8 3F 50    C8 C6 91 D2 87 F0 5F 4D    .G.S`.?P  ......_M
0380:  96 85 FC 96 B9 C4 5C F0    5F 4C 96 8F FD 96 B9 C4    ......\.  _L......
0390:  00 C8 FB 37 D2 9A F0 53    FC A0 F0 53 03 37 AB FC    ...7...S  ...S.7..
```

```
03A0: 37 6D F6 B5 37 96 AF B8   4A B9 46 F4 AE F6 B5 FB   7m..7... J.F.....
03B0: 6C F6 8F 04 D7 FB 6D F6   85 04 D7 F4 EE F6 D3 B8   l.....m. ........
03C0: 5C B8 F8 F4 D3 E6 D4 96   D3 B8 5C F8 96 C3 27 B9   \....... ..\...'.
03D0: 5D B1 00 83 A7 B9 37 F1   53 F0 B9 68 96 E0 B9 56   ].....7. S..h...V
03E0: F1 B9 6A D1 96 D3 F8 D3   06 96 CE 97 18 F0 64 CF   ..j..... ......d.
03F0: B9 47 64 F6 B9 4B AB F1   97 96 FF C9 F1 37 6B 83   .Gd..K.. .....7k.
0400: B8 3A F0 37 BA 01 12 8B   32 0B CA 27 AD AE FA F4   .:.7.... 2..'....
0410: 84 96 1D B8 53 F0 F4 84   18 F0 C8 F4 84 65 FA F4   ....S... .....e..
0420: 89 96 2A F0 F4 89 18 F0   F4 89 FE F4 89 FD F4 89   ..*..... ........
0430: FA C6 5B B8 01 B4 DA E6   88 A8 18 F8 03 FB E6 35   ..[..... .......5
0440: 27 AD AE B8 01 20 F4 84   A9 18 F8 03 FB F9 E6 45   '.... .. .......E
0450: FD 4E 96 88 23 02 A8 B9   53 F4 DC BA 01 55 B8 3A   .N..#... S....U.:
0460: F0 53 FC 4A A0 37 99 BF   12 87 85 54 CE F6 87 B9   .S.J.7.. ...T....
0470: 6A B1 F1 19 B1 03 19 B1   42 19 B8 53 23 02 F4 DC   j....... B..S#...
0480: F4 EE E6 87 95 B6 6B 83   89 40 BA 00 84 5D B8 3A   ......k. .@...].:
0490: F0 53 F8 AB B8 41 F0 AA   18 B9 F0 FB 72 DB 37 32   .S...A.. ....r.72
04A0: C1 C8 F0 E7 47 53 40 2A   F7 2A F7 77 A9 F0 53 80   ....GS@* .*.w..S.
04B0: 49 A9 B8 39 F0 77 77 53   02 49 B9 F2 91 19 B8 43   I..9.wwS .I.....C
04C0: CB F8 47 A0 53 0F 03 DD   A3 2A F7 2A F7 77 2B 97   ..G.S... .*.*.w+.
04D0: A7 F7 2B E6 D7 53 80 91   19 84 9B 04 C2 3F 06 5B   ..+..S.. .....?.[
04E0: 4F 66 6D 7D 07 7F 67 39   79 71 3D 76 73 B8 5E F0   Ofm}..g9 yq=vs.^.
04F0: DD B2 FB B8 FA 23 03 90   18 27 90 83 FF FF FF FF   .....#.. .'......
0500: B8 F6 76 16 B5 FD F7 B9   33 F6 0D B9 31 F1 C8 90   ..v..... 3...1...
0510: 18 19 F1 F7 77 90 80 F2   7C A5 FD F2 2A 43 88 AD   ....w... |...*C..
0520: 8A 10 FE 53 07 AE B9 22   A4 53 FE B2 4B 92 44 72   ...S..." .S..K.Dr
0530: 3D 43 08 AE 80 53 40 2D   53 BF 4D AD 83 03 09 AE   =C...S@- S.M.....
0540: B9 24 A4 53 43 38 AE B9   26 A4 53 9A EF FD 53 7F   .$.SC8.. &.S...S.
0550: AD B9 28 27 AA BB 03 97   F7 2A F7 2A 61 19 2A 71   ..('.... .*.*a.*q
0560: 2A C9 EB 57 AB C8 80 6B   AB 18 80 53 07 7A BA 03   *..W...k ...S.z..
0570: 97 67 2B 67 2B EA 70 2B   A1 19 FB A1 83 89 1F BA   .g+g+.p+ ........
0580: 1F FD 53 E0 A9 09 37 5A   49 2D DD 5A 96 D8 B8 FC   ..S...7Z I-.Z....
0590: 80 37 47 2C DC 96 D8 FD   53 0F A9 FC 53 F8 49 E8   .7G..... S...S.I.
05A0: 37 A8 FC 53 0F A9 FD 53   10 49 A9 18 F0 5A A0 BA   7..S...S .I...Z..
05B0: 30 BB 80 F9 5A 96 C5 F0   5A C6 C5 FA 37 53 0F 59   0...Z... Z...7S.Y
05C0: 96 C5 F0 4B A0 FB 77 AB   FA 77 77 AA 37 F2 B3 F9   ...K..w. .ww.7...
05D0: 40 A0 03 A0 27 67 40 A0   04 C2 BE 00 09 37 B2 E4   @...'g@. .....7..
05E0: EE DC 97 83 BE 11 EE E6   BE 80 09 47 67 67 FE 67   ........ ...Ggg.g
05F0: BE 09 EE F2 AE E6 EA 09   B2 FB 97 FE 83 FF FF FF   ........ ........
0600: B8 32 F0 77 77 53 20 43   DC B8 3E 50 A0 E9 40 F1   .2.wwS C ..>P..@.
0610: 92 13 27 AA 37 52 1B 14   E1 04 E5 13 35 74 F4 E6   ..'.7R.. ....5t..
0620: _  17 23 2F 74 F4 F6   4B 23 40 F4 93 96 5B F0   =..#/t.. K#@...[.
0630: 52 39 B9 61 F1 76 5B B1   D1 B9 34 F1 37 77 47 B9   R9.a.v[. ..4.7wG.
0640: 3B 41 47 77 77 53 10 43   04 40 A0 FA 72 1F 23 14   ;AGwwS.C .@..r.#.
0650: 74 F4 F6 5B 00 00 00 00   00 F4 48 93 B8 3E F0 53   t..[.... ..H..>.S
0660: F3 A8 B9 40 F1 32 68 27   AA 37 12 70 14 E1 04 E5   ...@.2h' .7.p....
0670: 23 05 74 F0 E6 78 04 D7   23 0F 74 F0 F6 9A 23 20   #.t..x.. #.t...#
0680: F4 93 96 AA F0 12 8E B9   61 F1 96 AA B1 D1 B9 32   ........ a......2
0690: F1 37 77 77 43 11 53 31   40 A0 FA 32 6E 23 14 74   .7wwC.S1 @..2n#.t
06A0: F0 F6 AA 00 00 00 00 00   F4 44 83 B8 39 F0 12 F3   ........ .D..9...
06B0: B8 40 F0 F2 BC D2 BB 43   40 C4 BE 27 53 BF A0 C8   .@.....C @..'S...
06C0: F0 AA 53 60 B8 44 C6 D4   B9 4C D2 CE B9 48 F1 96   ..S`.D.. .L...H..
06D0: D4 F0 D3 80 A0 B8 57 B9   39 53 7F 07 D0 96 E7 FA   ......W. 9S......
06E0: 92 E7 F1 43 20 C4 EA F1   53 DF A1 37 B2 F1 FF F4   ...C ... S..7....
06F0: E5 74 00 E4 A3 23 69 29   A1 C9 FA A1 E4 AE FF FF   .t...#i) ........
0700: B8 69 A8 C8 F9 A0 85 54   CE F6 21 B8 56 B9 6A F0   .i.....T ..!.V.j.
0710: A1 19 23 02 A1 B8 68 19   F4 DC 74 BB E6 21 95 B6   ..#...h. ..t..!..
0720: 07 83 F4 BC F4 CA F4 C3   B8 37 F0 47 5F C6 3F B9   ........ .7.G_.?.
0730: 55 D1 5F 96 3F 18 F0 F2   3C 53 60 83 27 A8 83 C7   U._.?... <S`.'...
```

```
0740: 07 D7 E4 AC BA 12 E4 4A  BA 08 B8 61 B9 66 F0 96   .......J ...a.f..
0750: 5D F1 C6 58 11 B0 D1 83  B8 3E F0 4A A0 83 B8 56   ]..X.... .>.J...V
0760: B9 39 F1 B9 57 37 53 01  C6 72 F1 03 C2 D0 C6 72   .9..W7S. .r.....r
0770: F0 07 A0 83 B8 56 B9 44  F1 53 7F D0 83 B8 3F 20   .....V.D .S....?
0780: 43 80 28 93 F5 34 D2 E5  83 F5 74 00 E5 83 F5 54   C.(..4.. ..t....T
0790: 51 E5 83 F5 34 00 E5 83  FF FF FF FF FF FF FF 00   Q...4... ........
07A0: 00 24 00 89 80 00 00 00  00 00 44 00 89 80 89 80   .$...... ..D.....
07B0: 00 00 00 00 83 89 80 00  00 00 00 83 89 80 00 00   ................
07C0: 00 00 83 89 80 00 00 00  00 83 89 80 00 00 00 00   ................
07D0: 00 00 83 89 80 00 00 00  00 00 83 89 80 00 00 00   ................
07E0: 00 00 00 00 83 89 80 00  00 00 00 00 00 83 89 80   ................
07F0: 00 00 00 00 00 00 83 00  00 F5 14 00 E5 89 80 FF   ................
0800: B8 37 F0 47 B8 39 40 F2  79 B8 3B F0 37 12 94 B9   .7.G.9@. y.;.7...
0810: 53 F1 5F C6 8E BA 80 74  1E F6 8E AC BA 07 F1 47   S._....t .......G
0820: 5A C6 8E A9 B8 4D F0 47  5A C6 8E 37 2A 50 C6 8E   Z....M.G Z..7*P..
0830: AB 6A 67 2B 37 17 69 2B  F2 42 F6 44 B8 51 BA 10   .jg+7.i+ .B.D.Q..
0840: 04 4C F6 48 F9 6A F6 3C  B8 4F BA 01 F0 5F AD C6   .L.H.j.< .O..._..
0850: 85 F0 47 5F AE C6 85 B9  4E FD 74 1E F6 85 AD FA   ..G_.... N.t.....
0860: 2E 2A E7 2A 74 1E 2E AA  F6 85 FD 37 6E F6 80 FC   .*.*t... ...7n...
0870: 37 6D E6 79 FC 37 6E E6  85 B8 39 F0 53 F7 A0 83   7m.y.7n. ..9.S...
0880: FC 37 6D E6 74 13 FA E7  E7 AA 53 11 C6 4C B8 39   .7m.t... ..S..L.9
0890: F0 43 08 A0 83 89 00 BA  FA E5 D4 F5 F5 E6 A5 B9   .C...... ........
08A0: 3F F1 43 04 A1 B9 3B F1  AB B9 02 BA BC 52 B3 B9   ?.C...;. .....R..
08B0: 03 BA 84 E5 D4 F5 F5 F6  BF B9 3F F1 43 08 A1 B9   ........ ..?.C...
08C0: 3B F1 37 F2 FD BC 01 FB  BB 31 52 CE BB 41 54 00   ;.7..... .1R..AT.
08D0: FC E7 AC 37 92 CE BC 01  B9 3D F1 52 F3 FB 03 BF   ...7.... .=.R....
08E0: F6 FD FB 03 04 AB BC 04  B9 28 F1 53 E0 96 F3 19   ........ .(.S....
08F0: F1 C6 F5 B8 28 54 00 FC  E7 AC 37 92 F5 83 FF FF   ....(T.. ..7.....
0900: AC C6 27 B8 60 B2 08 C8  B9 3B F1 F7 F7 B9 39 F1   ..'.`... .;....9.
0910: 37 52 1B 27 F6 1A B8 5F  A0 18 A0 F6 24 B8 5F F0   7R.'..._ ....$._.
0920: 18 40 24 25 F0 96 6D B8  3F F0 53 9F 4C 20 D0 5C   .@$%..m. ?.S.L .\
0930: B8 66 C6 4F B9 61 B1 F3  FC F7 F7 23 50 F6 45 E5   .f.O.a.. ...#P.E.
0940: 74 F0 F5 24 49 E5 74 F4  F5 B0 00 F6 4F B0 F7 B9   t..$I.t. ....O...
0950: 39 F1 53 FB 21 37 52 5A  B0 00 B8 3E B9 32 F1 F2   9.S.!7RZ ...>.2..
0960: 6C FC C6 6C 53 28 AC F0  53 DF 4C A0 27 83 B8 3E   l..lS(.. S.L.'..>
0970: B9 39 F1 72 7A B9 37 F1  52 B9 F0 F2 B9 B9 34 F1   .9.rz.7. R.....4.
0980: 37 F2 AB B9 3B F1 52 AB  B9 3F F1 37 D2 AB B9 40   7...;.R. .?.7...@
0990: F1 D3 1C 53 1C C6 9B F0  37 92 B4 B9 5F F1 C6 B4   ...S.... 7..._...
09A0: F0 5F 96 B4 B9 44 F1 C6  B4 24 B9 F0 5F 96 B9 B9   ._...D.. .$.._...
09B0: 44 F1 96 BD F0 53 EF 24  BC F0 43 10 A0 B9 32 F1   D....S.$ ..C...2.
09C0: 37 F2 D1 B9 39 F1 72 CD  F0 43 20 24 D0 F0 53 DF   7...9.r. .C $..S.
09D0: A0 83 AF B9 08 DE 67 FD  67 2E 67 2E AD 37 F2 E7   ......g. g.g..7..
09E0: D3 DF AD FE D3 01 AE FF  77 AF E9 D5 BF 0F 97 33   ........ w.......3
09F0: FF FF FF FF FF FF FF FF  FF FF FF FF FF FF FF FF   ........ ........
0A00: B9 69 FB A3 A1 C9 1B FB  A3 A1 1B E5 F4 AE F5 B9   .i...... ........
0A10: 40 FC 53 03 C6 1B 27 E6  2E 44 1D F6 2E F1 5C AD   @.S...'. .D....\.
0A20: C6 2A 53 03 BD 20 96 2A  BD 10 FD 4C 43 80 41 A1   .*S.. .* ...LC.A.
0A30: 83 00 96 00 C8 05 14 04  4C 00 96 00 C8 03 20 02   ........ L......
0A40: EE 00 96 00 C8 05 14 04  4C 00 96 00 C8 05 14 04   ........ L.......
0A50: 4C B9 68 23 02 E5 F4 DC  F5 C9 F1 53 7F 21 B8 49   L.h#.... ...S.'.I
0A60: F2 64 B8 45 F1 C9 96 7B  F1 03 F1 F6 7B B9 44 F1   .d.E...{ ....(.D.
0A70: 53 7F B9 56 D1 B9 68 C6  7C 44 8E 10 18 E5 F4 AE   S..V..h. |D......
0A80: F5 E6 8E F1 A0 18 19 F1  A0 18 B9 56 F1 A0 83 B8   ........ ...V....
0A90: 3E F0 53 03 03 7F 53 80  A9 F0 53 0C 03 3C 53 40   >.S...S. ..S..<S@
0AA0: 49 A9 F0 53 10 E7 49 A9  F0 53 0A C6 B1 F9 43 10   I..S..I. .S....C.
0AB0: A9 B8 5B F0 5F D3 07 C6  C9 B8 40 F0 53 30 E7 E7   ..[._... ..@.S0..
0AC0: AA 37 59 2A 4F 18 50 4A  A0 83 43 4F 50 59 52 49   .7Y*O.PJ ..COPYRI
0AD0: 47 48 54 20 28 43 29 20  31 39 38 35 2C 38 36 20   GHT (C)  1985,86
```

```
0AE0: 42 59 20 50 41 52 4B 45   52 20 45 4C 45 43 54 52   BY PARKE R ELECTR
0AF0: 4F 4E 49 43 53 20 49 4E   43 FF FF FF FF FF FF FF   ONICS IN C.......
0B00: E7 BB 09 BC 19 EC 05 64   0B 12 0F 99 DF 64 13 89   .......d.....d..
0B10: 20 64 13 77 00 BC 09 EC   17 EB 09 89 20 83 AB 03    d.w........ ...
0B20: F4 E6 26 96 30 AB FA 51   C6 2E FB 03 0C AB FB 97   ..&.0..Q........
0B30: 83 FF FF FF FF FF FF FF   FF FF FF FF FF FF FF FF   ................
0B40: FF FF FF FF FF FF FF FF   FF FF FF FF FF FF FF FF   ................
0B50: FF FF FF FF FF FF FF FF   FF FF FF FF FF FF FF FF   ................
0B60: FF FF FF FF FF FF FF FF   FF FF FF FF FF FF FF FF   ................
0B70: FF FF FF FF FF FF FF FF   FF FF FF FF FF FF FF FF   ................
0B80: FF FF FF FF FF FF FF FF   FF FF FF FF FF FF FF FF   ................
0B90: FF FF FF FF FF FF FF FF   FF FF FF FF FF FF FF FF   ................
0BA0: FF FF FF FF FF FF FF FF   FF FF FF FF FF FF FF FF   ................
0BB0: FF FF FF FF FF FF FF FF   FF FF FF FF FF FF FF FF   ................
0BC0: FF FF FF FF FF FF FF FF   FF FF FF FF FF FF FF FF   ................
0BD0: FF FF FF FF FF FF FF FF   FF FF FF FF FF FF FF FF   ................
0BE0: FF FF FF FF FF FF FF FF   FF FF FF FF FF FF FF FF   ................
0BF0: FF FF FF FF FF FF FF FF   FF FF FF FF FF FF FF FF   ................
0C00: FF FF FF FF FF FF FF FF   FF FF FF FF FF FF FF FF   ................
0C10: FF FF FF FF FF FF FF FF   FF FF FF FF FF FF FF FF   ................
0C20: FF FF FF FF FF FF FF FF   FF FF FF FF FF FF FF FF   ................
0C30: FF FF FF FF FF FF FF FF   FF FF FF FF FF FF FF FF   ................
0C40: FF FF FF FF FF FF FF FF   FF FF FF FF FF FF FF FF   ................
0C50: FF FF FF FF FF FF FF FF   FF FF FF FF FF FF FF FF   ................
0C60: FF FF FF FF FF FF FF FF   FF FF FF FF FF FF FF FF   ................
0C70: FF FF FF FF FF FF FF FF   FF FF FF FF FF FF FF FF   ................
0C80: FF FF FF FF FF FF FF FF   FF FF FF FF FF FF FF FF   ................
0C90: FF FF FF FF FF FF FF FF   FF FF FF FF FF FF FF FF   ................
0CA0: FF FF FF FF FF FF FF FF   FF FF FF FF FF FF FF FF   ................
0CB0: FF FF FF FF FF FF FF FF   FF FF FF FF FF FF FF FF   ................
0CC0: FF FF FF FF FF FF FF FF   FF FF FF FF FF FF FF FF   ................
0CD0: FF FF FF FF FF FF FF FF   FF FF FF FF FF FF FF FF   ................
0CE0: FF FF FF FF FF FF FF FF   FF FF FF FF FF FF FF FF   ................
0CF0: FF FF FF FF FF FF FF FF   FF FF FF FF FF FF FF FF   ................
0D00: FF FF FF FF FF FF FF FF   FF FF FF FF FF FF FF FF   ................
0D10: FF FF FF FF FF FF FF FF   FF FF FF FF FF FF FF FF   ................
0D20: FF FF FF FF FF FF FF FF   FF FF FF FF FF FF FF FF   ................
0D30: FF FF FF FF FF FF FF FF   FF FF FF FF FF FF FF FF   ................
0D40: FF FF FF FF FF FF FF FF   FF FF FF FF FF FF FF FF   ................
0D50: FF FF FF FF FF FF FF FF   FF FF FF FF FF FF FF FF   ................
0D60: FF FF FF FF FF FF FF FF   FF FF FF FF FF FF FF FF   ................
0D70: FF FF FF FF FF FF FF FF   FF FF FF FF FF FF FF FF   ................
0D80: FF FF FF FF FF FF FF FF   FF FF FF FF FF FF FF FF   ................
0D90: FF FF FF FF FF FF FF FF   FF FF FF FF FF FF FF FF   ................
0DA0: FF FF FF FF FF FF FF FF   FF FF FF FF FF FF FF FF   ................
0DB0: FF FF FF FF FF FF FF FF   FF FF FF FF FF FF FF FF   ................
0DC0: FF FF FF FF FF FF FF FF   FF FF FF FF FF FF FF FF   ................
0DD0: FF FF FF FF FF FF FF FF   FF FF FF FF FF FF FF FF   ................
0DE0: FF FF FF FF FF FF FF FF   FF FF FF FF FF FF FF FF   ................
0DF0: FF FF FF FF FF FF FF FF   FF FF FF FF FF FF FF FF   ................
0E00: FF FF FF FF FF FF FF FF   FF FF FF FF FF FF FF FF   ................
0E10: FF FF FF FF FF FF FF FF   FF FF FF FF FF FF FF FF   ................
0E20: FF FF FF FF FF FF FF FF   FF FF FF FF FF FF FF FF   ................
0E30: FF FF FF FF FF FF FF FF   FF FF FF FF FF FF FF FF   ................
0E40: FF FF FF FF FF FF FF FF   FF FF FF FF FF FF FF FF   ................
0E50: FF FF FF FF FF FF FF FF   FF FF FF FF FF FF FF FF   ................
0E60: FF FF FF FF FF FF FF FF   FF FF FF FF FF FF FF FF   ................
0E70: FF FF FF FF FF FF FF FF   FF FF FF FF FF FF FF FF   ................
```

```
0E80: FF FF FF FF FF FF FF FF   FF FF FF FF FF FF FF FF   ........ ........
0E90: FF FF FF FF FF FF FF FF   FF FF FF FF FF FF FF FF   ........ ........
0EA0: FF FF FF FF FF FF FF FF   FF FF FF FF FF FF FF FF   ........ ........
0EB0: FF FF FF FF FF FF FF FF   FF FF FF FF FF FF FF FF   ........ ........
0EC0: FF FF FF FF FF FF FF FF   FF FF FF FF FF FF FF FF   ........ ........
0ED0: FF FF FF FF FF FF FF FF   FF FF FF FF FF FF FF FF   ........ ........
0EE0: FF FF FF FF FF FF FF FF   FF FF FF FF FF FF FF FF   ........ ........
0EF0: FF FF FF FF FF FF FF FF   FF FF FF FF FF FF FF FF   ........ ........
0F00: FF FF FF FF FF FF FF FF   FF FF FF FF FF FF FF FF   ........ ........
0F10: FF FF FF FF FF FF FF FF   FF FF FF FF FF FF FF FF   ........ ........
0F20: FF FF FF FF FF FF FF FF   FF FF FF FF FF FF FF FF   ........ ........
0F30: FF FF FF FF FF FF FF FF   FF FF FF FF FF FF FF FF   ........ ........
0F40: FF FF FF FF FF FF FF FF   FF FF FF FF FF FF FF FF   ........ ........
0F50: FF FF FF FF FF FF FF FF   FF FF FF FF FF FF FF FF   ........ ........
0F60: FF FF FF FF FF FF FF FF   FF FF FF FF FF FF FF FF   ........ ........
0F70: FF FF FF FF FF FF FF FF   FF FF FF FF FF FF FF FF   ........ ........
0F80: FF FF FF FF FF FF FF FF   FF FF FF FF FF FF FF FF   ........ ........
0F90: FF FF FF FF FF FF FF FF   FF FF FF FF FF FF FF FF   ........ ........
0FA0: FF FF FF FF FF FF FF FF   FF FF FF FF FF FF FF FF   ........ ........
0FB0: FF FF FF FF FF FF FF FF   FF FF FF FF FF FF FF FF   ........ ........
0FC0: FF FF FF FF FF FF FF FF   FF FF FF FF FF FF FF FF   ........ ........
0FD0: FF FF FF FF FF FF FF FF   FF FF FF FF FF FF FF FF   ........ ........
0FE0: FF FF FF FF FF FF FF FF   FF FF FF FF FF FF FF FF   ........ ........
0FF0: FF FF FF FF FF FF FF FF   FF FF FF FF FF FF FF FF   ........ ........
1000: 75 04 09 15 D5 A4 F9 04   0C F5 84 8B D5 AF 23 F7   u....... ......#.
1010: 62 B8 58 F0 17 C6 2B B9   F7 81 37 72 2B 19 81 A9   b.X...+. ..7r+...
1020: 18 F0 03 6A F2 2B F6 2B   10 29 A1 B8 5B 10 F0 53   ...j.+.+ .)..[..S
1030: 0F D3 0E 96 36 30 D3 0E   12 3E 77 03 D3 B3 F4 69   ....60.. .>w....i
1040: FC C6 C5 53 F0 96 C5 B8   3C F0 03 F5 E6 C5 04 4E   ...S.... <......N
1050: 64 00 B9 02 18 F0 C6 59   10 E9 54 B8 3E F0 53 BF   d......Y ..T.>.S.
1060: A0 43 80 04 C2 64 5F 54   00 04 C1 B8 5E 10 F0 53   .C...d_T ....^..S
1070: 3F 96 7F B9 40 F1 53 00   C6 7F E7 E7 19 D1 A1 F0   ?...@.S. ........
1080: 96 C5 B9 07 04 54 B8 5A   B9 35 F0 96 9C F1 37 47   .....T.Z .5....7G
1090: 61 17 C6 BC 18 F0 F7 77   A0 C8 23 D8 07 A0 18 96   a......w ..#.....
10A0: A9 11 F0 F2 A9 F1 07 07   A1 F0 F7 FE F6 AF 37 53   ........ ......7S
10B0: 03 AA 77 2A E7 4A 03 02   53 03 43 04 2E 53 78 4E   ..w*.J.. S.C..SxN
10C0: AE FE B8 F9 90 C7 07 53   07 E7 03 89 A8 F0 53 EF   .......S ......S.
10D0: A0 FF 93 50 52 65 67 6B   86 C5 F1 AA 19 F1 2A 04   ...PRegk ......*.
10E0: E3 BA 00 AF 27 AC AD B9   0B FF F7 AF FA F7 AA 47   ....'... .......G
10F0: F7 FC 7C 57 AC FD 7D 57   AD E9 E9 AA FC BF 0F 83   ..|W..}W ........
1100: 54 F6 B9 55 96 0A B1 07   84 FA F1 96 08 B9 39 F1   T..U.... ......9.
1110: 32 08 F0 B9 39 BA F0 F2   BD D2 86 B2 5D 19 F1 37   2...9... ....]..7
1120: 52 53 B8 64 F0 96 5C F1   53 FB A1 B8 30 B9 2E F0   RS.d..\. S...0...
1130: 5A C6 40 AB F1 5F 4B A1   47 37 6B F6 40 FB 47 31   Z.@.._K. G7k.@.G1
1140: F0 5F C6 50 AB 31 FB 47   37 61 F6 50 FB 47 4B A1   ._.P.1.G 7a.P.GK.
1150: 27 F4 80 B8 39 F0 72 5C   B8 30 B0 00 83 F1 B9 30   '...9.r\ .0.....0
1160: 72 64 B9 2E F0 12 70 F1   5F C6 08 F1 07 A1 24 B1   rd....p. _.....$.
1170: F1 5F 17 92 08 11 07 C6   B1 F1 07 47 D1 5A 96 B1   ._...... ...G.Z..
1180: F1 03 10 A1 24 B1 F1 B9   30 72 8D B9 2E F0 72 9A   ....$... 0r....r.
1190: F1 5A C6 08 F1 03 10 A1   24 B1 F1 47 5F 07 C6 08   .Z...... $..G_...
11A0: 21 03 F0 21 17 C6 B1 F1   47 17 D1 5F 96 B1 F1 07   !..!.... G.._....
11B0: A1 B8 3A F0 43 04 A0 B8   64 B0 FE 24 08 F5 84 00   ..:.C... d..$....
11C0: B8 3D F0 47 5F 14 E1 AA   B8 3B F0 B8 32 92 D0 C8   .=.G_... .;..2...
11D0: F8 D4 92 C6 C0 F0 B8 3D   B2 F7 52 E5 F0 53 F0 C6   .......= ..R..S..
11E0: F3 03 F0 24 ED F0 03 60   F6 F3 F0 03 10 30 A0 23   ...$...` .....0.#
11F0: 03 F4 80 94 FA 24 C0 23   10 D4 F3 24 C0 FF FF FF   .....$.# ...$....
1200: B8 F6 76 16 B5 FD F7 B9   33 F6 0D B9 31 F1 C8 90   ..v..... 3...1...
1210: 18 19 F1 F7 77 90 80 F2   7C A5 FD F2 2A 43 80 AD   ....w... |...*C..
```

```
1220: 8A 18 FE 53 07 AE B9 22    44 53 FE B2 4B 92 44 72    ...S..." DS..K.Dr
1230: 3D 43 08 AE 80 53 40 2D    53 BF 4D AD 83 03 08 AE    =C...S@- S.M.....
1240: B9 24 44 53 43 38 AE B9    26 44 53 9A EF FD 53 7F    .$DSC8.. &DS...S.
1250: AD B9 28 27 AA BB 03 97    F7 2A F7 2A 61 19 2A 71    ..('..... .*.*a.*q
1260: 2A C9 EB 57 AB C8 80 6B    AB 18 80 53 07 7A BA 03    *..W...k ...S.z..
1270: 97 67 2B 67 2B EA 70 2B    A1 19 FB A1 83 B9 55 F1    .g+g+.p+ ......U.
1280: C6 E0 94 FA B8 63 F0 96    9E B9 55 F1 07 A1 C6 E0    .....c.. ..U.....
1290: B8 3B F0 72 9A F1 D3 04    C6 8D B8 63 B0 FF F1 03    .;.r.... ...c....
12A0: EE B3 B8 54 F0 14 E1 AB    C8 F0 5F C6 89 14 E1 AA    ...T.... .._.....
12B0: 03 F0 A7 F0 6E 08 F2 BA    BE 10 FE 67 E4 45 B8 35    ........ ...g.E.5
12C0: F0 5F 14 E1 AB F0 47 5F    14 E1 44 EB B8 63 B0 00    ._....G_ ..D..c..
12D0: 83 44 CC 00 B8 24 44 DA    B8 22 94 00 23 20 E4 45    .D...$D. ."..# .E
12E0: B8 2A 94 00 AE B8 2C 94    00 AB FE AA 27 E4 45 CC    .*....,. ....'.E.
12F0: D1 BE D4 A2 D8 08 B8 38    F0 77 77 D0 37 53 03 83    .......8 .ww.7S..
1300: B8 3A F0 53 F9 AB B8 41    F0 AA 18 B9 F0 FB 72 4D    .:.S...A ......rM
1310: 37 32 33 C8 F0 E7 47 53    40 2A F7 2A F7 77 A9 F0    723...GS @*.*.w..
1320: 53 0D 49 A9 B8 39 F0 77    77 53 02 49 B9 F2 91 19    S.I..9.w wS.I....
1330: B8 43 CB F0 47 A0 53 0F    03 4F A3 2A F7 2A F7 77    .C..G.S. .O.*.*.w
1340: 2B 97 A7 F7 2B E6 49 53    80 91 19 64 0D 04 C5 1F    +...+.IS ...d....
1350: 06 5B 4F 66 6D 7D 07 7F    67 39 79 71 3D 76 73 89    .[Ofm}.. g9yq=vs.
1360: 1F BA 1F FD 53 E0 A9 09    37 5A 49 2D DD 5A 96 BA    ....S... 7ZI-.Z..
1370: B8 FC 80 37 47 2C DC 96    BA FD 53 0F A9 FC 53 F0    ...7G,.. ..S...S.
1380: 49 B8 37 A0 FC 53 0F A9    FD 53 10 49 A9 18 F0 5A    I.7..S.. .S.I...Z
1390: A0 BA 30 BB 80 F9 5A 96    A7 F0 5A C6 A7 FA 37 53    ..0...Z. ..Z...7S
13A0: 0F 59 96 A7 F8 4B A0 FB    77 AB FA 77 77 AA 37 F2    .Y...K.. w..ww.7.
13B0: 95 F9 40 A0 03 A0 27 67    40 A0 04 C5 B8 57 F0 17    ..@...'g @....W..
13C0: 14 E1 AA B9 30 64 CD B8    3B F0 D2 CD C9 F9 D4 92    ....0d.. ;.......
13D0: C6 BC D2 DC 23 00 C6 DC    D4 F3 64 BC F0 B8 57 53    ....#... ..d...WS
13E0: 85 96 E9 F0 C6 F4 07 64    ED F0 17 D2 F4 53 3F A0    .......d .....S?.
13F0: 23 06 F4 80 94 FA 64 BC    B8 F1 C6 FD 18 F8 C4 92    #.....d. ........
1400: BB 4D 84 08 B8 26 BB 51    B9 3B F1 47 53 02 AA 6B    .M...&.Q .;.GS..k
1410: AB A3 60 2B 17 18 A3 70    2A 96 1E FB 84 42 27 A8    ..`+...p *....B'.
1420: B9 8E BC 09 97 28 67 28    67 29 97 67 29 E6 33 6B    .....(g( g).g).3k
1430: 28 7A 28 EC 25 03 01 AA    F8 13 00 F2 40 2A 84 42    (z(.%... ....@*.B
1440: 27 AA 14 E3 AB 47 5F 2A    5F 47 4A AA 83 2C 01 EC    '....G_* _GJ..,..
1450: FF 00 00 C0 FE B8 55 F0    D3 05 B8 22 C6 60 B8 24    ......U. ..."`.$
1460: 00 54 DA D4 94 C6 55 F0    53 05 97 96 6E A7 88 55    .T....U. S...n..U
1470: F0 D3 05 B8 31 B9 22 C6    7D B8 33 B9 24 F7 AA BB    ....1.". }.3.$...
1480: 02 65 FA BC FF BD FF 12    8C BC 01 1D F0 6C A0 18    .e...... .....l..
1490: F0 7D A0 F9 A8 EB 82 55    FA 53 0E B8 08 C6 A1 88    .}.....U .S......
14A0: 09 F8 F4 80 94 FA 84 55    B8 39 F0 32 B4 B8 37 F0    .......U .9.2..7.
14B0: 47 5F 96 B5 83 B8 64 B0    8C B8 55 A0 03 C8 B3 94    G_....d. ..U.....
14C0: FA B8 55 A0 B8 64 A0 84    A8 D8 DA DC DE E0 E0 E2    ..U..d.. ........
14D0: E4 E8 EC F0 F2 F4 F6 F8    64 BC A4 4F E4 1C C4 00    ........ d..O....
14E0: 84 55 A4 94 23 02 E4 31    23 01 E4 31 23 08 E4 31    .U..#..1 #..1#..1
14F0: E4 78 E4 78 E4 78 24 C0    E4 57 B8 38 27 A0 83 FF    .x.x.x$. .W.8'...
1500: B8 3C A0 03 F5 F6 18 F0    07 AC F5 34 A8 AD FD A3    .<...... ...4....
1510: A0 18 1D EE 0E FC D4 B6    E5 B8 3C F0 C6 36 03 EF    ........ ..<..6..
1520: F6 20 F0 14 E1 AB 03 EF    BA EC F6 2E BA 5C 27 F4    . ...... .....\'.
1530: 45 F0 03 F1 F6 37 83 D4    7C F5 34 00 E5 A4 18 99    E....7.. |.4.....
1540: 4A F0 00 51 22 66 00 66    00 3E C5 00 04 00 04 B8    J..Q"f.f .>......
1550: 4D F0 53 07 47 AA F0 47    53 07 AB 23 60 D4 92 C6    M.S.G..G S..#`...
1560: 4F F0 B8 4D B2 78 72 6E    F0 17 72 90 A4 73 F0 07    O..M.xrn ..r..s..
1570: 5F C6 90 53 07 30 A4 8C    32 81 F0 03 10 F2 90 A4    _..S.0.. 2.......
1580: 88 F0 03 F0 53 F6 C6 90    53 70 30 A0 23 04 F4 80    ....S... Sp0.#...
1590: 94 FA A4 4F B8 36 54 C0    D4 94 C6 94 F0 B8 36 D2    ...O.6T. ......6.
15A0: B1 12 AB F0 5F C6 CB F0    07 A4 C2 F0 17 72 CB A4    ...._... .....r..
15B0: C2 52 BD F0 53 70 C6 CB    F0 03 F0 A4 C2 F0 83 10    .R..Sp.. ........
```

```
15C0: F6 CB 43 80 53 F7 A0 23   02 F4 80 94 FA A4 94 17   ..C.S..#  ........
15D0: AC B9 3B F1 BD 12 B2 DC   BD 0A 1B 1B FB A3 2B 17   ..;.....  ......+.
15E0: A3 6D 2B 13 00 2B EC E1   A0 18 FB A0 83 01 22 01   .m+..+..  ......".
15F0: 54 02 42 01 F4 00 14 00   BE B8 3F 20 43 80 20 93   T.B.....  ..? C. .
1600: 27 D4 B5 54 E0 D4 94 C6   00 F0 B8 2F B2 21 72 17   '..T....  .../.!r.
1610: F0 83 10 F6 36 C4 31 F0   53 F0 C6 36 F0 03 F0 C4   ....6.1.  S..6....
1620: 31 32 2B F0 17 5F C6 36   10 C4 32 F0 5F C6 36 F0   12+.._.6  ..2._.6.
1630: 07 A0 23 01 F4 80 94 FA   C4 00 B8 3D F0 BA B2 72   ..#.....  ...=...r
1640: 42 CA 53 03 17 2A D4 92   C6 3A F0 B8 3D B2 68 47   B.S..*..  .:..=.hG
1650: F7 F0 53 03 F6 58 17 17   07 52 64 20 53 FC 40 A0   ..S..X..  .Rd S.@.
1660: 23 03 F4 80 94 FA C4 3A   F0 D3 08 C4 5F B9 64 F1   #......:  ...._.d.
1670: 96 91 B9 20 A1 19 A1 B9   65 F1 96 81 B9 41 F1 5F   ... ....  e....A._
1680: A1 B9 3E F1 53 C0 21 5F   C6 91 B9 5F B1 8C 19 B1   ..>.S.!_  ..._....
1690: 8C 83 F4 45 F5 34 00 E5   D4 6D B8 37 F0 47 5F C6   ...E.4..  .m.7.G_.
16A0: B0 B9 55 D1 5F 96 B0 18   F0 F2 AE 53 60 83 84 FA   ..U._...  ...S`...
16B0: C7 07 D7 84 BF AA 47 5F   BB ED 96 C3 B8 2F F0 47   ......G_  ...../.G
16C0: 5F BB F1 B8 2A B4 CF FA   5F BB ED 96 C3 B8 2F F0   _...*...  _...../.
16D0: 5F BB F5 B6 2C A4 CF B5   3B F0 3A EF 52 E0 BA 0B   _...,...  ;.:.R...
16E0: F7 27 13 31 D4 92 C6 D7   B8 04 D2 EE B8 80 F8 D4   .'.1....  ........
16F0: F3 C4 D7 B8 3B D0 A0 94   FA 23 07 E4 80 FF FF FF   ....;...  .#......
1700: F0 37 61 37 AA 18 19 F0   37 71 37 2A C8 C9 F6 11   .7a7....  7q7*....
1710: 83 37 03 01 2A 37 13 00   2A 97 A7 83 B8 3B F0 BA   .7..*7..  *....;..
1720: 0A B2 25 BA 0C 23 B8 D4   92 C6 1C 23 20 D4 F3 E4   ..%..#..  ...# ...
1730: 1C B8 68 A0 B8 68 B9 3B   F0 51 74 F8 C6 34 B8 68   ..h..h.;  .Qt..4.h
1740: F0 D4 F3 E4 34 B9 41 31   53 F0 2A 19 A1 19 FB A1   ....4.A1  S.*.....
1750: B9 3A F1 5F 4A A1 83 B8   39 F0 53 04 74 F8 C6 57   .:._J...  9.S.t..W
1760: 18 F0 D3 04 A0 94 FA E4   57 B8 5E F0 DD B2 77 B8   ........  W.^...w.
1770: FA 23 03 90 18 27 90 83   23 F0 D4 92 94 FA E4 78   .#...'..  #......x
1780: F5 D4 AD E5 83 FF FF FF   FF FF FF FF FF FF FF FF   ........  ........
1790: FF FF FF FF FF FF FF FF   FF FF FF FF FF FF FF 99   ........  ........
17A0: 7F 00 00 00 00 F5 A4 B7   99 7F 00 00 00 00 84 BF   ........  ........
17B0: F4 00 99 7F 00 00 00 14   E1 99 7F 00 00 00 F4 45   ........  ...... E
17C0: 99 7F 00 00 00 D4 6D 99   7F 00 00 00 F5 34 00 E5   .....m.   .....4..
17D0: 99 7F 00 00 00 F5 54 8F   E5 99 7F 00 00 00 F5 D4   ......T.  ........
17E0: F6 E5 99 7F 00 00 00 F5   D4 D6 E5 99 7F 00 00 00   ........  ........
17F0: F5 D4 81 E5 99 7F 00 99   7F 00 00 00 00 00 00 83   ........  ........
1800: B0 81 18 B0 61 18 B9 3B   23 02 D4 F3 E7 24 45 F0   ....a..;  #....$E.
1810: F2 1B B9 57 BB 06 F0 53   3F 04 9A 42 53 03 C6 12   ...W...S  ?..BS...
1820: 24 1C B9 53 23 02 D4 F6   B9 3A 41 A1 24 44 F0 67   $..S#...  .:A.$D.g
1830: D3 30 53 30 C6 34 B9 39   F1 67 E7 04 8E B9 20 23   .0S0.4.9  .g.... #
1840: 0A 04 57 B9 2A 04 49 B9   37 23 0D 04 57 B9 44 23   ..W.*.I.  7#..W.D#
1850: 09 04 57 B9 4D 23 08 D4   F3 24 45 F0 53 9F 20 37   ..W.M#..  .$E.S. 7
1860: 53 60 C6 62 D3 60 B9 3F   21 53 9F 41 A1 B9 3B F1   S`.b.`.?  !S.A..;.
1870: 37 32 77 F0 53 FD A0 F1   47 77 B9 37 41 37 B9 39   72w.S...  Gw.7A7.9
1880: 72 8A F1 53 08 20 53 F7   40 A0 F1 53 64 40 A1 B8   r..S. S.  @..Sd@..
1890: 65 B0 8C 24 44 B9 3D BB   03 F0 A1 04 BB B9 4D 23   e..$D.=.  ......M#
18A0: 06 D4 F6 34 44 23 04 D4   AD 23 05 C4 AD B9 31 2B   ...4D#..  .#....1+
18B0: 08 04 B7 B9 33 BB 09 23   02 D4 F6 34 44 FB C4 AD   ....3..#  ...4D...
18C0: F0 D4 D6 24 44 B9 3E F0   04 8E B9 3B F1 77 77 B9   ...$D.>.  ...;.ww.
18D0: 3E 51 52 93 B9 41 F0 31   04 8E F0 53 08 B9 3A 21   >QR..A.1  ...S..:!
18E0: 53 F7 41 21 C6 93 B9 F0   BA 05 18 F0 91 19 EA EA   S.A!....  ........
18F0: 04 8F B9 30 F0 04 2B E5   B4 00 F5 83 FF FF FF FF   ...0..+.  ........
1900: 54 8F E6 05 83 D3 09 96   25 18 F0 37 96 1C F8 A9   T.......  %..7....
1910: 18 BA 04 F0 A1 18 19 37   C6 1E EA 13 44 F5 FA 03   .......7  ....D...
1920: F8 37 B9 6B A1 F0 53 C0   C6 1C F0 D2 31 03 04 24   .7.k..S.  ....1..$
1930: 36 03 BC F6 42 F0 03 69   F6 42 B0 06 18 43 C0 03   6...B..i  .B...C..
1940: 6A B3 B0 15 27 17 B8 6B   60 A0 B8 67 F0 D3 F1 C6   j...'..k  `..g....
1950: 1C C4 81 6A 6C 6E 70 72   74 76 78 7A 7C 7E 84 8A   ...jlnpr  tvxz|~..
```

```
1960: 90 96 98 9A 9C 9E A0 A2    A4 A6 04 00 04 0F 04 22    ........ ......."
1970: 04 2E 04 3D 04 43 04 47    04 4D 04 53 04 5B B9 2E    ...=.C.G .M.S[..
1980: BB 00 04 99 B9 2F BB 01    04 99 B9 36 BB 02 04 99    ...../.. ...6....
1990: B9 3B BB 07 04 99 04 95    04 9D 04 AD 04 B3 04 C0    .;...... ........
19A0: 04 C5 04 CA 04 DA 04 F2    E7 E7 03 BA AE A3 A8 1E    ........ ........
19B0: FE A3 AD 1E FE A3 2E 17    A3 83 2E 00 01 3F 2F 01    ........ .....?/.
19C0: 01 40 36 02 01 41 3D 03    01 42 4D 04 01 43 4E 05    .@6..A=. .BM..CN.
19D0: 05 44 57 0A 01 49 3B 0B    01 4A 31 0C 02 4B 33 0E    .DW..I;. .J1..K3.
19E0: 02 4D AF B9 08 DE 67 FD    67 2E 67 2E AD 37 F2 F7    .M....g. g.g..7..
19F0: D3 DF AD FE D3 01 AE FF    77 AF E9 E5 5F 0F 97 83    ........ w..._...
1A00: B8 22 B9 2A E5 F4 00 E6    15 B9 2C F4 00 2A 43 80    ."".*.... ..,..*C.
1A10: 2A F6 15 27 AA B9 20 A1    FA 19 A1 B9 39 F1 53 21    *..'.. .. ....9.S!
1A20: 96 8D B9 3F F1 00 00 47    77 53 03 AB 96 40 B9 24    ...?...G wS...@.$
1A30: F4 00 BB 01 E6 37 1B B9    3F 03 F6 F6 40 FA C6 45    .....7.. ?...@..E
1A40: F1 53 FC 4B A1 F1 77 77    B8 21 D0 BA 00 F2 5E BA    .S.K..ww .!....^.
1A50: 0F F0 53 7F 96 5E C8 F0    53 F0 96 5E F0 AA B8 35    ..S..^.. S..^...5
1A60: FA C6 73 DF C6 73 F0 5F    37 6A 37 E6 6F 37 17 03    ..s..s._ 7j7.o7..
1A70: FD E6 8D FA 96 89 B9 25    F1 07 96 89 C9 F1 03 A2    .......% ........
1A80: E6 39 03 6A F6 89 18 F0    AA FA F5 D4 D6 F5 83 27    .9.j.... ........'
1A90: AA AD AE B8 58 A0 B8 69    B4 0A F6 EA C6 ED AB B9    ....X..i ........
1AA0: 5C B1 F8 B9 5C F1 C6 EB    F5 B4 0A F6 A3 18 A0 CA    \...\... ........
1AB0: FA C6 CA D3 FC 96 9F F0    07 C8 40 D3 04 96 ED C8    ........ ..@.....
1AC0: F0 03 02 AA 03 ED E6 9F    44 ED FB D3 F1 C6 D7 B8    ........ D.......
1AD0: 57 F0 17 DB 96 ED 00 FD    4E 96 ED B8 58 B0 FF 18    W....... N...X...
1AE0: A0 B8 6B A0 B9 67 FB A1    18 F0 83 27 A8 B9 F7 23    ..k..g.. ...'...#
1AF0: 00 91 F8 97 A7 B8 59 B0    00 C9 B0 00 83 FF FF FF    ......Y. ........
1B00: B8 39 B9 1D F1 53 40 A9    F0 53 BF 49 A0 B9 65 F1    .9...S@. .S.I..e.
1B10: 96 3B F0 53 6C A0 F2 26    B9 3B F1 12 26 39 37 F1    .;.Sl..& .;..&97.
1B20: 72 26 F0 43 08 A0 18 F0    53 F7 A0 B9 3F F1 53 9F    r&.C.... S...?.S.
1B30: A1 B9 3B F1 92 3B B9 41    F1 5F A1 B4 E7 B8 5B F6    ..;..;.A ._....[.
1B40: 5A F4 4E F1 00 5F AA F0    F2 55 FA F6 51 96 5A 64    Z.N.._.. .U..Q.Zd
1B50: 4F F4 78 64 5A FA C6 5A    F6 4F F0 5F D3 05 C6 8B    O.xdZ..Z .O._....
1B60: B4 E7 B8 22 BA 0D A7 27    13 01 AB A7 F0 AC 18 FA    ..."...' ........
1B70: 37 12 77 FC 40 C6 7F FC    03 24 F0 13 FA E6 82 FA    7.w.@... .$......
1B80: A1 83 FA D1 96 87 A1 18    1A EB 6B 83 34 A8 F5 F4    ........ ..k.4...
1B90: 1D FD 43 80 F4 00 56 96    F4 59 74 D0 2A 5F AC F4    ..C...V. .Yt.*_..
1BA0: 59 9A DF AB 74 E3 2C DA    92 AD C6 C8 83 AA BB 08    Y...t.,. ........
1BB0: FB 03 F7 A3 A9 DA 5F C6    BD EB B0 64 C8 F9 47 5F    ......_. ...d..G_
1BC0: A9 23 80 E7 E9 C3 DC AC    FC A0 18 1D EE 8E 27 83    .#...... ......'.
1BD0: A9 BA 00 BB 08 12 DD FB    03 F7 A3 DA AA F9 77 A9    ........ ......w.
1BE0: EB D5 2A B9 11 5F 97 67    2A 67 2A E6 F1 2B D3 10    ..*.._.g *g*..+..
1BF0: 2B E9 E7 4B D3 10 2A 83    8C 7B 6A 59 47 36 25 13    +..K..*. .{jYG6%.
1C00: B8 3B F0 37 12 88 B8 68    27 A0 B8 62 B0 F4 F4 4A    .;.7...h '..b...J
1C10: B8 62 F0 C6 88 34 00 B8    37 F0 AD B9 52 52 21 B9    .b...4.. 7...RR!.
1C20: 50 B8 68 F0 BC 80 32 2B    C9 BC 20 F9 2D 52 32 FC    P.h...2+ .. .-R2.
1C30: 47 AC F9 B8 4E 12 41 FC    77 AC F1 F4 69 43 02 84    G...N.A. w...iC..
1C40: 46 F1 47 F4 69 17 E5 F4    45 54 F6 F5 C6 76 F0 B8    F.G.i... ET...v..
1C50: 68 F2 88 D2 5E 37 B2 10    F0 17 53 03 84 09 FD A9    h...^7.. ..S.....
1C60: F0 12 69 F1 F4 37 31 84    70 F1 47 F4 37 47 31 A1    ..i..71. p.G.7G1.
1C70: 23 05 D4 AD 84 0A F0 53    E0 C6 18 C8 F0 B9 51 52    #......S ......QR
1C80: 83 89 4F 27 A1 19 84 6F    E5 84 FA E5 F4 6F F5 89    ..O'...o .....o..
1C90: 40 B8 7F B0 00 E8 93 99    BF BF 0F B8 1D B0 40 23    @....... ......@#
1CA0: F7 62 55 25 B8 68 F0 03    F6 F6 B8 F0 74 8C B8 68    .bU%.h.. ....t..h
1CB0: 10 C6 A4 F0 14 F7 84 A4    B0 FE B4 E7 F6 E8 B8 35    ........ .......5
1CC0: B0 30 F4 48 E6 CC 96 C2    23 0B 84 E4 65 B8 5A B0    .0.H.... #...e.Z.
1CD0: 00 B8 35 B0 09 55 F4 48    F6 E6 96 D6 B8 68 10 F0    ..5..U.H .....h..
1CE0: 96 CC 23 0C 14 F7 F4 78    54 EB B8 5F B0 8C 18 B0    ..#....x T.._....
1CF0: 8C B8 62 B0 FC A4 B7 FF    FF FF FF FF FF FF FF FF    ..b..... ........
```

```
1D00: B9 67 A1 B9 5C 31 F8 97    A4 0C 97 A7 0A B2 0C BF    .g..\1.. ........
1D10: 0F B9 5B F1 5F D3 05 C6    28 B9 1D F1 53 DF A1 B9    ..[._... (...S...
1D20: 5E F1 53 20 B9 1D 41 A1    0A B2 7A 05 F6 51 B9 5C    ^.S ..A. ..z..Q.\
1D30: F1 96 37 23 0F 04 F7 B9    F7 81 12 0F A9 E7 E7 49    ..7#.... .......I
1D40: 47 53 00 B9 3F 41 A1 F2    62 B9 67 F1 B9 F8 91 A4    GS..?A.. b.g.....
1D50: 62 B9 59 F1 C9 D1 96 59    83 F1 11 03 6A A9 F1 B9    b.Y....Y ....j...
1D60: 67 A1 B9 5E F1 5F 17 03    0A 37 B9 5D A1 B9 3F F1    g..^._.. .7.]..?.
1D70: 53 7F 21 F2 7C B9 67 F1    24 E2 E4 2B C7 07 D7 44    S.!.|.g. $..+...D
1D80: EC B8 2E F4 A3 C6 8B 23    01 14 F7 B8 30 F4 A3 C6    .......# ....0...
1D90: 93 B0 00 B8 32 B9 09 F4    96 B8 34 B9 0A F4 96 B8    ....2... ..4.....
1DA0: 36 F8 37 47 50 F2 AB 23    03 14 F7 B8 3D F0 03 50    6.7GP..# ....=..P
1DB0: E6 B6 23 04 14 F7 83 E5    B4 18 34 00 94 A8 B8 39    ..#..... ..4....9
1DC0: F0 B8 30 72 C7 B8 2E F0    D4 B5 F5 34 00 E5 B8 3C    ..0r.... ...4...<
1DD0: F8 96 D5 54 7D F4 F7 F5    54 00 34 00 D4 00 B4 81    ...T}... T.4.....
1DE0: 74 00 34 00 F5 A4 B7 B9    3B F1 19 97 00 00 00 00    t.4..... ;.......
1DF0: F1 03 F5 53 FE C6 F8 97    83 FF FF FF FF FF FF FF    ...S.... ........
1E00: B8 39 F0 12 14 92 0C B9    3B F1 92 15 E5 D4 81 F5    .9...... ;.......
1E10: F0 53 DF A0 83 19 F1 96    1F 23 05 F4 87 F6 2B B9    .S...... .#....+.
1E20: 3E F1 5F C6 0C E5 D4 7C    F5 C4 10 23 0F F4 87 E6    >._....| ...#....
1E30: 14 B9 5F F1 C6 41 03 0D    F6 14 F0 37 52 14 B1 F3    .._..A.. ...7R...
1E40: 83 F8 43 20 53 FB A0 B8    3D B9 3F F1 4F D2 51 F0    ..C S... =.?.O.Q.
1E50: 47 D4 D6 18 F0 52 5B B9    61 B1 FA 43 04 A0 E7 53    G....R[. a..C...S
1E60: 10 43 40 B9 41 31 A1 23    14 F4 87 E6 14 B9 61 F1    .C@.A1.# ......a.
1E70: 96 14 F0 43 08 A0 23 19    F4 87 E6 14 F0 43 10 A0    ...C..#. .....C..
1E80: 83 27 AD AE B8 6A F0 B4    00 B9 57 F1 17 B4 00 18    .'...j.. ..W.....
1E90: F0 AA B4 00 23 04 B4 00    23 01 B4 00 18 F0 F5 B4    ....#... #.......
1EA0: 00 EA 9C FD A8 FE B4 00    F8 B4 00 44 F5 A8 17 B9    ........ ...D....
1EB0: 3C D1 96 B5 A1 F8 34 A8    F5 F4 1D FD 43 C0 F4 00    <.....4. ....C...
1EC0: F4 1D FD 1D 43 40 F4 00    F0 18 74 D0 F4 05 FA F4    ....C@.. ..t.....
1ED0: 05 9A DF EE B8 83 5F 47    AA B4 E7 F6 F2 B9 36 FA    ......_G ......6.
1EE0: 37 61 F6 E6 F1 AA C9 FA    D1 53 F0 C6 F2 FA 65 31    7a...... .S....e1
1EF0: A1 55 83 29 28 29 AC AD    F0 A1 18 19 EC F8 FD 83    .U.)().. ........
1F00: B9 09 77 E4 0F B9 08 F2    0F 9A 7F 8A 40 E4 15 8A    ..w..... ....@...
1F10: 80 8A 40 E4 15 E7 8A 40    9A BF E9 07 83 9A 9F B9    ..@....@ ........
1F20: 5C B1 FB 8A 20 0A 37 B2    33 A4 0F 46 2E 83 B9 5C    \... .7. 3..F...\
1F30: F1 96 29 23 10 04 F7 5F    17 AB 03 F4 E6 46 C6 41    ..)#..._ .....F.A
1F40: 83 B8 4E F0 DC A0 FB 83    B4 0A B9 38 B1 00 B9 1D    ..N..... ...8....
1F50: F1 F7 F7 B9 35 F1 47 D1    83 23 01 8A 40 97 F7 46    ....5.G. .#..@..F
1F60: 62 17 9A BF 9A BF E6 5B    83 5F 03 00 57 AA F0 5C    b......[ ._..W..\
1F70: C6 75 23 34 83 23 38 83    B8 5A F0 03 F3 E6 86 B0    .u#4.#8. .Z......
1F80: 0C 23 01 B8 35 30 83 AA    B9 21 F1 C9 97 F7 E6 95    .#..50.. .!......
1F90: 96 95 FA 37 61 83 F0 53    7F 03 FE 03 FC F6 A0 83    ...7a..S ........
1FA0: F9 04 F7 F0 47 5F C6 AD    37 60 C7 53 40 83 FF FF    ....G_.. 7`.S@...
1FB0: FF FF FF FF FF FF FF FF    FF FF FF FF FF FF FF FF    ........ ........
1FC0: FF FF FF FF FF FF FF FF    FF FF FF FF FF FF FF FF    ........ ........
1FD0: FF FF FF FF FF FF FF FF    FF FF FF FF FF FF FF FF    ........ ........
1FE0: FF FF FF FF FF FF FF FF    FF FF FF FF FF FF FF FF    ........ ........
1FF0: FF FF FF FF FF FF FF FF    FF FF FF FF FF FF FF FF    ........ ........
2000: 0D 0A 1A 2A 2A 46 FE                                  ...**F.
```

APPENDIX B

```
0000: 04 00 FF 15 D5 E4 7D 04    09 D5 AF 23 F7 62 B8 58    ......). ...#.b.X
0010: F8 17 C6 28 89 F7 81 37    72 28 19 81 A9 18 F0 03    ...(...7 r(......
```

```
0020: 6A F2 28 F6 28 18 29 A1   B8 5B 18 F8 53 8F D3 8E   j.(.(.). .[..S...
0030: 96 33 30 D3 8E 12 3B 77   03 D0 B3 94 ED FC C6 C2   .30...;w ........
0040: 53 F0 96 C2 B8 3C F0 03   F5 E6 C2 04 4B 84 8E B9   S....<.. ....K...
0050: 02 18 F0 C6 56 18 E9 51   B8 3E F0 53 BF A0 43 80   ....V..Q .>.S..C.
0060: 04 BF A4 7D B4 00 04 BE   B8 5E 18 F8 53 3F 96 7C   ...}.... .^..S?.|
0070: B9 40 F1 53 30 C6 7C E7   E7 19 D1 A1 F0 96 C2 B9   .@.S0.|. ........
0080: 07 04 51 B8 5A B9 35 F0   96 99 F1 37 47 61 17 C6   ..Q.Z.5. ...7Ga..
0090: B9 18 F0 F7 77 A0 C8 23   D8 07 A0 18 96 A6 11 F0   ....w..# ........
00A0: F2 A6 F1 07 07 A1 F8 F7   FE F6 AC 37 53 03 AA 77   .........7S..w
00B0: 2A E7 4A 03 02 53 03 43   04 2E 53 78 4E AE FE B8   *.J..S.C ..SxN...
00C0: F9 90 C7 07 53 07 E7 03   09 A8 F0 53 EF A0 FF 93   ....S... ...S....
00D0: 4D 4F 62 64 68 63 C2 14   E1 14 E5 27 B8 44 A0 E4   MObdhc.. ...'.D..
00E0: 93 23 05 04 E7 23 0A B8   3E 50 C6 FE D0 A0 19 F0   .#...#.. >P......
00F0: 53 60 B8 61 B0 8C C6 FE   C8 B2 FC C8 B0 8C 83 FF   S`.a.... ........
0100: B8 39 F0 12 8F B8 55 F0   B8 62 40 C6 11 C4 F1 E4   .9....U. .b@.....
0110: A3 54 CE 94 00 B8 56 F0   96 4F 18 F0 17 C8 A0 B8   .T....V. .O......
0120: 3E F0 53 7F A0 18 F0 53   E3 A0 18 F0 53 7F A0 B3   >.S....S ....S...
0130: 45 B9 08 B0 00 18 E9 33   B8 3C F0 96 EA B8 20 F4   E......3 .<....
0140: 8E B8 24 F5 14 95 E5 B8   3B F0 37 D2 EF 24 F3 E9   ..$..... ;.7..$..
0150: 40 F4 00 F6 EA 18 18 18   28 96 EA F0 D3 81 C6 7E   @....... (......~
0160: D3 04 C6 7E D3 07 96 EF   B8 3E F0 53 3F 59 85 F4   ...~.... .>.S?...
0170: 00 F6 EA 53 10 B8 3F 20   53 EF 40 A8 24 EA C8 F0   ...S..? S.@.$...
0180: B8 55 A0 B9 80 F4 00 F6   EA 18 F8 C8 37 F2 A9 B9   .U...... ....7...
0190: 55 F1 37 B9 39 41 92 A9   B9 82 F4 00 B8 74 F0 47   U.7.9A.. .....t.G
01A0: E7 53 80 B8 3E 40 A0 24   B1 F4 8E B8 71 F5 14 95   .S..>@.$ ....q...
01B0: E5 B8 39 F0 12 EA 53 98   AA B8 3B F0 53 02 4A AA   ..9...S. ..;.S.J.
01C0: B8 3F F0 92 CE 53 60 4A   AA F4 74 96 CE 1A FA B9   .?...S`J ..t.....
01D0: 85 F4 00 B8 3F F0 92 E1   F4 74 96 E1 FF B9 5E F4   ....?... .t....^.
01E0: 00 F5 54 8F E5 F9 B9 98   F4 00 B8 3B F0 D2 F3 B8   ..T..... ...;....
01F0: 56 B0 01 F4 5E 96 4F C8   A0 B8 62 B0 FC C4 AB FF   V...^.O. ..b.....
0200: B8 3B F0 37 D2 B7 B8 57   F0 C6 B7 17 B8 68 A0 F4   .;.7...W .....h..
0210: B5 AA 23 31 F4 22 C6 00   B0 00 B8 3C F0 96 57 B8   ..#1."..  ...<..W.
0220: 28 44 69 B8 39 F0 12 B7   23 F2 F4 22 C6 32 B0 00   (Di.9... #..".2..
0230: 44 00 B8 5D F0 96 23 23   40 54 BD E6 42 95 B6 23   D..]..## @T..B..#
0240: 44 AE D3 81 AB C6 51 D3   04 C6 44 D3 07 96 00 BB   D.....Q. ..D.....
0250: F0 18 18 18 F0 C6 59 BB   B0 FB 96 92 85 23 B8 54   ......Y. .....#.T
0260: BD E6 69 95 B6 5D 27 44   7B F0 18 03 F1 F6 73 F0   ..i..]'D {.....s.
0270: F7 C6 7B F0 F7 23 E0 F6   7B 23 A0 AB B8 68 F4 76   ..{..#.. {#...h.v
0280: 96 86 FB 43 05 AB BE 32   FB C6 94 5F C6 92 BE 02   ...C...2 ..._....
0290: 44 94 BE 12 B8 68 F0 F4   B5 AA FE F4 22 B3 5E B0   D....h.. ....".^.
02A0: 00 B8 62 B0 FF F4 24 96   2E B8 62 F0 96 A5 85 B8   ..b...$. ..b.....
02B0: 68 F4 60 96 23 44 00 23   F0 F4 22 44 B7 B8 58 B0   h.`.#D.# .."D..X.
02C0: FF B8 6C B9 68 A0 C8 B0   01 C8 F1 A0 64 BB B8 62   ..l.h... ....d..b
02D0: B0 FC F4 CA B8 39 F0 B3   62 B9 37 37 53 02 C6 E3   .....9.. b.77S...
02E0: F1 53 F0 19 41 C6 EE 27   A0 B8 55 A0 E4 A3 97 B9   .S..A..' ..U.....
02F0: 5D F1 C6 F9 F0 96 D2 A7   83 A0 B8 58 B0 FF 83 FF   ]....... ...X....
0300: B8 3B F0 37 AB 97 52 1B   B8 3D F0 37 72 1B B8 26   .;.7..R. .=.7r..&
0310: B9 01 BA 2C D4 F5 53 F0   4A C6 21 B8 39 F0 F7 77   ...,..S. J.!.9..w
0320: A0 B8 3D F0 47 5F 17 AA   23 CE B9 FF 03 32 29 13   ..=.G_.. #....2).
0330: 00 29 EA 2C 17 AA B8 26   D4 F5 B9 00 FB 92 43 F6   .)...,.& ......C.
0340: 43 B9 18 B8 39 F0 53 EF   49 A0 B8 44 F0 F2 54 B8   C...9.S. I..D..T.
0350: 56 F0 C6 55 83 F5 34 6E   54 8F E5 27 AC AD B8 37   V..U..4n T..'...7
0360: F0 37 32 68 B9 49 F1 AC   F0 37 12 70 B9 45 F1 AD   .72h.I.. .7.p.E..
0370: F0 47 E7 53 60 B8 3F 50   C8 C6 91 D2 87 F0 5F 4D   .G.S`.?P ......_M
0380: 96 85 FC 96 B9 C4 5C F0   5F 4C 96 8F FD 96 B9 C4   ......\. _L......
0390: 00 C8 FB 37 D2 9A F0 53   FC A0 F0 53 03 37 AB FC   ...7...S ...S.7..
```

```
03A0: 37 6D F6 B5 37 96 AF B8   4A B9 46 F4 AE F6 B5 FB   7m..7... J.F.....
03B0: 6C F6 8F 04 D7 FB 6D F6   85 04 D7 F4 EE F6 D3 B8   l.....m. ........
03C0: 5C B0 F8 F4 D3 E6 D4 96   D3 B8 5C F0 96 C3 27 B9   \....... ..\...'.
03D0: 5D B1 00 83 A7 B9 37 F1   53 F0 B9 68 96 E0 B9 56   ].....7. S..h...V
03E0: F1 B9 6A D1 96 D3 F0 D3   06 96 CE 97 18 F0 64 CF   ..j..... ......d.
03F0: B9 47 64 F6 B9 4B AB F1   97 96 FF C9 F1 37 6B 83   .Gd..K.. .....7k.
0400: B8 3A F0 37 BA 01 12 0B   32 0B CA 27 AD AE FA F4   .:.7.... 2..'....
0410: 84 96 1D B8 53 F0 F4 84   18 F0 C8 F4 84 65 FA F4   ....S... .....e..
0420: 89 96 2A F0 F4 89 18 F0   F4 89 FE F4 89 FD F4 89   ..*..... ........
0430: FA C6 5B B8 01 B4 DA E6   88 A0 18 F8 03 FB E6 35   ..[..... .......5
0440: 27 AD AE B8 01 20 F4 84   A9 18 F8 03 FB F9 E6 45   '.... .. .......E
0450: FD 4E 96 88 23 02 A8 B9   53 F4 DC BA 01 55 B8 3A   .N..#... S....U.:
0460: F0 53 FC 4A A0 37 99 BF   12 87 85 54 CE F6 87 B9   .S.J.7.. ...T....
0470: 6A B1 F1 19 B1 03 19 B1   42 19 B8 53 23 02 F4 DC   j....... B..S#...
0480: F4 EE E6 87 95 B6 6B 83   89 40 BA 00 84 5D B8 3A   ......k. .@...].:
0490: F0 53 F8 AB B8 41 F0 AA   18 B9 F0 FB 72 DB 37 32   .S...A.. ....r.72
04A0: C1 C8 F0 E7 47 53 40 2A   F7 2A F7 77 A9 F0 53 0D   ....GS@* .*.w..S.
04B0: 49 A9 B8 39 F0 77 77 53   02 49 B9 F2 91 19 B8 43   I..9.wwS .I.....C
04C0: CB F0 47 A0 53 0F 03 DD   A3 2A F7 2A F7 77 2B 97   ..G.S... .*.*.w+.
04D0: A7 F7 2B E6 D7 53 80 91   19 84 9B 84 C2 3F 06 5B   ..+..S.. .....?.[
04E0: 4F 66 6D 7D 07 7F 67 39   79 71 3D 76 73 B8 5E F0   Ofm}..g9 yq=vs.^.
04F0: DD B2 FB B8 FA 23 03 90   18 27 90 83 FF FF FF FF   .....#.. .'......
0500: B8 F6 76 16 B5 FD F7 B9   33 F6 0D B9 31 F1 C8 90   ..v..... 3...1...
0510: 18 19 F1 F7 77 90 80 F2   7C A5 FD F2 2A 43 80 AD   ....w... |...*C..
0520: 8A 10 FE 53 07 AE B9 22   A4 53 FE B2 4B 92 44 72   ...S..." .S..K.Dr
0530: 3D 43 08 AE 80 53 40 2D   53 BF 4D AD 83 03 08 AE   =C...S@- S.M.....
0540: B9 24 A4 53 43 38 AE B9   26 A4 53 9A EF FD 53 7F   .$.SC8.. &.S...S.
0550: AD B9 28 27 AA BB 03 97   F7 2A F7 2A 61 19 2A 71   ..('.... .*.*a.*q
0560: 2A C9 EB 57 AB C8 80 6B   AB 18 80 53 07 7A BA 03   *..W...k ...S.z..
0570: 97 67 2B 67 2B EA 70 2B   A1 19 FB A1 83 89 1F BA   .g+g+.p+ ........
0580: 1F FD 53 E0 A9 09 37 5A   49 2D DD 5A 96 D8 B8 FC   ..S...7Z I-.Z....
0590: 80 37 47 2C DC 96 D8 FD   53 0F A9 FC 53 F0 49 B8   .7G,.... S...S.I.
05A0: 37 A0 FC 53 0F A9 FD 53   10 49 A9 18 F0 5A A0 BA   7..S...S .I...Z..
05B0: 30 BB 80 F9 5A 96 C5 F0   5A C6 C5 FA 37 53 0F 59   0...Z... Z...7S.Y
05C0: 96 C5 F0 4B A0 FB 77 AB   FA 77 77 AA 37 F2 B3 F9   ...K..w. .ww.7...
05D0: 40 A0 03 A0 27 67 40 A0   04 C2 BE 00 09 37 B2 E4   @...'g@. .....7..
05E0: EE DC 97 83 BE 11 EE E6   BE 80 09 47 67 67 FE 67   ........ ...Ggg.g
05F0: BE 09 EE F2 AE E6 EA 09   B2 FB 97 FE 83 FF FF FF   ........ ........
0600: B8 32 F0 77 77 53 20 43   DC B8 3E 50 A0 B9 40 F1   .2.wwS C ..>P..@.
0610: 92 13 27 AA 37 52 1B 14   E1 04 E5 23 05 74 F4 E6   ..'.7R.. ...#.t..
0620: 23 04 D7 23 0F 74 F4 F6   4B 23 40 F4 93 96 5B F0   #..#.t.. K#@...[.
0630: 52 39 B9 61 F1 96 5B B1   D1 B9 34 F1 37 77 47 B9   R9.a..[. ..4.7wG.
0640: 3B 41 47 77 77 53 10 43   04 40 A0 FA 72 19 23 14   ;AGwwS.C .@..r.#.
0650: 74 F4 F6 5B 00 00 00 00   00 F4 48 83 B8 3E F0 53   t..[.... ..H..>.S
0660: F3 A0 B9 40 F1 B2 68 27   AA 37 12 70 14 E1 04 E5   ...@..h' .7.p....
0670: 23 05 74 F0 E6 78 04 D7   23 0F 74 F0 F6 9A 23 20   #.t..x.. #.t...#
0680: F4 93 96 AA F0 12 8E B9   61 F1 96 AA B1 D1 B9 32   ........ a......2
0690: F1 37 77 77 43 11 53 31   40 A0 FA 32 6E 23 14 74   .7wwC.S1 @..2n#.t
06A0: F8 F6 AA 00 00 00 00 00   F4 44 83 B8 39 F0 12 F3   ........ .D..9...
06B0: B8 40 F0 F2 BC D2 BB 43   40 C4 BE 27 53 BF A0 C8   .@.....C @..'S...
06C0: F0 AA 53 60 B8 44 C6 D4   B9 4C D2 CE B9 48 F1 76   ..S`.D.. .L...H.v
06D0: D4 F0 D3 80 A0 B8 57 B9   39 53 7F 07 D0 96 E7 FA   ......W. 9S......
06E0: 92 E7 F1 43 20 C4 EA F1   53 DF A1 37 B2 F1 FF F4   ...C ... S..7....
06F0: E5 74 00 E4 A3 23 69 29   A1 C9 FA A1 E4 AE FF FF   .t...#i) ........
0700: B8 69 A0 C8 F9 A0 85 54   CE F6 21 B8 56 B9 6A F0   .i.....T ..!.V.j.
0710: A1 19 23 02 A1 B8 68 19   F4 DC 74 BB E6 21 95 B6   ..#...h. ..t..!..
0720: 07 83 F4 BC F4 CA F4 C3   B8 37 F8 47 5F C6 3F B9   ........ .7.G_.?.
0730: 55 D1 5F 96 3F 18 F0 F2   3C 53 60 83 27 A0 83 C7   U._.?... <S`.'...
```

```
0740: 07 D7 E4 AC BA 12 E4 4A  BA 08 B8 61 B9 66 F0 96   .......J ...a.f..
0750: 5D F1 C6 58 11 B0 D1 83  B8 3E F0 4A A0 83 B8 56   ]..X.... .>.J...V
0760: B9 39 F1 B9 57 37 53 01  C6 72 F1 03 C2 D0 C6 72   .9..W7S. .r.....r
0770: F0 07 A0 83 B8 56 B9 44  F1 53 7F D0 83 B8 3F 20   .....V.D .S....?
0780: 43 80 20 93 F5 34 D2 E5  83 F5 74 00 E5 83 F5 54   C. ..4.. ..t....T
0790: 51 E5 83 F5 34 00 E5 83  FF FF FF FF FF FF FF 00   Q...4... ........
07A0: 00 24 00 89 80 00 00 00  00 00 44 00 89 80 89 80   .$...... ..D.....
07B0: 00 00 00 00 83 89 80 00  00 00 00 83 89 80 00 00   ........ ........
07C0: 00 00 83 89 80 00 00 00  00 83 89 80 00 00 00 00   ........ ........
07D0: 00 00 83 89 80 00 00 00  00 00 00 83 89 80 00 00   ........ ........
07E0: 00 00 00 00 83 89 80 00  00 00 00 00 00 83 89 80   ........ ........
07F0: 00 00 00 00 00 00 83 00  00 F5 14 00 E5 89 80 FF   ........ ........
0800: B8 37 F0 47 B9 39 40 F2  79 B8 3B F0 37 12 94 B9   .7.G.9@. y.;.7...
0810: 53 F1 5F C6 8E BA 80 74  1E F6 8E AC BA 07 F1 47   S._....t ........G
0820: 5A C6 8E A9 58 4D F0 47  5A C6 8E 37 2A 50 C6 8E   Z...M.G Z..7*P..
0830: AB 6A 67 2B 37 17 69 2B  F2 42 F6 44 B8 51 BA 10   .jg+7.i+ .B.D.Q..
0840: 04 4C F6 48 F9 6A F6 3C  B8 4F BA 01 F0 5F AD C6   .L.H.j.< .O..._..
0850: 85 F0 47 5F AE C6 85 B9  4E FD 74 1E F6 85 AD FA   ..G_.... N.t.....
0860: 2E 2A E7 2A 74 1E 2E AA  F6 85 FD 37 6E F6 80 FC   .*.*t... ...7n...
0870: 37 6D E6 79 FC 37 6E E6  95 B8 39 F0 53 F7 A0 83   7m.y.7n. ..9.S...
0880: FC 37 6D E6 74 18 FA E7  E7 AA 53 11 C6 4C B8 39   .7m.t... ..S..L.9
0890: F0 43 08 A0 83 B9 00 BA  FA E5 D4 F5 F5 E6 A5 B9   .C...... ........
08A0: 3F F1 43 04 A1 B9 3B F1  AB B9 02 BA BC 52 B3 B9   ?.C...;. .....R..
08B0: 03 BA 84 E5 D4 F5 F5 F6  BF B9 3F F1 43 08 A1 B9   ........ ..?.C...
08C0: 3B F1 37 F2 FD BC 01 FB  BB 31 52 CE BB 41 54 80   ;.7..... .1R..AT.
08D0: FC E7 AC 37 92 CE BC 01  B9 3D F1 52 F3 FB 03 BF   ...7.... .=.R....
08E0: F6 FD FB 03 04 A8 8C 04  B9 28 F1 53 E0 96 F3 19   ........ .(.S....
08F0: F1 C6 F5 B8 28 54 00 FC  E7 AC 37 92 F5 83 FF FF   ....(T.. ..7.....
0900: AC C6 27 B8 60 B2 08 C8  B9 3B F1 F7 F7 B9 39 F1   ..'.`... .;....9.
0910: 37 52 1B 27 F6 1A B8 5F  A0 18 A0 F6 24 B8 5F F0   7R.'..._ ....$._.
0920: 18 40 24 25 F0 96 6D B8  3F F0 53 9F 4C 20 D0 5C   .@$%..m. ?.S.L .\
0930: B8 66 C6 4F B9 61 B1 F3  FC F7 F7 23 50 F6 45 E5   .f.O.a.. ...#P.E.
0940: 74 F0 F5 24 49 E5 74 F4  F5 B0 00 F6 4F B0 F7 B9   t..$I.t. ....O...
0950: 39 F1 53 FB 21 37 52 5A  B0 00 B3 3E B9 32 F1 F2   9.S.!7RZ ...>.2..
0960: 6C FC C6 6C 53 28 AC F0  53 DF 4C A0 27 83 B8 3E   l..lS(.. S.L.'..>
0970: B9 39 F1 72 7A B9 37 F1  52 B9 F0 F2 B9 B9 34 F1   .9.rz.7. R.....4.
0980: 37 F2 AB B9 3B F1 52 AB  B9 3F F1 37 D2 AB B9 40   7...;.R. .?.7...@
0990: F1 D3 1C 53 1C C6 9B F0  37 92 B4 B9 5F F1 C6 B4   ...S.... 7..._...
09A0: F0 5F 96 B4 B9 44 F1 C6  B4 24 B9 F0 5F 96 B9 B9   ._...D.. .$.._...
09B0: 44 F1 96 BD F0 53 EF 24  BC F0 43 10 A0 B9 32 F1   D....S.$ ..C...2.
09C0: 37 F2 D1 B9 39 F1 72 CD  F0 43 20 24 D0 F0 53 DF   7...9.r. .C $..S.
09D0: A0 83 AF B9 08 DE 67 FD  67 2E 67 2E AD 37 F2 E7   ......g. g.g..7..
09E0: D3 DF AD FE D3 01 AE FF  77 AF E9 D5 BF 0F 97 83   ........ w.......
09F0: FF FF FF FF FF FF FF FF  FF FF FF FF FF FF FF FF   ........ ........
0A00: B9 69 FB A3 A1 C9 1B FB  A3 A1 1B E5 F4 AE F5 B9   .i...... ........
0A10: 40 FC 53 03 C6 1B 27 E6  2E 44 1D F6 2E F1 5C AD   @.S...'. .D....\.
0A20: C6 2A 53 03 BD 20 96 2A  BD 10 FD 4C 43 80 41 A1   .*S.. .* ...LC.A.
0A30: 83 00 96 00 C8 05 14 04  4C 00 96 00 C8 03 20 02   ........ L.......
0A40: EE 00 96 00 C8 05 14 04  4C 00 96 00 C8 05 14 04   ........ L.......
0A50: 4C B9 68 23 02 E5 F4 DC  F5 C9 F1 53 7F 21 B8 49   L.h#.... ...S.!.I
0A60: F2 64 B8 45 F1 C9 96 7B  F1 03 F1 F6 7B 59 44 F1   .d.E...{ ....{YD.
0A70: 53 7F B9 56 D1 B9 68 C6  7C 44 8E 10 18 E5 F4 AE   S..V..h. |D......
0A80: F5 E6 8E F1 A0 18 19 F1  A0 18 B9 56 F1 A0 83 B8   ........ ...V....
0A90: 3E F0 53 03 03 7F 53 80  A9 F0 53 0C 03 3C 53 40   >.S...S. ..S..<S@
0AA0: 49 A9 F0 53 10 E7 49 A9  F0 53 0A C6 B1 F9 43 10   I..S..I. .S....C.
0AB0: A9 B8 5B F0 5F D3 07 C6  C9 B8 40 F0 53 30 E7 E7   ..[._... ..@.S0..
0AC0: AA 37 59 2A 4F 18 50 4A  A0 83 43 4F 50 59 52 49   .7Y*O.PJ ..COPYRI
0AD0: 47 48 54 20 28 43 29 20  31 39 38 35 2C 38 36 20   GHT (C)  1985,86
```

```
0AE0: 42 59 20 50 41 52 4B 45  52 20 45 4C 45 43 54 52   BY PARKE R ELECTR
0AF0: 4F 4E 49 43 53 20 49 4E  43 FF FF FF FF FF FF FF   ONICS IN C.......
0B00: E7 BB 09 BC 19 EC 05 64  0B 12 0F 99 DF 64 13 89   .......d .....d..
0B10: 20 64 13 77 00 BC 09 EC  17 EB 09 89 20 83 AB 03    d.w.... .... ...
0B20: F4 E6 26 96 30 AB FA 51  C6 2E FB 03 0C AB FB 97   ..&.0..Q ........
0B30: 83 FF FF FF FF FF FF FF  FF FF FF FF FF FF FF FF   ........ ........
0B40: FF FF FF FF FF FF FF FF  FF FF FF FF FF FF FF FF   ........ ........
0B50: FF FF FF FF FF FF FF FF  FF FF FF FF FF FF FF FF   ........ ........
0B60: FF FF FF FF FF FF FF FF  FF FF FF FF FF FF FF FF   ........ ........
0B70: FF FF FF FF FF FF FF FF  FF FF FF FF FF FF FF FF   ........ ........
0B80: FF FF FF FF FF FF FF FF  FF FF FF FF FF FF FF FF   ........ ........
0B90: FF FF FF FF FF FF FF FF  FF FF FF FF FF FF FF FF   ........ ........
0BA0: FF FF FF FF FF FF FF FF  FF FF FF FF FF FF FF FF   ........ ........
0BB0: FF FF FF FF FF FF FF FF  FF FF FF FF FF FF FF FF   ........ ........
0BC0: FF FF FF FF FF FF FF FF  FF FF FF FF FF FF FF FF   ........ ........
0BD0: FF FF FF FF FF FF FF FF  FF FF FF FF FF FF FF FF   ........ ........
0BE0: FF FF FF FF FF FF FF FF  FF FF FF FF FF FF FF FF   ........ ........
0BF0: FF FF FF FF FF FF FF FF  FF FF FF FF FF FF FF FF   ........ ........
0C00: FF FF FF FF FF FF FF FF  FF FF FF FF FF FF FF FF   ........ ........
0C10: FF FF FF FF FF FF FF FF  FF FF FF FF FF FF FF FF   ........ ........
0C20: FF FF FF FF FF FF FF FF  FF FF FF FF FF FF FF FF   ........ ........
0C30: FF FF FF FF FF FF FF FF  FF FF FF FF FF FF FF FF   ........ ........
0C40: FF FF FF FF FF FF FF FF  FF FF FF FF FF FF FF FF   ........ ........
0C50: FF FF FF FF FF FF FF FF  FF FF FF FF FF FF FF FF   ........ ........
0C60: FF FF FF FF FF FF FF FF  FF FF FF FF FF FF FF FF   ........ ........
0C70: FF FF FF FF FF FF FF FF  FF FF FF FF FF FF FF FF   ........ ........
0C80: FF FF FF FF FF FF FF FF  FF FF FF FF FF FF FF FF   ........ ........
0C90: FF FF FF FF FF FF FF FF  FF FF FF FF FF FF FF FF   ........ ........
0CA0: FF FF FF FF FF FF FF FF  FF FF FF FF FF FF FF FF   ........ ........
0CB0: FF FF FF FF FF FF FF FF  FF FF FF FF FF FF FF FF   ........ ........
0CC0: FF FF FF FF FF FF FF FF  FF FF FF FF FF FF FF FF   ........ ........
0CD0: FF FF FF FF FF FF FF FF  FF FF FF FF FF FF FF FF   ........ ........
0CE0: FF FF FF FF FF FF FF FF  FF FF FF FF FF FF FF FF   ........ ........
0CF0: FF FF FF FF FF FF FF FF  FF FF FF FF FF FF FF FF   ........ ........
0D00: FF FF FF FF FF FF FF FF  FF FF FF FF FF FF FF FF   ........ ........
0D10: FF FF FF FF FF FF FF FF  FF FF FF FF FF FF FF FF   ........ ........
0D20: FF FF FF FF FF FF FF FF  FF FF FF FF FF FF FF FF   ........ ........
0D30: FF FF FF FF FF FF FF FF  FF FF FF FF FF FF FF FF   ........ ........
0D40: FF FF FF FF FF FF FF FF  FF FF FF FF FF FF FF FF   ........ ........
0D50: FF FF FF FF FF FF FF FF  FF FF FF FF FF FF FF FF   ........ ........
0D60: FF FF FF FF FF FF FF FF  FF FF FF FF FF FF FF FF   ........ ........
0D70: FF FF FF FF FF FF FF FF  FF FF FF FF FF FF FF FF   ........ ........
0D80: FF FF FF FF FF FF FF FF  FF FF FF FF FF FF FF FF   ........ ........
0D90: FF FF FF FF FF FF FF FF  FF FF FF FF FF FF FF FF   ........ ........
0DA0: FF FF FF FF FF FF FF FF  FF FF FF FF FF FF FF FF   ........ ........
0DB0: FF FF FF FF FF FF FF FF  FF FF FF FF FF FF FF FF   ........ ........
0DC0: FF FF FF FF FF FF FF FF  FF FF FF FF FF FF FF FF   ........ ........
0DD0: FF FF FF FF FF FF FF FF  FF FF FF FF FF FF FF FF   ........ ........
0DE0: FF FF FF FF FF FF FF FF  FF FF FF FF FF FF FF FF   ........ ........
0DF0: FF FF FF FF FF FF FF FF  FF FF FF FF FF FF FF FF   ........ ........
0E00: FF FF FF FF FF FF FF FF  FF FF FF FF FF FF FF FF   ........ ........
0E10: FF FF FF FF FF FF FF FF  FF FF FF FF FF FF FF FF   ........ ........
0E20: FF FF FF FF FF FF FF FF  FF FF FF FF FF FF FF FF   ........ ........
0E30: FF FF FF FF FF FF FF FF  FF FF FF FF FF FF FF FF   ........ ........
0E40: FF FF FF FF FF FF FF FF  FF FF FF FF FF FF FF FF   ........ ........
0E50: FF FF FF FF FF FF FF FF  FF FF FF FF FF FF FF FF   ........ ........
0E60: FF FF FF FF FF FF FF FF  FF FF FF FF FF FF FF FF   ........ ........
0E70: FF FF FF FF FF FF FF FF  FF FF FF FF FF FF FF FF   ........ ........
```

```
0E80: FF FF FF FF FF FF FF FF   FF FF FF FF FF FF FF FF   ........ ........
0E90: FF FF FF FF FF FF FF FF   FF FF FF FF FF FF FF FF   ........ ........
0EA0: FF FF FF FF FF FF FF FF   FF FF FF FF FF FF FF FF   ........ ........
0EB0: FF FF FF FF FF FF FF FF   FF FF FF FF FF FF FF FF   ........ ........
0EC0: FF FF FF FF FF FF FF FF   FF FF FF FF FF FF FF FF   ........ ........
0ED0: FF FF FF FF FF FF FF FF   FF FF FF FF FF FF FF FF   ........ ........
0EE0: FF FF FF FF FF FF FF FF   FF FF FF FF FF FF FF FF   ........ ........
0EF0: FF FF FF FF FF FF FF FF   FF FF FF FF FF FF FF FF   ........ ........
0F00: FF FF FF FF FF FF FF FF   FF FF FF FF FF FF FF FF   ........ ........
0F10: FF FF FF FF FF FF FF FF   FF FF FF FF FF FF FF FF   ........ ........
0F20: FF FF FF FF FF FF FF FF   FF FF FF FF FF FF FF FF   ........ ........
0F30: FF FF FF FF FF FF FF FF   FF FF FF FF FF FF FF FF   ........ ........
0F40: FF FF FF FF FF FF FF FF   FF FF FF FF FF FF FF FF   ........ ........
0F50: FF FF FF FF FF FF FF FF   FF FF FF FF FF FF FF FF   ........ ........
0F60: FF FF FF FF FF FF FF FF   FF FF FF FF FF FF FF FF   ........ ........
0F70: FF FF FF FF FF FF FF FF   FF FF FF FF FF FF FF FF   ........ ........
0F80: FF FF FF FF FF FF FF FF   FF FF FF FF FF FF FF FF   ........ ........
0F90: FF FF FF FF FF FF FF FF   FF FF FF FF FF FF FF FF   ........ ........
0FA0: FF FF FF FF FF FF FF FF   FF FF FF FF FF FF FF FF   ........ ........
0FB0: FF FF FF FF FF FF FF FF   FF FF FF FF FF FF FF FF   ........ ........
0FC0: FF FF FF FF FF FF FF FF   FF FF FF FF FF FF FF FF   ........ ........
0FD0: FF FF FF FF FF FF FF FF   FF FF FF FF FF FF FF FF   ........ ........
0FE0: FF FF FF FF FF FF FF FF   FF FF FF FF FF FF FF FF   ........ ........
0FF0: FF FF FF FF FF FF FF FF   FF FF FF FF FF FF FF FF   ........ ........
1000: 75 04 09 15 D5 A4 F9 04   0C F5 84 8B D5 AF 23 F7   u....... ......#.
1010: 62 B8 58 F0 17 C6 2B B9   F7 81 37 72 2B 19 81 A9   b.X...+. ..7r+...
1020: 18 F0 03 6A F2 2B F6 2B   10 29 A1 B8 5B 10 F0 53   ...j.+.+ .)..[..S
1030: 0F D3 0E 96 36 30 D3 0E   12 3E 77 03 D3 B3 F4 69   ....60.. .>w....i
1040: FC C6 C5 53 F0 96 C5 B8   3C F0 03 F5 E6 C5 04 4E   ...S.... <......N
1050: 64 00 B9 02 18 F0 C6 59   10 E9 54 B8 3E F0 53 BF   d......Y ..T.>.S.
1060: A0 43 80 04 C2 64 5F 54   00 04 C1 B8 5E 10 F0 53   .C...d_T ....^..S
1070: 3F 96 7F B9 40 F1 53 30   C6 7F E7 E7 19 D1 A1 F0   ?...@.S0 ........
1080: 96 C5 B9 07 04 54 B8 5A   B9 35 F0 96 9C F1 37 47   .....T.Z .5....7G
1090: 61 17 C6 BC 18 F0 F7 77   A0 C8 23 D8 07 A0 18 96   a......w ..#.....
10A0: A9 11 F0 F2 A9 F1 07 07   A1 F0 F7 FE F6 AF 37 53   ........ ......7S
10B0: 03 AA 77 2A E7 4A 03 02   53 03 43 04 2E 53 78 4E   ..w*.J.. S.C..SxN
10C0: AE FE B8 F9 90 C7 07 53   07 E7 03 09 A8 F0 53 EF   .......S ......S.
10D0: A0 FF 93 50 52 65 67 6B   86 C5 F1 AA 19 F1 2A 04   ...PRegk ......*.
10E0: E3 BA 00 AF 27 AC AD B9   0B FF F7 AF FA F7 AA 47   ....'... .......G
10F0: F7 FC 7C 57 AC FD 7D 57   AD E9 E9 AA FC BF 0F 83   ..|W..}W ........
1100: 54 F6 B9 55 96 0A B1 07   84 FA F1 96 08 B9 3B F1   T..U.... ......;.
1110: 32 08 F0 B9 39 BA F0 F2   BD D2 86 B2 5D 19 F1 37   2...9... ....]..7
1120: 52 53 B8 64 F0 96 5C F1   53 FB A1 B8 30 B9 2E F0   RS.d..\. S...0...
1130: 5A C6 40 AB F1 5F 4B A1   47 37 6B F6 40 FB 47 31   Z.@.._K. G7k.@.G1
1140: F0 5F C6 50 AB 31 FB 47   37 61 F6 50 FB 47 4B A1   ._.P.1.G 7a.P.GK.
1150: 27 F4 80 B8 39 F0 72 5C   B8 30 B0 00 83 F1 B9 30   '...9.r\ .0.....0
1160: 72 64 B9 2E F0 12 70 F1   5F C6 08 F1 07 A1 24 B1   rd....p. _.....$.
1170: F1 5F 17 92 08 11 07 C6   B1 F1 07 47 D1 5A 96 B1   ._...... ...G.Z..
1180: F1 03 10 A1 24 B1 F1 B9   30 72 8D B9 2E F0 72 9A   ....$... 0r....r.
1190: F1 5A C6 08 F1 03 10 A1   24 B1 F1 47 5F 07 C6 08   .Z...... $..G_...
11A0: 21 03 F0 21 17 C6 B1 F1   47 17 D1 5F 96 B1 F1 07   !..!.... G.._....
11B0: A1 B8 3A F0 43 04 A0 B8   64 B0 FE 24 68 F5 84 00   ..:.C... d..$h...
11C0: B8 3D F0 47 5F 14 E1 AA   B8 3B F0 B8 32 92 D6 C8   .=.G_... .;..2...
11D0: F8 D4 92 C6 C0 FC B8 3D   B2 F7 52 E5 F0 53 F0 C6   .......= ..R..S..
11E0: F3 03 F0 24 ED F9 03 60   F6 F3 F0 03 10 30 A0 23   ...$...` .....0.#
11F0: 03 F4 80 94 FA 24 C0 23   10 D4 F3 24 C0 FF FF FF   .....$.# ...$....
1200: B8 F6 76 16 B5 FD F7 B9   33 F6 0D B9 31 F1 C8 90   ..v..... 3...1...
1210: 18 19 F1 F7 77 90 80 F2   7C A5 FD F2 2A 43 80 AD   ....w... |...*C..
```

```
1220: 8A 10 FE 53 07 AE B9 22   44 53 FE B2 4B 92 44 72   ...S..." DS..K.Dr
1230: 3D 43 08 AE 80 53 40 2D   53 BF 4D AD 83 03 08 AE   =C...S@- S.M.....
1240: B9 24 44 53 43 38 AE B9   26 44 53 9A EF FD 53 7F   .$DSC8.. &DS...S.
1250: AD B9 28 27 AA BB 03 97   F7 2A F7 2A 61 19 2A 71   ..('..... .*.*a.*q
1260: 2A C9 EB 57 AB C8 80 6B   AB 18 80 53 07 7A BA 03   *..W...k ...S.z..
1270: 97 67 2B 67 2B EA 70 2B   A1 19 FB A1 83 B9 55 F1   .g+g+.p+ ......U.
1280: C6 E0 94 FA B8 63 F0 96   9E B9 55 F1 07 A1 C6 E0   .....c.. ..U.....
1290: B8 3B F0 72 9A F1 D3 04   C6 8D B8 63 80 FF F1 03   .;.r.... ...c....
12A0: EE B3 B8 54 F0 14 E1 AB   C8 F0 5F C6 89 14 E1 AA   ...T.... .._.....
12B0: 03 F0 A7 F0 BE 08 F2 BA   BE 10 FE 67 E4 45 B8 35   ........ ...g.E.5
12C0: F0 5F 14 E1 AB F0 47 5F   14 E1 44 EB B8 28 44 DA   ._....G_ ..D.(D.
12D0: 94 04 44 DC B8 24 44 DA   B8 22 94 00 23 20 E4 45   ..D..$D. ."..# .E
12E0: B8 2A 94 00 AE B8 2C 94   00 AB FE AA 27 E4 45 CC   .*....,. ....'.E.
12F0: D0 BE D4 A2 D8 D8 B8 38   F0 77 77 D0 37 53 03 83   .......8 .ww.7S..
1300: B8 3A F0 53 F8 AB B8 41   F0 AA 18 B9 F0 FB 72 4D   .:.S...A ......rM
1310: 37 32 33 C8 F0 E7 47 53   40 2A F7 2A F7 77 A9 F0   723...GS @*.*.w..
1320: 53 0D 49 A9 B8 39 F0 77   77 53 02 49 B9 F2 91 19   S.I..9.w wS.I....
1330: B8 43 CB F0 47 A0 53 0F   03 4F A3 2A F7 2A F7 77   .C..G.S. .O.*.*.w
1340: 2B 97 A7 F7 2B E6 49 53   80 91 19 64 0D 04 C5 3F   +...+.IS ...d...?
1350: 06 5B 4F 66 6D 7D 07 7F   67 39 79 71 3D 76 73 89   .[Ofm).. g9yq=vs.
1360: 1F BA 1F FD 53 E0 A9 09   37 5A 49 2D DD 5A 96 BA   ....S... 7ZI-.Z..
1370: B8 FC 80 37 47 2C DC 96   BA FD 53 0F A9 FC 53 F0   ...7G,.. ..S...S.
1380: 49 B8 37 A0 FC 53 0F A9   FD 53 10 49 A9 18 F0 5A   I.7..S.. .S.I...Z
1390: A0 BA 30 BB 30 F9 5A 96   A7 F0 5A C6 A7 FA 37 53   ..0..0Z. ..Z...7S
13A0: 0F 59 96 A7 F0 4B A0 FB   77 AB FA 77 77 AA 27 F2   .Y...K.. w..ww.7.
13B0: 95 F9 40 A0 03 A0 27 67   40 A0 04 C5 B8 57 F0 17   ..?..'g @....W..
13C0: 14 E1 AA B9 32 00 00 B8   3B F0 D2 CD C9 F9 D4 92   ....2... ;.......
13D0: C6 BC D2 DC 23 40 C6 DC   D4 F3 64 BC F0 B8 57 53   ....#@.. ..d...WS
13E0: 05 96 E9 F0 C6 F4 07 64   ED F0 17 D2 F4 53 3F A0   .......d .....S?.
13F0: 23 06 F4 80 94 FA 64 BC   B8 F1 C6 FD 18 F8 C4 92   #.....d. ........
1400: BB 4D 84 08 B8 26 BB 51   B9 3B F1 47 53 02 AA 6B   .M...&.Q .;.GS..k
1410: AB A3 60 2B 17 18 A3 70   2A 96 1E F8 84 42 27 A8   ..`+...p *....B'.
1420: B9 8E BC 09 97 28 67 28   67 29 97 67 29 E6 33 6B   .....(g( g).g).3k
1430: 28 7A 28 EC 25 03 01 AA   F8 13 00 F2 40 2A 84 42   (z(.%... ....@*.B
1440: 27 AA 14 E3 AB 47 5F 2A   5F 47 4A AA 83 2C 01 EC   '....G_* _GJ..,..
1450: FF 00 00 C0 FE B8 55 F0   D3 05 B8 22 C6 60 B8 24   ......U. ..."..`.$
1460: F5 C4 1F D4 94 C6 55 F0   53 05 97 96 6E A7 B8 55   ......U. S...n..U
1470: F0 D3 05 B8 31 B9 22 C6   7D B8 33 B9 24 F7 AA BB   ....1.". }.3.$...
1480: 02 65 FA BC FF BD FF 12   8C BC 01 1D F0 6C A0 18   .e...... .....l..
1490: F0 7D A0 F9 A8 EB 82 55   FA 53 0E B8 08 C6 A1 B8   .}.....U .S......
14A0: 09 F8 F4 80 94 FA 84 55   B8 39 F0 32 B4 B8 37 F0   .......U .9.2..7.
14B0: 47 5F 96 B5 83 B8 64 B0   8C B8 55 A0 03 C8 B3 94   G_....d. ..U.....
14C0: FA B8 55 A0 B8 64 A0 84   A8 D8 DA DC DE E0 E0 E2   ..U..d.. ........
14D0: E4 E8 EC F0 F2 F4 F6 F8   64 BC A4 4F E4 1C C4 00   ........ d..O....
14E0: 84 55 A4 94 23 02 E4 31   23 01 E4 31 23 08 E4 31   .U..#..1 #..1#..1
14F0: C4 D7 C4 3A E4 A8 24 C0   E4 57 B8 38 27 A0 83 FF   ...:..$. .W.8'...
1500: B8 3C A0 03 F5 F6 18 F0   07 AC F5 34 A8 AD FD A3   .<...... ...4...
1510: A0 18 1D EE 0E FC D4 B6   E5 B8 3C F0 C6 36 03 EF   ........ ..<..6..
1520: F6 20 F0 14 E1 AB 03 EF   BA EC F6 2E BA 5C 27 F4   . ...... .....\'.
1530: 45 F0 83 F1 F6 37 83 D4   7C F5 34 00 E5 A4 18 99   E....7.. |.4.....
1540: 4A F0 00 51 22 66 00 66   00 3F C5 00 04 00 04 B8   J..Q"f.f .?......
1550: 4D F0 53 07 47 AA F0 47   53 07 AB 23 60 D4 92 C6   M.S.G..G S..#`...
1560: 4F F0 B8 4D B2 78 72 6E   F0 17 72 90 A4 73 F0 07   O..M.xrn ..r..s..
1570: 5F C6 90 53 07 30 A4 8C   32 81 F0 03 10 F2 90 A4   _..S.0.. 2.......
1580: 88 F0 03 F0 53 F0 C6 90   53 70 30 A0 23 04 F4 80   ....S... Sp0.#...
1590: 94 FA A4 4F B8 36 54 C0   D4 94 C6 94 F0 B8 36 D2   ...O.6T. ......6.
15A0: B1 12 AB F0 5F C6 CB F0   07 A4 C2 F0 17 72 CB A4   ...._... .....r..
15B0: C2 52 BD F0 53 70 C6 CB   F0 03 F0 A4 C2 F0 03 10   .R..Sp.. ........
```

```
15C0: F6 CB 43 80 53 F7 A0 23    02 F4 80 94 FA A4 94 17    ...C.S..#  ........
15D0: AC B9 3B F1 BD 12 B2 DC    BD 0A 1B 1B FB A3 2B 17    ..;.....   ......+.
15E0: A3 6D 2B 13 00 2B EC E1    A0 18 FB A0 83 01 22 01    .m+..+..   ......".
15F0: 54 02 42 01 F4 00 14 00    BE B8 3F 20 43 80 20 93    T.B.....   ..? C. .
1600: 27 D4 B5 54 E0 D4 94 C6    00 F0 B8 2F B2 21 72 17    '..T....   .../.!r.
1610: F0 03 10 F6 36 C4 31 F0    53 F0 C6 36 F0 03 F0 C4    ....6.1.   S..6....
1620: 31 32 2B F0 17 5F C6 36    10 C4 32 F0 5F C6 36 F0    12+.._.6   ..2._.6.
1630: 07 A0 23 01 F4 80 94 FA    C4 00 B8 3D F0 BA B2 72    ..#.....   ...=...r
1640: 42 CA 53 03 17 2A D4 92    C6 3A F0 B8 3D B2 68 47    B.S..*..   .:..=.hG
1650: F7 F0 53 03 F6 58 17 17    07 52 64 20 53 FC 40 A0    ..S..X..   .Rd S.@.
1660: 23 03 F4 80 94 FA C4 3A    F0 D3 08 C4 5F B9 64 F1    #......:   ...._.d.
1670: 96 91 B9 20 A1 19 A1 B9    65 F1 96 81 B9 41 F1 5F    ... ....   e....A._
1680: A1 B9 3E F1 53 C0 21 5F    C6 91 B9 5F B1 8C 19 B1    ..).S.!_   ..._....
1690: 8C 83 F4 45 F5 34 00 E5    D4 6D B8 37 F0 47 5F C6    ...E.4..   .m.7.G_.
16A0: B8 B9 55 D1 5F 96 B0 18    F0 F2 AE 53 60 83 84 FA    ..U._...   ...S`...
16B0: C7 07 D7 84 BF AA 47 5F    BB ED 96 C3 B8 2F F0 47    ......G_   ...../.G
16C0: 5F BB F1 B8 2A B4 CF FA    5F BB ED 96 D3 B8 2F F0    _...*...   _...../.
16D0: 5F BB F5 B8 2C A4 CF B8    3B F0 BA EF 52 E0 BA DB    _...,...   ;...R...
16E0: F7 27 13 31 D4 92 C6 D7    B8 04 D2 EE B8 80 F8 D4    .'.1....   ........
16F0: F3 C4 D7 B8 3B D0 A0 94    FA 23 07 E4 80 FF FF FF    ....;...   .#......
1700: F0 37 61 37 AA 18 19 F0    37 71 37 2A C8 C9 F6 11    .7a7....   7q7*....
1710: 83 37 03 01 2A 37 13 00    2A 97 A7 83 F5 C4 56 BA    .7..*7..   *.....V.
1720: 0A B2 25 BA 0C 23 B0 D4    92 C6 1C 23 20 D4 F3 E4    ..%..#..   ...# ...
1730: 1C B8 68 A0 B8 68 B9 3B    F0 51 74 F8 C6 34 B8 68    ..h..h.;   .Qt..4.h
1740: F0 D4 F3 E4 34 B9 41 31    53 F0 2A 19 A1 19 FB A1    ....4.A1   S.*.....
1750: B9 3A F1 5F 4A A1 83 B8    39 F0 53 04 74 F8 C6 57    .:._J...   9.S.t..W
1760: 18 F0 D3 04 A0 94 FA E4    57 B8 5E F0 DD B2 77 B8    ........   W.^...w.
1770: FA 23 03 90 18 27 90 83    23 F0 D4 92 94 FA E4 78    .#...'..   #......x
1780: F5 D4 AD E5 83 FF FF FF    FF FF FF FF FF FF FF FF    ........   ........
1790: FF FF FF FF FF FF FF FF    FF FF FF FF FF FF FF 99    ........   ........
17A0: 7F 00 00 00 00 F5 A4 B7    99 7F 00 00 00 00 84 BF    ........   ........
17B0: F4 00 99 7F 00 00 00 14    E1 99 7F 00 00 00 F4 45    ........   .......E
17C0: 99 7F 00 00 00 D4 6D 99    7F 00 00 00 F5 34 00 E5    ......m.   .....4..
17D0: 99 7F 00 00 00 F5 54 8F    E5 99 7F 00 00 00 F5 D4    ......T.   ........
17E0: F6 E5 99 7F 00 00 00 F5    D4 D6 E5 99 7F 00 00 00    ........   ........
17F0: F5 D4 81 E5 99 7F 00 99    7F 00 00 00 00 00 00 83    ........   ........
1800: B0 80 18 B0 61 18 B9 3B    23 02 D4 F3 E7 24 45 F0    ....a..;   #....$E.
1810: F2 1B B9 57 BB 06 F0 53    3F 04 9A 42 53 03 C6 12    ...W...S   ?..BS...
1820: 24 1C B9 53 23 02 D4 F6    B9 3A 41 A1 24 44 F0 67    $..S#...   .:A.$D.g
1830: D3 30 53 30 C6 34 B9 39    F1 67 E7 04 8E B9 20 23    .0S0.4.9   .g.... #
1840: 0A 04 57 B9 2A 04 49 B9    37 23 0D 04 57 B9 44 23    ..W.*.I.   7#..W.D#
1850: 09 04 57 B9 4D 23 08 D4    F3 24 45 F0 53 9F 20 37    ..W.M#..   .$E.S. 7
1860: 53 60 C6 62 D3 60 B9 3F    21 53 9F 41 A1 B9 3B F1    S`.b.`.?   !S.A..;.
1870: 37 32 77 F0 53 FD A0 F1    47 77 B9 37 41 37 B9 39    72w.S...   Gw.7A7.9
1880: 72 8A F1 53 06 20 53 F7    40 A0 F1 53 64 40 A1 B6    r..S. S.   @..Sd@..
1890: 65 B0 8C 24 44 B9 3D BB    03 F0 A1 04 BB B9 4D 23    e..$D.=.   ......M#
18A0: 06 D4 F6 34 44 23 04 D4    AD 23 05 C4 AD B9 31 BB    ...4D#..   .#....1.
18B0: 08 04 B7 B9 33 BB 09 23    02 D4 F6 34 44 FB C4 AD    ....3..#   ...4D...
18C0: F0 D4 D6 24 44 B9 3E F0    04 8E 04 D4 F1 77 77 69    ...$D.>.   .....wwi
18D0: 3E 51 52 93 B9 41 F0 31    04 8E F0 53 08 B9 3A 21    >QR..A.1   ...S..:!
18E0: 53 F7 41 21 C6 93 B9 F0    BA 05 18 F0 91 19 EA EA    S.A!....   ........
18F0: 04 8F B9 30 F0 04 2B E5    B4 00 F5 33 FF FF FF FF    ...0..+.   ...3....
1900: 54 8F E6 05 83 D3 09 96    25 18 F0 37 96 1C F8 A9    T.......   %..7....
1910: 18 BA 04 F0 A1 13 09 37    C6 1E EA 13 44 F5 FA 83    .......7   ....D...
1920: F5 37 6B 20 20 20 53 C0    C6 1C F0 D2 31 03 04 24    .7k   S.   ....1..$
1930: 36 03 BC F6 42 F0 03 69    F6 42 B8 06 18 43 C0 03    6...B..i   .B...C..
1940: 6A B3 B0 15 27 17 B8 6B    60 A0 B8 67 F0 D3 F1 C6    j...'..k   `..g....
1950: 1C C4 81 6A 6C 6E 70 72    74 76 78 7A 7C 7E 84 8A    ...jlnpr   tvxz|~..
```

```
1960: 90 96 98 9A 9C 9E A0 A2  A4 A6 04 00 04 0F 04 22   ........ ......."
1970: 04 2E 04 3D 04 43 04 47  04 4D 04 53 04 5B B9 2E   ...=.C.G .M.S.[..
1980: BB 00 04 99 B9 2F BB 01  04 99 B9 36 BB 02 04 99   ...../.. ...6....
1990: B9 3B BB 07 04 99 04 95  04 9D 04 AD 04 B3 04 C0   .;...... ........
19A0: 04 C5 04 CA 04 DA 04 F2  E7 E7 03 BA AE A3 A8 1E   ........ ........
19B0: FE A3 AD 1E FE A3 2E 17  A3 83 2E 00 01 3F 2F 01   ........ .....?/.
19C0: 01 40 36 02 01 41 3D 03  01 42 4D 04 01 43 4E 05   .@6..A=. .BM..CN.
19D0: 05 44 57 0A 01 49 3B 0B  01 4A 31 0C 02 4B 33 0E   .DW..I;. .J1..K3.
19E0: 02 4D AF B9 08 DE 67 FD  67 2E 67 2E AD 37 F2 F7   .M....g. g.g..7..
19F0: D3 DF AD FE D3 01 AE FF  77 AF E9 E5 BF 0F 97 83   ........ w.......
1A00: B8 22 B9 2A E5 F4 00 E6  15 B9 2C F4 00 2A 43 80   ."*..... ..,..*C.
1A10: 2A F6 15 27 AA B9 20 A1  FA 19 A1 B9 39 F1 53 21   *..'.. . ....9.S!
1A20: 96 8D B9 3F F1 92 2E 47  77 53 03 AB 96 40 B9 24   ...?...G wS...@.$
1A30: F4 00 BB 01 E6 37 1B B9  3F 03 F6 F6 40 FA C6 45   .....7.. ?...@..E
1A40: F1 53 FC 4B A1 F1 77 77  B8 21 D0 BA 00 F2 5E BA   .S.K..ww .!....^.
1A50: 0F F0 53 7F 96 5E C8 F0  53 F0 96 5E F0 AA B8 35   ..S..^.. S..^...5
1A60: FA C6 73 DF C6 73 F0 5F  37 6A 37 E6 6F 37 17 03   ..s..s._ 7j7.o7..
1A70: FD E6 8D FA 96 89 B9 25  F1 07 96 89 C9 F1 03 A2   .......% ........
1A80: E6 89 03 6A F6 89 18 F0  AA FA F5 04 D6 F5 83 27   ...j.... ........'
1A90: AA AD AE B8 58 A0 B8 69  B4 0A F6 EA C6 ED AB B9   ....X..i ........
1AA0: 5C B1 F8 B9 5C F1 C6 EB  F5 B4 0A F6 43 18 A0 CA   \...\... ........
1AB0: FA C6 CA D3 FC 96 9F F0  07 C8 40 D3 04 96 ED C8   ........ ..@.....
1AC0: F0 03 02 AA 03 ED E6 9F  44 ED FB D3 F1 C6 D7 B8   ........ D.......
1AD0: 57 F0 17 DB 96 ED 00 FD  4E 96 ED B8 58 B0 FF 18   W....... N...X...
1AE0: A0 B8 6B A0 B9 67 FB A1  18 F0 83 27 A8 39 F7 23   ..k..g.. ...'.9.#
1AF0: 80 91 F8 97 47 B8 59 50  00 C8 B0 00 33 FF FF FF   ....G.YP ....3...
1B00: B8 39 B9 1D F1 53 40 A9  F0 53 BF 49 A0 B9 65 F1   .9...S@. .S.I..e
1B10: 96 3B F0 53 FC A0 F2 26  B9 3B F1 12 26 B9 37 F1   .;.S...& .;..&.7.
1B20: 72 26 F0 43 08 A0 18 F0  53 F7 A0 B9 3F F1 53 FF   r&.C.... S...?.S.
1B30: A1 B9 3B F1 64 3B B9 41  F1 5F A1 B4 E7 B8 5B F6   ..;.d;.A ._....[.
1B40: 5A F4 4E F1 00 5F AA F0  F2 55 FA F6 51 96 5A 64   Z.N.._.. .U..Q.Zd
1B50: 4F F4 78 64 5A FA C6 5A  F6 4F F0 5F D3 05 C6 8B   O.xdZ..Z .O._....
1B60: B4 E7 B8 22 BA 0D A7 27  13 01 AB A7 F0 AC 18 FA   ..."...' ........
1B70: 37 12 77 FC 40 C6 7F FC  03 24 F0 13 FA E6 82 FA   7.w.@... .$......
1B80: A1 83 FA D1 96 87 A1 18  1A EB 6B 83 34 A8 F5 F4   ........ ..k.4...
1B90: 1D FD 43 80 F4 00 56 96  F4 59 74 D0 2A 5F AC F4   ..C...V. .Yt.*_..
1BA0: 59 9A DF AB 74 E3 2C DA  92 AD C6 C8 83 AA BB 08   Y...t.,. ........
1BB0: FB 03 F7 A3 A9 DA 5F C6  BD EB 50 64 C8 F9 47 5F   ......_. ..d..G_
1BC0: A9 23 80 E7 E9 C3 DC AC  FC A0 18 1D EE 8E 27 83   .#...... ......'.
1BD0: A9 BA 00 BB 08 12 DD FB  03 F7 A3 DA AA F9 77 A9   ........ ......w.
1BE0: EB D5 2A B9 11 5F 97 67  2A 67 2A E6 F1 2B D3 10   ..*.._.g *g*..+..
1BF0: 2B E9 E7 4B D3 10 2A 83  8C 7B 6A 59 47 36 25 13   +..K..*. .{jYG6%.
1C00: B8 3B F0 37 12 88 B8 68  27 A0 B8 62 B0 F4 F4 4A   .;.7...h '..b...J
1C10: B8 62 F0 C6 88 34 00 B8  37 F0 AD B9 52 52 21 B9   .b...4.. 7...RR!.
1C20: 50 B8 68 F0 BC 80 32 2B  C9 BC 20 F9 2D 52 32 FC   P.h...2+ .. .-R2.
1C30: 47 AC F0 B8 4E 12 41 FC  77 AC F1 F4 69 43 02 84   G...N.A. w...iC..
1C40: 46 F1 47 F4 69 17 E5 F4  45 54 F6 F5 C6 76 F0 B8   F.G.i... ET...v..
1C50: 68 F2 88 D2 5E 37 B2 18  F8 17 53 03 84 09 FD A9   h...^7.. ..S.....
1C60: F0 12 69 F1 F4 37 31 84  70 F1 47 F4 37 47 31 A1   ..i..71. p.G.7G1.
1C70: 23 05 04 AD 84 0A F0 53  E8 C6 10 C9 F0 89 51 52   #......S ......QR
1C80: 83 B9 4F 27 A1 19 84 6F  E5 84 FA E5 F4 6F F5 89   ..O'...o .....o..
1C90: 40 B8 7F B0 00 E8 93 99  BF BF 0F E8 1D B0 40 23   @....... ......@#
1CA0: F7 62 55 25 B8 68 F0 03  F6 F6 B3 F0 74 8C B8 68   .bU%.h.. ....t..h
1CB0: 10 C6 A4 F0 14 F7 84 A4  B0 FE 84 E7 F6 E8 B8 35   ........ .......5
1CC0: B0 30 F4 48 E6 CC 96 C2  23 08 84 E4 65 68 5A B0   .0.H.... #...ehZ.
1CD0: 00 B8 35 B0 09 55 F4 48  F6 E6 96 D6 B8 68 10 F0   ..5..U.H .....h..
1CE0: 96 CC 23 8C 14 F7 F4 78  54 EB B8 5F B0 8C 18 B0   ..#....x T.._....
1CF0: 8C B8 62 B0 FC A4 B7 FF  FF FF FF FF FF FF FF FF   ..b..... ........
```

```
1D00: B9 67 A1 B9 5C B1 F8 97    A4 0C 97 A7 0A B2 0C BF    .g..\...  ........
1D10: 0F B9 5B F1 5F D3 05 C6    28 89 1D F1 53 DF A1 B9    ..[._...  (...S...
1D20: 5E F1 53 28 B9 1D 41 A1    8A B2 7A 05 F6 51 B9 5C    ^.S..A.   ..z..Q.\
1D30: F1 96 37 23 0F 04 F7 B9    F7 81 12 0F A9 E7 E7 49    ..7#....  ........I
1D40: 47 53 80 B9 3F 41 A1 F2    62 89 67 F1 B9 F8 91 A4    GS..?A..  b.g.....
1D50: 62 B9 59 F1 C9 D1 96 59    83 F1 11 03 6A A9 F1 B9    b.Y....Y  ....j...
1D60: 67 A1 89 5E F1 5F 17 03    8A 37 B9 5D A1 B9 3F F1    g..^._..  .7.]..?.
1D70: 53 7F 21 F2 7C B9 67 F1    24 E2 E4 2B C7 07 D7 44    S.!.|.g.  $..+...D
1D80: EC B8 2E F4 A3 C6 8B 23    01 14 F7 B8 30 F4 A3 C6    .......#  ....0...
1D90: 93 B0 00 B8 32 B9 09 F4    96 B8 34 B9 0A F4 96 B8    ....2...  ..4.....
1DA0: 36 F8 37 47 50 F2 AB 23    03 14 F7 B8 3D F0 03 50    6.7GP..#  ....=..P
1DB0: E6 B6 23 04 14 F7 83 E5    B4 18 34 00 94 A8 B8 39    ..#.....  ..4....9
1DC0: F0 B8 30 72 C7 B8 2E F0    D4 B5 F5 34 00 E5 B8 3C    ..0r....  ...4...<
1DD0: F0 96 D5 54 7D F4 F7 F5    54 00 34 00 D4 00 B4 81    ...T}...  T.4.....
1DE0: 74 00 34 00 E5 E4 9F B9    3B F1 19 37 F7 F7 F6 F8    t.4.....  ;..7....
1DF0: F1 03 F5 53 FE C6 F8 97    83 FF FF FF FF FF FF FF    ...S....  ........
1E00: B8 39 F8 C4 14 92 0C B9    3B F1 92 15 E5 D4 81 F5    .9......  ;.......
1E10: F8 53 DF A8 83 19 F1 00    00 00 00 00 00 84 8B B9    .S......  ........
1E20: 32 BA 80 C6 29 B9 3D BA    04 F1 5A BE 22 96 30 CE    2...).=.  ..Z.".0.
1E30: E5 94 00 FE 04 92 96 3A    84 55 B2 3E 84 67 B9 55    .......:  .U.>.g.U
1E40: F0 D3 05 B8 08 B9 32 BA    88 C6 51 B8 03 B9 3D BA    ......2.  ..Q...=.
1E50: 04 F1 DA A1 84 A1 B8 3B    F0 BA 0A B2 5F B4 0C B8    .......;  ...._...
1E60: 34 F0 B8 82 F2 67 C8 F8    E5 D4 92 C6 56 B2 71 E4    4....g..  ....V.q.
1E70: 2B B8 34 F0 D3 80 A0 23    09 F5 D4 AD E5 94 FA E4    +.4....#  ........
1E80: 1C 27 AD AE B8 6A F0 B4    08 B9 57 F1 17 B4 00 18    .'...j..  ..W.....
1E90: F0 AA B4 00 23 04 B4 00    23 01 B4 00 18 F0 F5 B4    ....#...  #.......
1EA0: 00 EA 9C FD A8 FE B4 00    F8 B4 00 44 F5 A8 17 B9    ........  ...D....
1EB0: 3C D1 96 B5 A1 F8 34 A8    F5 F4 1D FD 43 C8 F4 00    <.....4.  ....C...
1EC0: F4 1D FD 1D 43 40 F4 00    F0 18 74 D0 F4 05 FA F4    ....C@..  ..t.....
1ED0: 05 9A DF EE B8 83 5F 47    AA B4 E7 F6 F2 B9 36 FA    ......_G  ......6.
1EE0: 37 61 F6 E6 F1 AA C9 FA    D1 53 F0 C6 F2 FA 65 31    7a......  .S....e1
1EF0: A1 55 83 29 28 29 AC AD    F0 A1 19 19 EC F8 FD 83    .U.)()..  ........
1F00: B9 09 77 E4 0F B9 08 F2    0F 9A 7F 8A 40 E4 15 8A    ..w.....  ....@...
1F10: 80 8A 40 E4 15 E7 8A 40    9A BF E9 07 83 9A 9F B9    ..@....@  ........
1F20: 5C B1 FB 8A 28 0A 37 B2    33 A4 0F 46 2E 83 B9 5C    \...(.7.  3..F...\
1F30: F1 96 29 23 10 04 F7 5F    17 AB 03 F4 E6 46 C6 41    ..)#..._  .....F.A
1F40: 83 B8 4E F0 DC A0 FB 83    64 0A B9 38 81 00 B9 1D    ..N.....  ...?....
1F50: F1 F7 F7 B9 35 F1 47 D1    83 23 01 8A 40 97 F7 46    ....5.G.  .#..@..F
1F60: 62 17 9A BF 9A BF E6 5B    83 5F 03 00 57 AA F0 5C    b......[  ._..W..\
1F70: C6 75 23 34 83 23 38 83    B8 5A F0 03 F3 E6 86 B0    .u#4.#8.  .Z......
1F80: 0C 23 01 B8 35 30 83 AA    B9 21 F1 C9 97 F7 E6 95    .#..50..  .!......
1F90: 96 95 FA 37 61 83 F0 53    7F 03 FE 03 FC F6 A0 83    ...7a..S  ........
1FA0: F9 04 F7 F0 47 5F C6 AD    37 60 C7 53 40 83 FF FF    ....G_..  7`.S@...
1FB0: FF FF FF FF FF FF FF FF    FF FF FF FF FF FF FF FF    ........  ........
1FC0: FF FF FF FF FF FF FF FF    FF FF FF FF FF FF FF FF    ........  ........
1FD0: FF FF FF FF FF FF FF FF    FF FF FF FF FF FF FF FF    ........  ........
1FE0: FF FF FF FF FF FF FF FF    FF FF FF FF FF FF FF FF    ........  ........
1FF0: FF FF FF FF FF FF FF FF    FF FF FF FF FF FF FF FF    ........  ........
2000: 8D 0A 1A 2A 2A 00 5E                                  ...*.*.^
```

What is claimed as new and what it is desired to secure by Letters Patent of the United States is:

1. In a system for monitoring and controlling the condition of air in a zone within selectively determined operating limits using a single HVAC unit in which conditioned air passes into the zone via a damper, operated by control means, in a duct communicating with a zone, a thermostat for activating and deactivating the control means, said thermostat comprising:

first circuit means responsive to input signals for establishing the operating limits for the zone and providing a first digital word output signal representative of the operating limits;

second circuit means responsive to input signals indicative of the actual condition of the air in the zone for providing a second digital word output signal representative of the condition of the air therein;

third circuit means responsive to output signals from said first and second circuit means for providing third digital word output signals for operating the control means of the damper; and programmable logic means for providing digital word input signals to said third circuit means for selectively controlling the operation of the control means of a damper by said third circuit means.

2. In the system as defined in claim 1, wherein said thermostat includes means for providing information to peripheral circuit means, the information including any digital word signal associated with said first, second, third circuit means and said programmable logic means.

3. In the system as defined in claim 1, wherein said thermostat includes indicating means for providing data indicative of the information in any digital word signal associated with said first, second, and third circuit means and said programmable logic means.

4. In a system defined in claim 1, wherein said third circuit means is selectively controlled by said programmable logic means for comparing a first digital word representative of the actual condition of a zone and a second digital word representative of the desired condition of a zone for determining the desired mode of operation of a damper.

5. In the system as defined in claim 1, said thermostat further comprises a first sensor located in the zone for providing an output signal representative of air temperature of the zone, said second circuit means including means responsive to said output signal from said first sensor for providing a second digital word output signal representative of the actual temperature in the zone.

6. In the system defined in claim 5, wherein said first circuit means includes means responsive to input signals for establishing the desired temperature in the zone and providing a first digital word output signal representative of the desired temperature therein.

7. In a system defined in claim 6, wherein said third circuit means is selectively controlled by said programmable logic means for comparing a first digital word representative of zone temperature and a second digital word representative of desired temperature in a zone for determining the demand for heating or cooling or no demand in the zone.

8. In the system defined in claim 7 said thermostat further comprising a second sensor located in the duct for determining the temperature therein and providing an output signal representative of the temperature in the duct, said second circuit means responsive to said output signal from said second sensor for providing a fourth digital word output signal representative of the duct temperature.

9. In the system defined in claim 8, wherein said second sensor is located on an ingress side of the damper in the duct.

10. In a system defined in claim 9 wherein said third circuit means is selectively controlled by said programmable logic means for comparing a first digital word representative of zone temperature and a fourth digital word representative of duct temperature for determining the desired mode of operation of the damper.

11. In a system defined in claim 10 wherein said thermostat includes means for receiving digital data indicating the operating status of the HVAC unit, said programmable logic means selectively controlling said third circuit means in response to said received digital data for operating the damper.

12. In the system defined in claim 11 wherein said programmable logic means selectively controls said third circuit means for operating the damper in the heating mode when duct temperature is greater than zone temperature and operating the damper in the cooling mode when duct temperature is less than zone temperature.

13. In the system defined in claim 12 wherein said programmable logic means selectively controls said third circuit means for operating the damper in the heating or cooling mode in response to received data indicating that the HVAC unit will be operated in the heating or cooling mode respectively.

14. In the system defined in claim 13, wherein said programmable logic means selectively controls said third circuit means for operating the damper in the heating or cooling or ventilation mode in response to a comparison of duct temperature, desired zone temperature, and actual zone temperature in response to received data indicating that the HVAC unit is deactivated.

15. In the system defined in claim 14, wherein said programmable logic means selectively controls the third circuit means for operating the damper in the ventilation mode when there is no demand for heating or cooling in the zone or a demand different from that derived from a comparison between actual zone temperature and duct temperature, the latter being within predetermined limits established by said programmable logic means.

16. In the system as defined in claim 15, wherein said thermostat includes indicating means for providing data indicative of the information in any digital word signal associated with said first, second, and third circuit means and said programmable logic means.

17. In a system for monitoring and controlling the condition of air in a plurality of zones within selectively determined operating limits using a single HVAC unit operated by a control means in which conditioned air passes into each zone via a damper, operated by control means, in a duct communicating with a zone, a thermostat for activating and deactivating the control means, said thermostat comprising:

first circuit means responsive to input signals for establishing the operating limits for a zone and providing a first digital word output signal representative of the operating limits;

second circuit means responsive to input signals indicative of the actual condition of the air in the zone for providing a second digital word output signal representative of the condition of the air therein;

third circuit means responsive to output signals from said first and second circuit means for providing third digital word output signals for operating the control means of one damper and the control means of an HVAC unit; and programmable logic means for providing digital word input signals to said third circuit means for selectively controlling the operation of the control means of a damper and the control means of the HVAC unit by said third circuit means.

18. In the system as defined in claim 17, wherein said thermostat includes indicating means for providing data indicative of the information in any digital word signal associated with said first, second, and third circuit means and said programmable logic means.

19. In the system as defined in claim 17, said thermostat further comprises a first sensor located in the zone for providing an output signal representative of the actual temperature of the zone, said second circuit means including means responsive to said output signal from said first sensor for providing a second digital word output signal representative of the actual temperature in a zone.

20. In the system defined in claim 19, wherein said first circuit means includes means responsive to input signals for establishing the desired temperature in the zone and providing a first digital word output signal representative of the desired temperature therein.

21. In a system defined in claim 20, wherein said third circuit means is selectively controlled by said programmable logic means for comparing a first digital word representative of zone temperature and a second digital word representative of desired temperature in a zone for determining the demand for heating or cooling or no demand in a zone.

22. In the system defined in claim 21, said thermostat further comprising a second sensor located in the duct for determining the temperature therein and providing an output signal representative of the temperature in the duct, said second circuit means responsive to said output signal from said second sensor for providing a fourth digital word output signal representative of the duct temperature.

23. In the system defined in claim 22, wherein said second sensor is located on an ingress side of the damper in the duct.

24. In a system defined in claim 23, wherein said third circuit means is selectively controlled by said programmable logic means for comparing a first digital word representative of zone temperature and a fourth digital word representative of duct temperature for determining the desired mode of operation of the damper.

25. In a system defined in claim 24 wherein said programmable logic means selectively controls said third circuit means for providing a first output signal representative of the desired mode of operation of the HVAC unit when sufficient demand for heating or cooling exists in the zone.

26. In a system defined in claim 25 wherein said programmable logic means selectively controls said third circuit means for operating the damper in the heating or cooling mode that is coincident with the desired mode of operation of the HVAC unit.

27. In a system defined in claim 26 wherein said programmable logic means selectively controls said third circuit means for operating the HVAC unit in the heating or cooling mode respectively and deactivating the HVAC unit when sufficient demand for heating or cooling no longer exists in the zone.

28. In the system defined in claim 27, wherein said programmable logic means selectively controls said third circuit means for operating the damper in the heating or cooling or ventilation mode in response to a comparison of duct temperature, desired zone temperature, and actual zone temperature when the HVAC unit is deactivated.

29. In the system defined in claim 28 wherein said programmable logic means selectively controls the third circuit means for operating the damper in the ventilation mode when there is no demand for heating or cooling in the zone or a demand different from that derived from a comparison between actual zone temperature and duct temperature is within predetermined limits established by said programmable logic means.

30. In the system as defined in claim 29 wherein said thermostat includes means for providing information to peripheral circuit means, the information including any digital word signal associated with said first, second, third circuit means and said programmable logic means.

31. In the system as defined in claim 29, wherein said thermostat includes indicating means for providing data indicative of the information in any digital word signal associated with said first, second, and third circuit means and said programmable logic means.

32. In a system defined in claim 31, wherein said third circuit means is selectively controlled by said programmable logic means comparing a first digital word representative of zone temperature and a fourth digital word representative of duct temperature for determining the desired mode or operation of an HVAC unit.

33. In a system defined in claim 32, wherein said thermostat includes means for deriving digital data indicating the operating status of the HVAC unit, said programmable logic means selectively controlling said third circuit means in response to said derived digital data for operating the HVAC unit.

34. In a system for monitoring and controlling the condition of the air in a zone within operating limits using a single zone HVAC unit in which conditioned air passes into the zone via a damper in a duct communicating with a zone, a thermostat for activating and deactivating the control means, said thermostat comprising:
first circuit means responsive to input signals for establishing the operating limits for the zone and providing first digital word output signals representative of the operating limits;
second circuit means responsive to input signals indicative of the actual condition of the air in the zone for providing a second digital word output signal representative of the condition of the air therein;
third circuit means adapted to be coupled to a peripheral circuit means for receiving data from a peripheral circuit means and for providing a third digital word output signal representative of the information contained in such data;
fourth circuit means responsive to output signals from said first, second and third circuit means for providing fourth digital word output signals for operating the control means of a damper; and
programmable logic means operatively coupled to said fourth circuit means for selectively modifying the response of said fourth circuit means to the output signal of said first circuit means for selectively controlling the changing of the operating limits.

35. In the system as in claim 34, wherein said programmable logic means selectively enables and disables the responsiveness of said fourth circuit means to changes in output signals of said first circuit means, when said changes reflect a desired temperature in the zone, in response to signals received by said fourth circuit means from said third circuit means.

36. In the system as in claim 35, wherein said programmable logic means modifies the response of said fourth circuit means to said output signals of said first circuit means representative of desired temperature in response to an input signal representative of real time data from a peripheral circuit means received by said fourth circuit means from said third circuit means.

37. In the system as defined in claim 36, wherein said thermostat includes indicating means coupled to said first, second, third and fourth circuit means for providing data indicative of the information in their respective input and output signals.

38. In a system for monitoring and controlling the condition of the air in a zone within operating limits using a single zone HVAC unit in which conditioned air passes into the zone via a damper operated by a control means in a duct communicating with the zone, a thermostat for activating and deactivating the control, said thermostat comprising:

first circuit means responsive to input signals for establishing first operating limits for the zone and providing first digital word output signals representative of the operating limits;

second circuit means responsive to input signals indicative of the actual condition of the air in the zone for providing a second digital word output signal representative of the condition of the air therein;

third circuit means adapted to be coupled to a peripheral circuit means for receiving data from a peripheral circuit means and for providing a third digital word output signal representative of the information contained in such data;

fourth circuit means responsive to output signals from said first, second, and third circuit means for providing fourth digital word output signals for operating the control means of a damper; and programmable logic means operatively coupled to said fourth circuit means for selectively providing second operating limits for a zone to said fourth circuit means.

39. In a system as in claim 38 wherein said programmable logic means provides to said fourth circuit means said second operating limits including the heating set-up and/or cooling set-back temperature ranges for a time period when a zone is not occupied.

40. In a system as in claim 39 wherein said programmable logic means is selectively programmed via said first circuit means to vary said heating set-up and/or cooling set-back temperature setpoints to any desired value within said temperature ranges.

41. In a system for monitoring and controlling the condition of the air in a zone within operating limits using a single zone HVAC unit in which conditioned air passes into the zone via a damper, operated by a control means, in a duct communicating with the zone, a thermostat for activating and deactivating the control means, said thermostat comprising:

first circuit means responsive to input signals for establishing said operating limits for the zone and providing first digital word output signals representative of said limits;

second circuit means responsive to input signals indicative of the actual condition of the air in the zone for providing a second digital word output signal representative of the condition of the air therein;

third circuit means responsive to output signals for providing third digital word output signals for operating the control means of a damper; and programmable logic means operatively coupled to said second circuit means for selectively modifying the said second digital word output signal for calibration of said signals representative of the condition of the air in a zone.

42. In the system as in claim 41 wherein said thermostat further includes a first temperature sensor for sensing the zone temperature and providing an output signal representative of actual temperature of the zone, said second circuit means including means responsive to said output signal from said first sensor for providing a second digital word output signal representative of the actual temperature in the zone.

43. In the system as in claim 42 wherein the programmable logic means selectively varies the second digital word output signal to indicate the zone temperature actually registered on an accurate thermometer in the zone employed by a installer of said thermostat.

44. In the system as in claim 43 wherein said second circuit means includes selectively adjustable logic means for providing a digital word output signal that is representative of the actual temperature in the zone in degrees Celsius and degrees Fahrenheit.

45. A method of controlling the setpoints of a thermostat used in a system for the controlling and monitoring the condition of air in a zone in which said thermostat include means for enabling and disabling the setpoint change function comprising the sequential steps of:
 a. selectively enabling the setpoint change function;
 b. establishing the setpoints of the thermostat;
 c. locking the setpoint so established; and
 d. selectively disabling the setpoint change function.

46. The method in accord with claim 45 comprising the step of:
 e. selectively enabling the setpoint change function regardless of whether the setpoint change function was disabled in step c.

47. A method of calibrating a thermostat which uses a digital signal representative of the condition of air in a zone, comprising the steps of:
 a. determining the actual condition of air in said zone;
 b. monitoring said digital signal; and
 c. selectively altering said digital signal until said signal is representative of the actual condition of the air in said zone.

48. The method in accord with claim 47 wherein the condition of air in a zone is representative of temperature.

49. A method of calibrating a thermostat which uses a digital signal representative of the condition of air entering a zone, comprising the steps of:
 a. determining the actual condition of air entering said zone;
 b. monitoring said digital signal; and
 c. selectively altering the digital signal until said signal is representative of the actual condition of air entering a zone.

50. The method in accord with claim 49 wherein the condition of air in a zone is representative of temperature.

51. A method of controlling setpoints of a programmable thermostat having a microprocessor and a memory used in a system for the control and monitoring the condition of air in a zone comprising the steps of:
 a. entering the setpoints of the thermostat in the memory of the thermostat;
 b. programming the microprocessor of the thermostat to disable the setpoint change function in response to a first input signal; and
 c. programming the microprocessor of the thermostat to enable the setpoint change function in response to a second input signal notwithstanding a first input signal which otherwise disables changing the setpoint function.

52. The method in accord with claim 51 wherein the condition of air in a zone is representative of temperature.

53. A method for calibration of a digital temperature signal derived from an analog/digital converter which receives an input signal from an analog temperature sensor and which supplies an output signal to a microprocessor having memory and an input from a logic circuit comprising the steps of:
   a. determining the actual temperature by an accurate thermometer at the location of the analog temperature sensor;
   b. monitoring the output of the analog/digital converter;
   c. selectively manipulating the memory using the digital output of a logic circuit to alter the bits in the digital output signal of the microprocessor until said output signal is representative of the actual temperature at said location.

54. A method of controlling setpoints of a programmable thermostat having a microprocessor and a memory used in a system for the control and monitoring the condition of air in a zone comprising the steps of:
   a. entering the setpoints of the thermostat in the memory of the thermostat in the form of a first digital word;
   b. programming the microprocessor of the thermostat to lock the setpoint change function in response to a first input signal wherein said first input signal is in the form of a second digital word; and
   c. programming the microprocessor of the thermostat to override the lock of the setpoint change function in response to a second input signal corresponding to a third digital word.

55. In a system for monitoring and controlling the condition of air within a zone within selectively determined operating limits using a single HVAC unit, operated by a control means, in which conditioned air passes into the zone via a duct communicating with each zone, a thermostat for controlling the control means of the HVAC unit, said thermostat comprising:
   first circuit means responsive to input signals for establishing the operating limits for the zone and providing a first digital word output signal representative of the operating limits;
   second circuit means responsive to input signals indicative of the actual condition of the air in the zone for providing a second digital word output signal representative of the condition of the air therein;
   third circuit means responsive to output signals from said first and second circuit means for providing third digital word output signals for operating the control means of the HVAC unit; and
   programmable logic means for providing digital word input signals to said third circuit means for selectively controlling the operation of the control means of an HVAC unit by said third circuit means.

56. In the system as defined in claim 55 said thermostat further comprises a first sensor located in the zone for providing an output signal representative of the actual temperature of the zone, said second circuit means including means responsive to said output signal from said first sensor for providing a second digital word output signal representative of the actual temperature in the zone.

57. In the system defined in claim 56 wherein said first circuit means includes means responsive to input signals for establishing the desired temperature in the zone and providing a first digital word output signal representative of the desired temperature therein.

58. In a system defined in claim 57 wherein said third circuit means is selectively controlled by said programmable logic means for comparing a first digital word representative of zone temperature and a second digital word representative of desired temperature in a zone for determining the demand for heating or cooling or no demand in the zone.

59. In the system defined in claim 58 said thermostat further comprising a second sensor located in the duct for determining the temperature therein and providing an output signal representative of the temperature in the duct, said second circuit means responsive to said output signal from said second sensor for providing a fourth digital word output signal representative of the duct temperature.

60. In a system defined in claim 59 wherein said third circuit means is selectively controlled by said programmable logic means for comparing a first digital word representative of zone temperature and a fourth digital word representative of duct temperature for determining the desired mode or operation of an HVAC unit.

61. In a system defined in claim 60 wherein said programmable logic means selectively controls said third circuit means for operating the HVAC unit in the heating or cooling mode when sufficient demand for heating or cooling exists in the zone and deactivating the HVAC unit when sufficient demand for heating or cooling no longer exists in the zone.

62. In the system as defined in claim 55 wherein said thermostat includes indicating means for providing data indicative of the information in any digital word signal associated with said first, second, and third circuit means and said programmable logic means.

63. In a system for monitoring and controlling the condition of the air in a zone within operating limits using a single zone HVAC unit operated by control means, in which conditioned air passes into the zone via a damper in a duct communicating with the zone, a thermostat for controlling the operation of a control means of the HVAC unit, said thermostat comprising:
   first circuit means responsive to input signals for establishing the operating limits for the zone and providing first digital word output signals representative of the operating limits of said limits;
   second circuit means responsive to input signals indicative of the actual condition of the air in the zone for providing a second digital word output signal representative of the condition of the air therein;
   third circuit means adapted to be coupled to a peripheral circuit means for receiving data from a peripheral circuit means and for providing a third digital word output signal representative of the information contained in such data;
   fourth circuit means responsive to output signals from said first, second and third circuit means for providing fourth digital word output signals for operating the control means of an HVAC unit;
   programmable logic means operatively coupled to said fourth circuit means for selectively modifying the response of said fourth circuit means to the output signal of said first circuit means for selectively controlling the changing of said operating limits.

64. In the system as in claim 63 wherein said programmable logic means selectively enables and disables the responsiveness of said fourth circuit means to changes in output signals of said first circuit means, when said changes reflect a desired temperature in the zone, in response to signals received by said fourth circuit means from said third circuit means.

65. In the system as in claim 64 wherein said programmable logic means modifies the response of said fourth circuit means to said output signals of said first circuit means representative of desired temperature in response to an input signal representative of real time data from a peripheral circuit means received by said fourth circuit means from said third circuit means.

66. In the system as defined in claim 65 wherein said thermostat includes indicating means coupled to said first, second, third and fourth circuit means for providing data indicative of the information in their respective input and output signals.

67. In a system for monitoring and controlling the condition of the air in a zone within operating limits using a single zone HVAC unit operated by a control means, in which conditioned air passes into the zone via a damper in a duct communicating with the zone, a thermostat for activating and deactivating the control means of an HVAC unit, said thermostat comprising:
  first circuit means responsive to input signals for establishing first operating limits for the zone and providing a first digital word output signal representative of the operating limits;
  second circuit means responsive to input signals indicative of the actual condition of the air in the zone for providing a second digital word output signal representative of the condition of the air therein;
  third circuit means adapted to be coupled to a peripheral circuit means for receiving data from a peripheral circuit means and for providing a third digital word output signal representative of the information contained in such data;
  fourth circuit means responsive to output signals from said first, second, and third circuit means for providing fourth digital word output signals for operating a control means of an HVAC unit; and
  programmable logic means operatively coupled to said fourth circuit means for selectively providing second operating limits for the zone to said fourth circuit means.

68. In a system as in claim 67 wherein said programmable logic means provides to the said fourth circuit means said second operating limits including the heating set-up and/or cooling set-back temperature ranges for time periods when said zone is not occupied.

69. In a system as in claim 68 wherein said programmable logic means is selectively programmed via said first circuit means to vary said heating set-up and/or cooling set-back temperature setpoints to any desired value within said temperature ranges.

70. In a system for monitoring and controlling the condition of air in a zone within selectively determined operating limits using a single HVAC unit operated by a control means in which air passes into the zone via a damper, operated by control means, in a duct communicating with each zone, a thermostat for activating or deactivating the control means of an HVAC unit, said thermostat comprising:
  first circuit means responsive to input signals for establishing said operating limits for said zone and providing a first digital word output signal representative of the operating limits;
  second circuit means responsive to input signals indicative of the actual condition of the air in the zone for providing a second digital word output signal representative of the condition of the air therein;
  third circuit means responsive to output signals from said first and second circuit means for providing third digital word output signals for operating the control means of an HVAC unit; and
  programmable logic means for providing digital word input signals to said third circuit means for selectively controlling the operation of an HVAC unit by said third circuit means.

71. In the system defined in claim 70 said thermostat further comprising a sensor located in a duct for determining the temperature therein, and providing an output signal representative of the temperature in the duct, said second circuit means responsive to said output signal from said second sensor for providing a fourth digital word output signal representative of the duct temperature.

72. In the system defined in claim 71 wherein said programmable logic means selectively controls said third circuit means for deactivating an HVAC unit when duct temperature exceeds predetermined operating limits.

73. In the system defined in claim 72 wherein said programmable logic means selectively controls said third circuit means for increasing the level of heating or cooling provided by an HVAC unit when duct temperature is not within predetermined operating limits established by said programmable logic means.

* * * * *